US005582888A

United States Patent [19]

Volkert

[11] Patent Number: 5,582,888
[45] Date of Patent: Dec. 10, 1996

[54] POP-UP PROMOTIONAL ITEMS AND METHODS OF MAKING

[75] Inventor: John K. Volkert, Northfield, Ill.

[73] Assignee: Papermasters, Inc., Northfield, Ill.

[21] Appl. No.: 304,527

[22] Filed: Sep. 12, 1994

Related U.S. Application Data

[63] Continuation-in-part of Ser. No. 998,933, Dec. 30, 1992, Pat. No. 5,346,455, which is a continuation-in-part of Ser. No. 817,281, Jan. 6, 1992, Pat. No. 5,181,901, which is a continuation-in-part of Ser. No. 463,118, Jan. 10, 1990, Pat. No. 5,078,670, which is a continuation-in-part of Ser. No. 381,047, Jul. 17, 1989, abandoned.

[51] Int. Cl.[6] .............................. B32B 33/00; G09F 1/00

[52] U.S. Cl. .......................... 428/40.1; 40/124.1; 40/539; 40/745; 40/754; 283/56; 283/903; 428/12; 428/43; 428/121; 428/124; 428/192; 428/194; 428/354; 428/355

[58] Field of Search ............................... 428/40, 43, 354, 428/355, 121, 192, 194, 12, 124; 283/56, 903; 40/124.1, 539, 745, 754

[56] References Cited

U.S. PATENT DOCUMENTS

| | | | |
|---|---|---|---|
| 2,131,448 | 9/1938 | Lowen | 40/594 |
| 2,360,973 | 10/1944 | Pedersen | 156/252 |
| 3,945,870 | 3/1976 | Johnsen | 156/269 |
| 4,479,838 | 10/1984 | Dunsirn et al. | 156/247 |
| 4,592,573 | 6/1986 | Crowell | 283/56 |
| 4,657,612 | 4/1987 | Schoenleber | 156/227 |
| 4,661,189 | 4/1987 | Voy et al. | 156/248 |
| 4,662,971 | 5/1987 | Adams | 156/248 |
| 4,699,679 | 10/1987 | Cartmell | 156/248 |
| 4,948,445 | 8/1990 | Hees | 156/253 |
| 4,959,115 | 9/1990 | Lacey | 156/264 |
| 4,992,132 | 2/1991 | Schmidlin | 156/264 |
| 5,041,072 | 8/1991 | McClelland | 493/188 |
| 5,049,121 | 9/1991 | Bunch, III | 493/357 |

FOREIGN PATENT DOCUMENTS 2166109 4/1986 United Kingdom .

*Primary Examiner*—Nasser Ahmad
*Attorney, Agent, or Firm*—Fitch, Even, Tabin & Flannery

[57] ABSTRACT

Pop-up items are provided which can either be mounted in three-dimensional form on a suitable supporting surface by means of pressure-sensitive adhesive carried by the item or can be affixed to facing panels of a letter or pages of a book. Some preferred items include a pop-up element in the form of one or two panels carrying strategically located pressure-sensitive adhesive which permits instant mounting, e.g. between facing panels so that, upon opening, the pop-up element assumes a three-dimensional configuration as a result of the pressure-sensitive adhesive bonding to the surfaces of facing panels or pages. The 3-dimensional pop-up can also be mounted to a suitable supporting surface. A variety of methods for the mass production of such pop-up elements from a continuous web, e.g., a printed and die-cut web from a web press, facilitate their inexpensive fabrication. These pop-up elements are preferably marketed or distributed in groups, e.g. defined by perforations within a surrounding matrix, or attached to a continuous strip of carrier sheet material that might be rolled or fan-folded, or in the form of stacks or pads from which a single item can be peeled off and affixed. Sheets containing multiple, single-thickness pop-up elements in blank form are specially adapted for customized printing by electronic imaging.

20 Claims, 17 Drawing Sheets

NOTICE

FIG. 57
FIG. 55
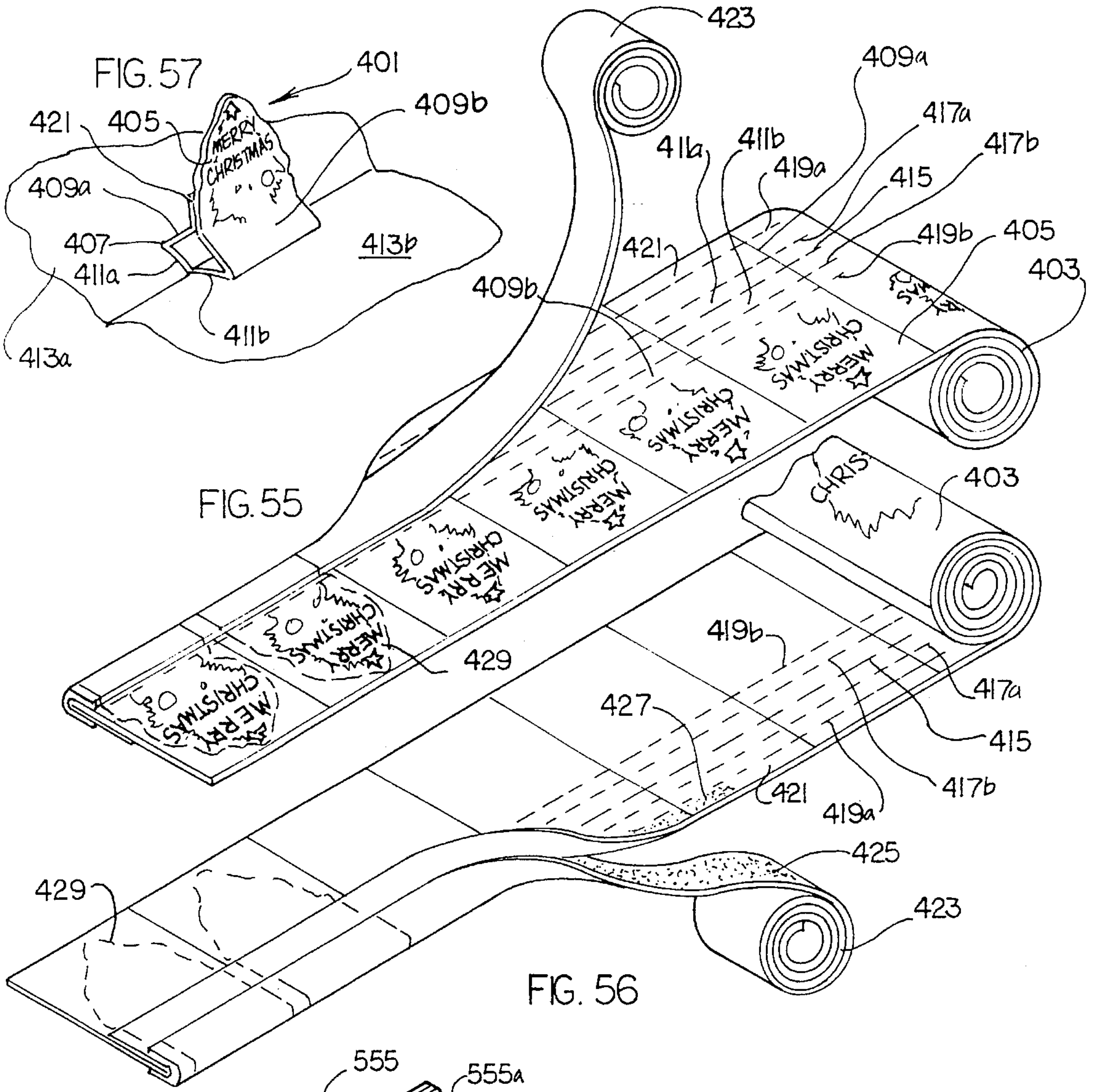
FIG. 56
FIG. 67
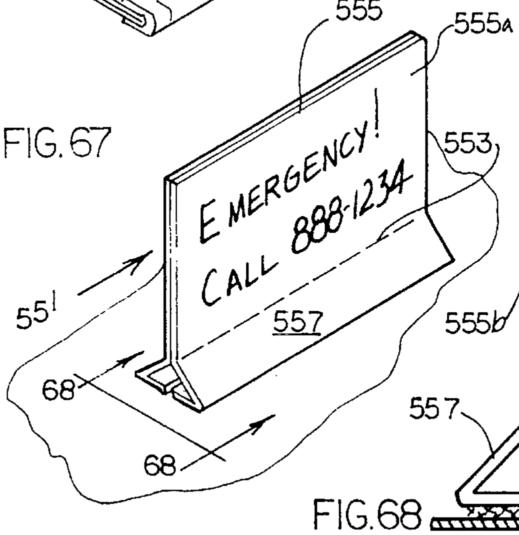
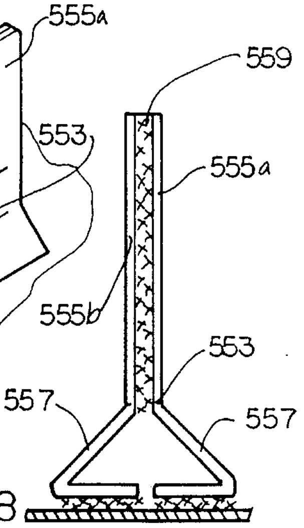
FIG. 68
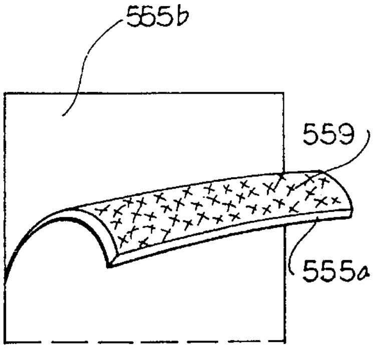
FIG. 69

FIG. 63
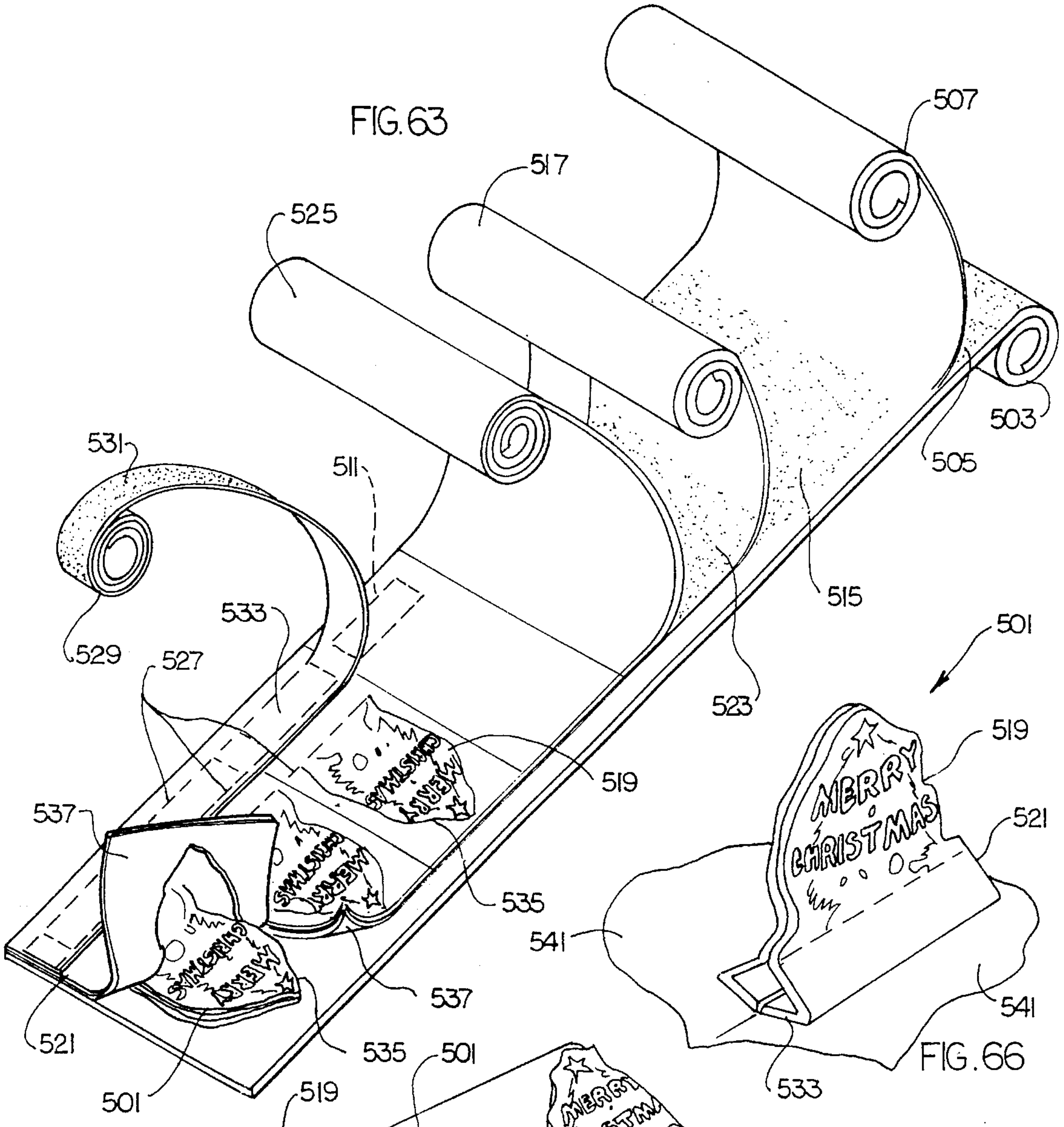
FIG. 66
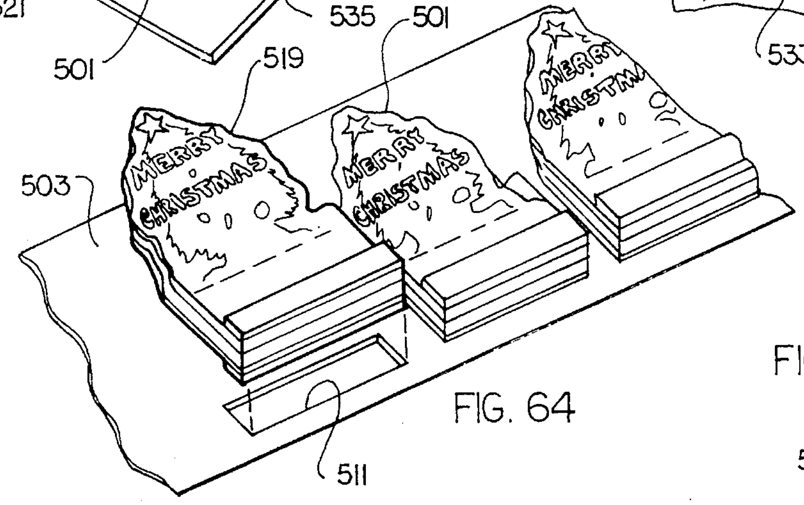
FIG. 64
FIG. 65
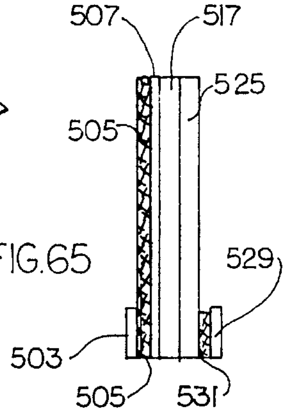

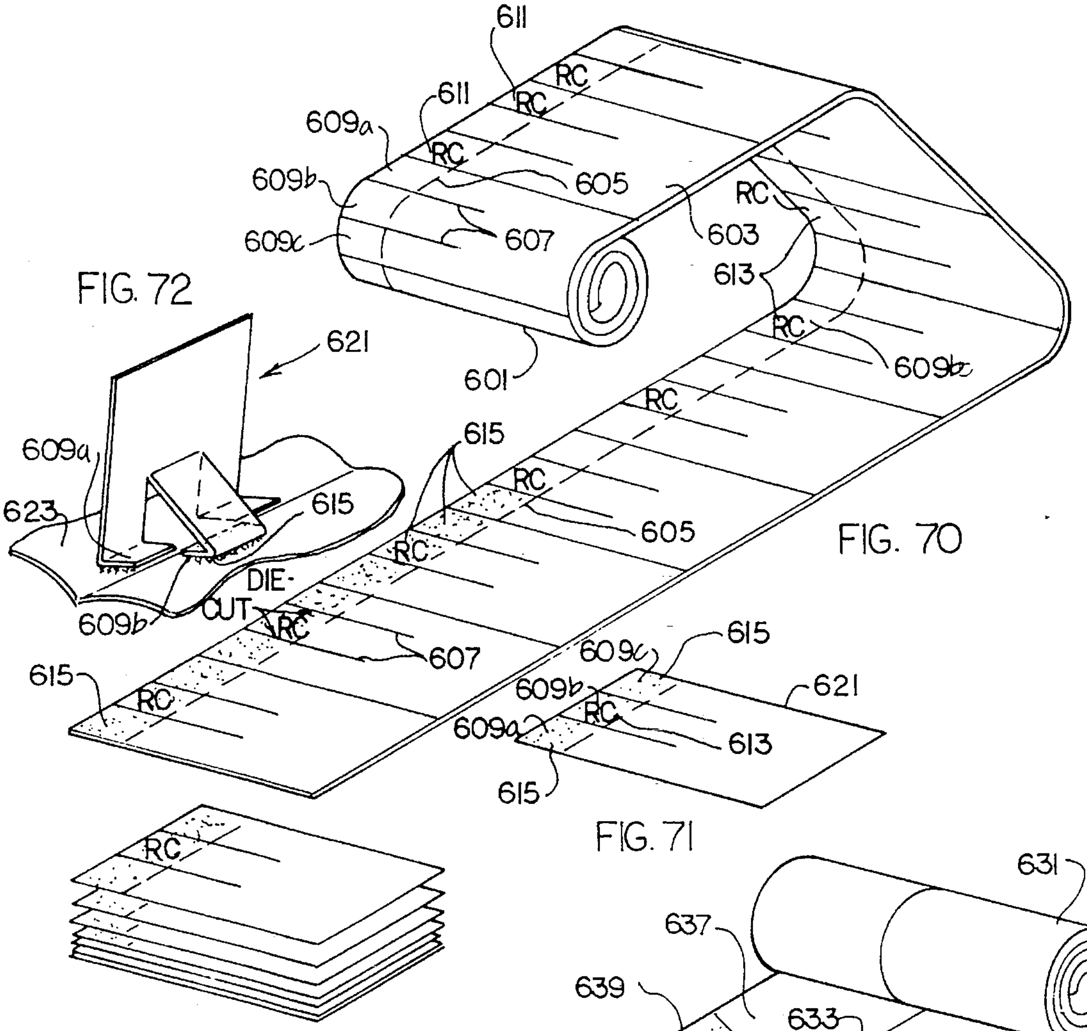
FIG. 72
FIG. 70
FIG. 71
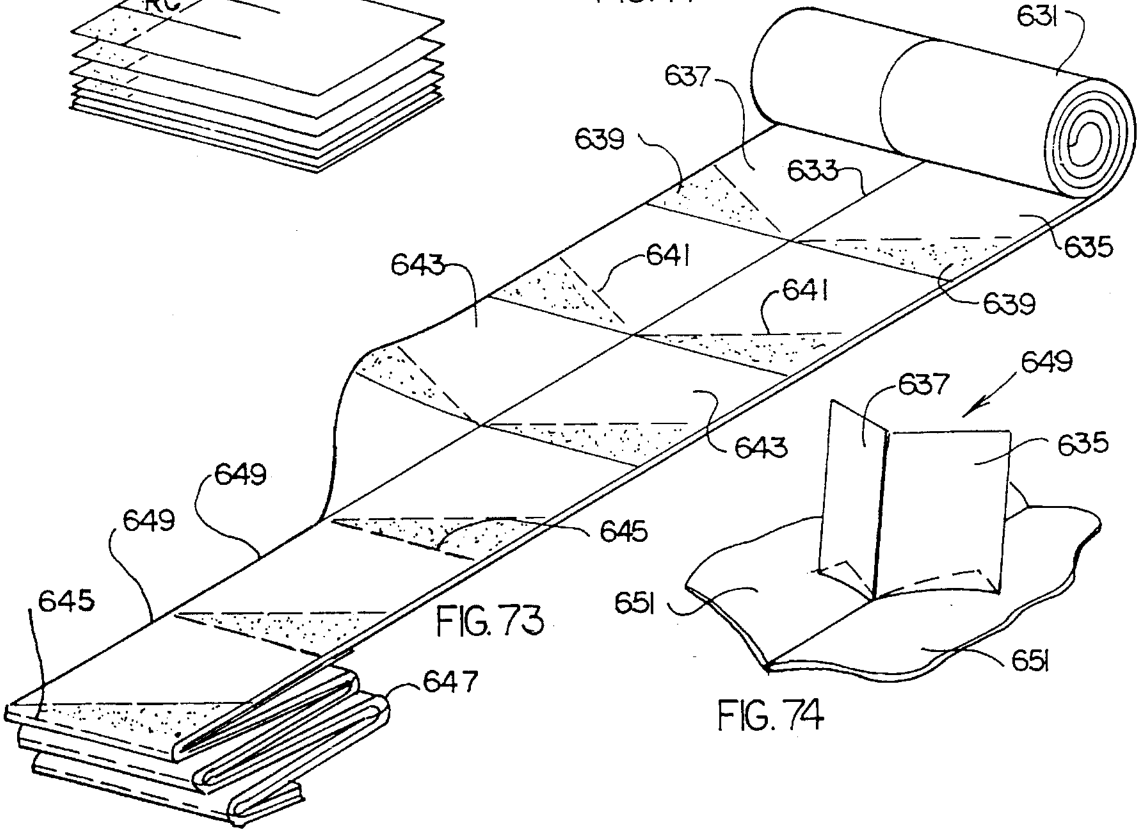
FIG. 73
FIG. 74

FIG. 82
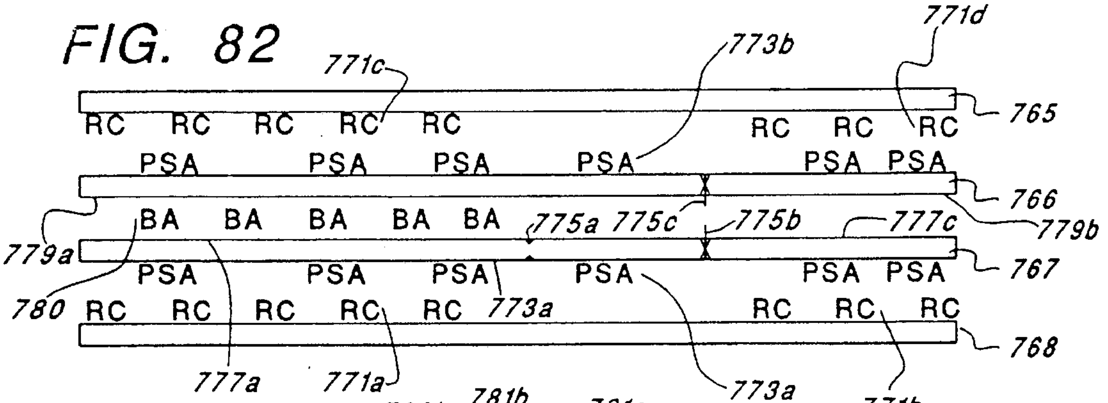
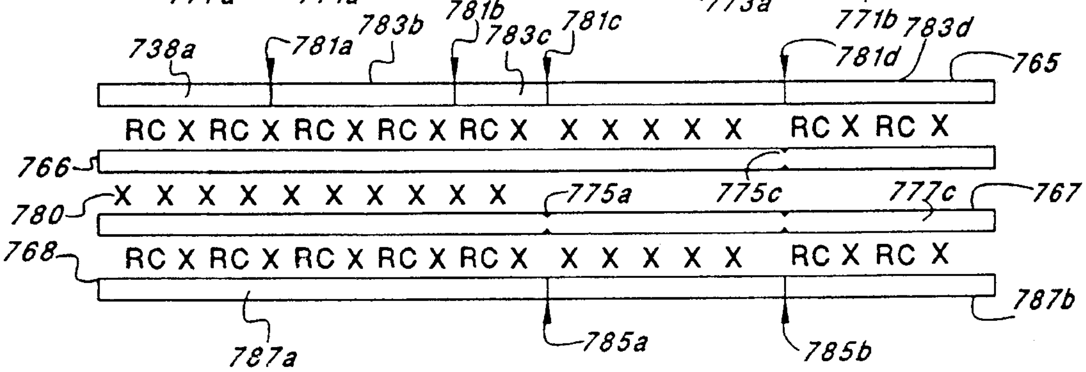
FIG. 83
FIG. 85
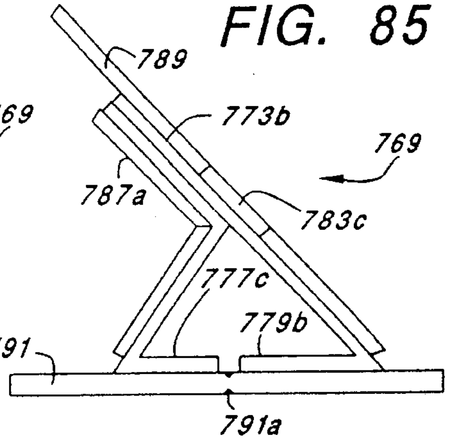
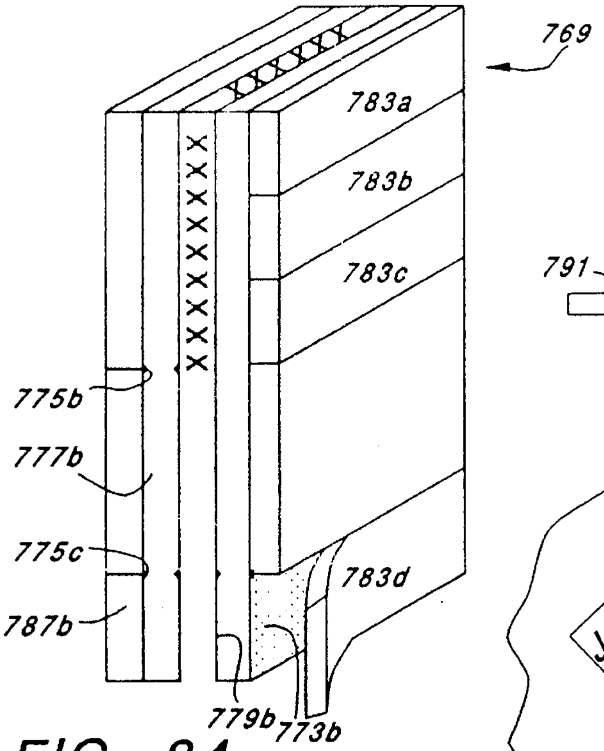
FIG. 84
FIG. 86
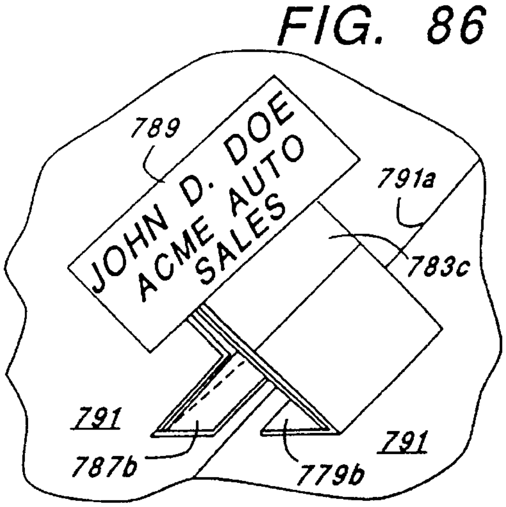

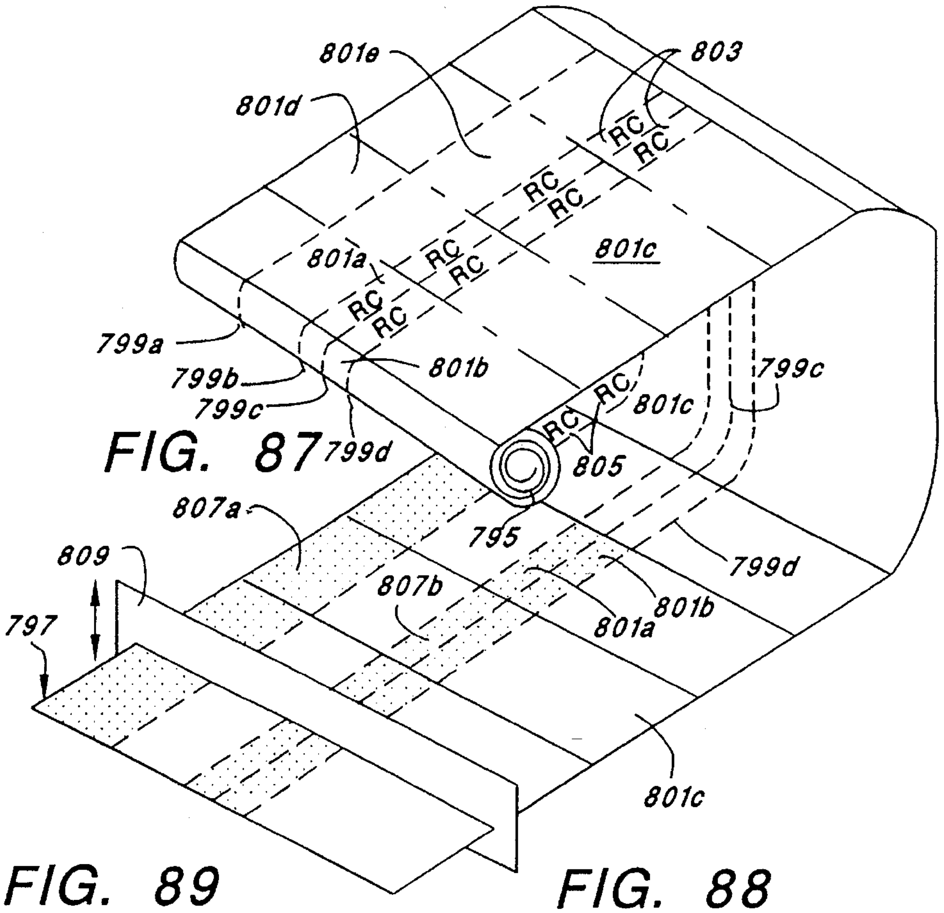
FIG. 87
FIG. 89
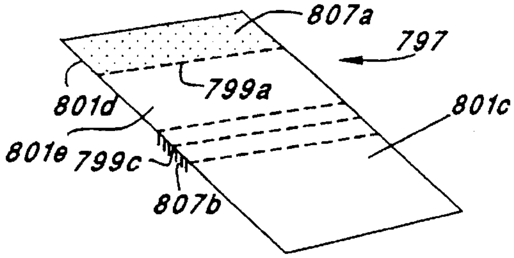
FIG. 88
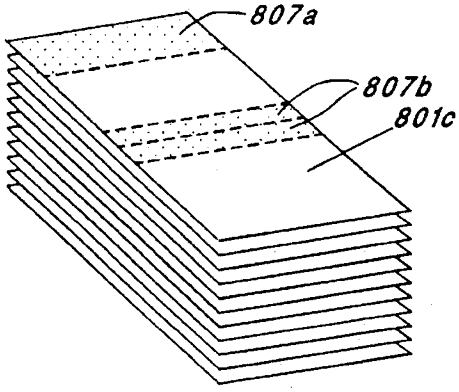
FIG. 90
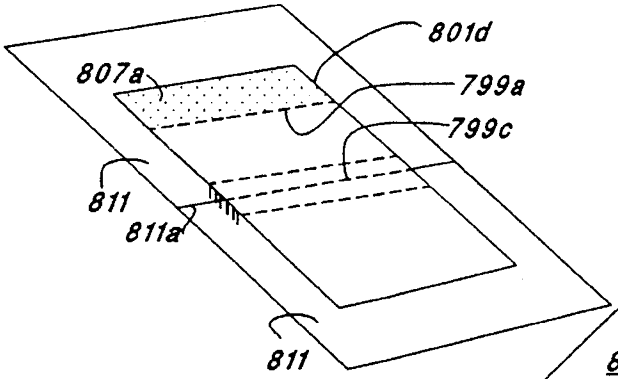
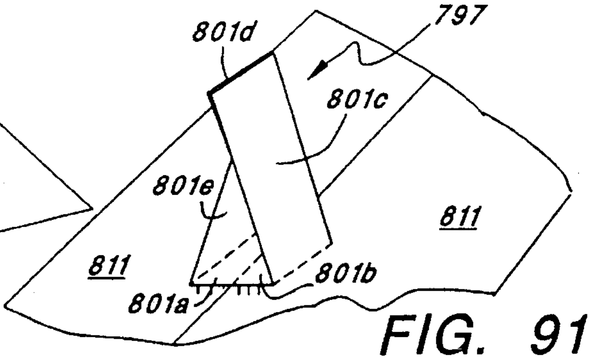
FIG. 91

POP-UP PROMOTIONAL ITEMS AND METHODS OF MAKING

This application is a continuation-in-part of my application Ser. No. 07/998,933, filed Dec. 30, 1992, now U.S. Pat. No. 5,346,455 which is a continuation-in-part of Ser. No. 07/817,281, filed Jan. 6, 1992, now U.S. Pat. No. 5,181,901, which is a continuation-in-part of Ser. No. 07/463,118, filed Jan. 10, 1990, now U.S. Pat. No. 5,078,670, which is a continuation-in-part of application Ser. No. 07/381,047, filed Jul. 17, 1989, abandoned.

This invention relates generally to novelty items made of paper or other sheet material, more particularly to promotional pop-ups multiple copies of which can be fabricated from separate sheets or from one or more continuous webs and also to mass production methods of making such items from one or more continuous webs, as supplied from a web-press or the like, which items assume three-dimensional configuration and are designed to permit mounting in such orientation.

BACKGROUND OF THE INVENTION

Pop-ups have fairly recently become frequently used in advertising and in other promotional endeavors, whereas they had been used in the greeting card field and in children's books for a number of years. Such pop-up pieces have become generally available to the advertising field as a result of the developments shown in several earlier patents, particularly U.S. Pat. No. 3,995,388, issued Dec. 7, 1976, which discloses methods for making pop-up paper products having significant advantages over hand-assembly methods that had been generally theretofore employed. U.S. Pat. No. 4,146,983, issued Apr. 3, 1979, discloses other methods for making novel promotional items, particularly those which are designed to present a plurality of coupons or the like to a recipient upon the opening of a folder. U.S. Pat. No. 4,337,589 discloses manufacturing techniques, specifically suited for mass production on a web-press or the like, for making pop-up advertising pieces and the like, the details of the disclosure of which are incorporated herein by reference.

The foregoing patents describe different manufacturing techniques useful for making advertising and promotional pop-ups as a part of a continuous web arrangement, and pop-ups such as these have been frequently used to create impact and enjoyment in books, in greeting cards and in advertising inserts. The foregoing advances in designs and in manufacturing methods have enabled volume production of such products at significant cost savings and thus have increased their use.

A general characteristic of such pop-ups is the movement of the pop-up element from a flat, substantially single plane into a three-dimensional orientation upon the opening of a pair of cover pieces or basepieces, generally in the form of a folder inside which the pop-up is located. By attaching the pop-up elements to opposite panels of the basepieces, for example, along angles created by lines of weakness, such as score lines and/or perforations, in combination with adhesive bonds, pressure or stress points are created which, upon opening of one cover, cause the pop-up to be erected. However, the pressure or stress which is created upon opening is sufficient so that, when the cover is manually released, it will draw the cover either partially or entirely closed.

Although a pair of basepieces have heretofore been utilized in such pop-up units, it has now been found that improved pop-up designs are feasible that eliminate one or more of the basepieces, as are methods for mass production of such improved designs.

SUMMARY OF THE INVENTION

Improved pop-up items and methods for making such items are provided in the form of individual pop-up elements, the exterior surfaces of which carry pressure-sensitive adhesive. The adhesive-carrying surfaces are optionally covered by release liners or the like. Once such optional release liners are removed from exterior surfaces, the pop-up element can be affixed to a supporting surface in attention-attracting three-dimensional orientation, or between facing panels or pages where it will assume such orientation upon opening of such pivotally interconnected panels.

Such pop-up elements can be adhesively attached to a carrier strip or web for distribution as a part of an arrangement which facilitates handling, storage and distribution thereof, or the pop-up elements can be fabricated in multiples and distributed in the form of strips or a stack or pad from which the recipients can one-by-one remove and utilize individual items. Sheets of blank, or partially blank, pop-up elements can be provided which are suitable for customized printing by Electric Imaging (EI), e.g. by a computer-driven laser printer or the like. Such sheets can be in cut, single sheet form, or they may be in fan-folded or roll form, from which individual sheets can be detached following EI-treatment, if desired. Mass production methods of manufacturing such pop-up elements are likewise provided which facilitate volume production at affordable cost.

BRIEF DESCRIPTION OF THE DRAWINGS

FIG. 55 is a perspective view showing still another mass production method for making pop-up elements from a printed web wherein a separate strip of pressure-sensitive adhesive-bearing transfer tape is employed, the mass production method being shown as it would be viewed from below in the preferred method of running in order to better illustrate certain details;

FIG. 56 is an inverted view of FIG. 55, showing the method as it might more normally be run, wherein the folding is carried out so the portion being folded is moved atop the remainder of the web;

FIG. 57 is a fragmentary perspective view showing the pop-up element manufactured by the method of FIGS. 55 and 56 in its display orientation between a pair hinged panels;

FIG. 63 is a schematic perspective view showing yet another mass production method for making pop-up units from a pair of printed webs, which method incorporates a transparent film which is employed to distribute the pop-up element in its flattened form;

FIG. 64 is a view showing the pop-up units manufactured by the mass production method of FIG. 63 on a carrier web, with one being shown as it is removed from the web;

FIG. 65 is a side view of the pop-up unit shown in FIG. 64 which was removed from the carrier web;

FIG. 66 is a fragmentary perspective view showing the pop-up element that formed the main part of the pop-up unit of FIG. 65 in its eventual display orientation between a pair of hinged panels;

FIG. 67 is a perspective view of another alternative embodiment of a pop-up element which can be made by various of the illustrated mass production methods and which is shown in its upstanding display orientation affixed to a pair of hinged panels;

FIG. 68 is an end view, enlarged in size, of this pop-up element looking generally along the line 68—68 of FIG. 67;

FIG. 69 is a perspective view showing the flag section of the pop-up element of FIGS. 67 and 68 after it has been removed from the remainder of the pop-up element and as the release liner portion is being separated from the adhesive-carrying main body;

FIG. 70 is a perspective and schematic view of yet another embodiment of a mass production method for making pop-up elements which is designed to create a stack of single-sheet pop-up elements, one atop another, which can be removed one at a time for use;

FIG. 71 is a view showing one of the pop-up elements after its removal from the stack shown in FIG. 70;

FIG. 72 is a perspective view showing the pop-up element of FIG. 71 in its display condition between adjacent panels of a sheet-like item, such as a letter, pamphlet, menu or the like;

FIG. 73 is a schematic and perspective view showing one more embodiment of a mass production method for making folded pop-up elements embodying various features of the invention, which method produces a fan-folded stack of pop-up elements attached to one another via lines of perforation;

FIG. 74 is a fragmentary perspective view showing one pop-up element removed from the fan-folded stack of FIG. 73 and mounted in display position between a pair of hinged-together panels of sheet material;

FIG. 82 is a schematic view showing the bringing together of a plurality of sheet material webs in the mass production fabrication of a composite webs containing a series of pop-up elements having still another design embodying various features of the invention;

FIG. 83 is a view similar to FIG. 82 showing the individual webs following lamination with one another;

FIG. 84 is a perspective view showing a single pop-up element created from the composite web of FIG. 83;

FIG. 85 is a side view showing the pop-up element of FIG. 84 mounted in display position on a pair of hinged-together panels with an item removably affixed to the front surface;

FIG. 86 is a perspective view of the pop-up element of FIG. 85 showing an item, e.g. a business card, mounted in display position;

FIG. 87 is a perspective view of yet another continuous web which has been printed to define a series of blanks, each containing panels and subpanels, which is schematically shown as being subjected to a series of steps to create lines of weakness and to apply release coatings and adhesive, before being severed into individual pop-up elements;

FIG. 88 is a schematic perspective view showing a stack of pop-up elements being formed from the web of FIG. 87;

FIG. 89 is a perspective view showing one pop-up element following its removal from the stack shown in FIG. 88;

FIG. 90 is a view showing the pop-up element of FIG. 89 being applied to a pair of hinged panels or basepieces;

FIG. 91 is a perspective view showing the assemblage of FIG. 90 after the folding and then unfolding of the pair of basepieces;

DETAILED DESCRIPTION OF THE PREFERRED EMBODIMENTS

Figures 1, 2, 3, 4, 5, 6, 7, 8:
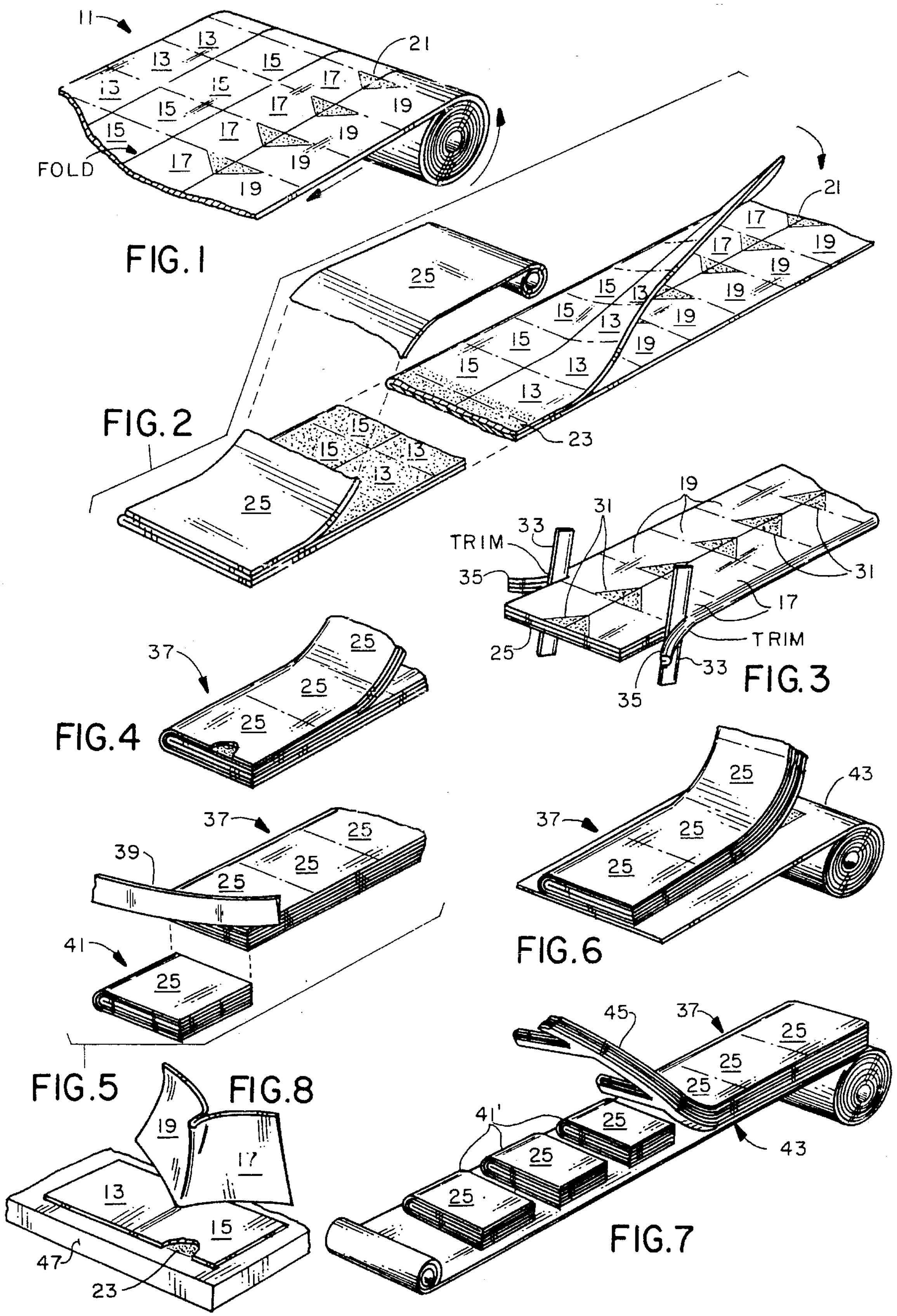
FIG. 1 is a perspective view of a continuous web which has been printed so as to define a series of blanks each containing a pair of basepieces and a pair of pop-up panels, illustrating the web after a glue pattern has been applied thereto.
FIG. 2 is a similar perspective view showing the web of FIG. 1 after it has been folded onto itself, illustrating the application of pressure-sensitive adhesive to the upper surface of the folded web followed by the association of a continuous sheet of liner material thereupon.
FIG. 3 shows the composite web of FIG. 2 after it has been rotated 180° to facilitate the application of a further adhesive pattern in the region of the pop-up panels followed by the trimming of both lateral edges of the composite web.
FIG. 4 shows the web of FIG. 3 after it has been again folded upon itself.
FIG. 5 shows the folded web of FIG. 4 as it might be thereafter handled so as to produce individual pop-up carrying pieces.
FIG. 6 illustrates an alternative to FIG. 5 wherein the folded web of FIG. 4 is associated with a continuous carrier sheet.
FIG. 7 shows treating the associated web arrangement of FIG. 6 to create a plurality of structurally identical, spaced apart, individual pop-up-carrying pieces on the continuous carrier sheet.
FIG. 8 is a perspective view showing one of the pop-up items illustrated in FIG. 5 mounted on a horizontal surface, such as a shelf, in its open or display position.

FIG. 1 shows a continuous web 11 as it may be running on a web-printing press or being unrolled from a preprinted roll, depicting a series of structurally identical printed blanks which could, if desired, be appropriately preliminarily die-cut; the blanks are designed to, following fabrication, form a series of promotional pieces such as that illustrated in FIGS. 5 and 8. Each blank is aligned laterally across the continuous web 11, the direction of movement of the web being shown by the arrows in the FIGURE. The dot-dash lines illustrate the transverse lines along which each blank, following folding, will be severed from the next adjacent blank to complete fabrication of an individual piece.

In the blanks illustrated in FIG. 1, a pair of basepieces 13 and 15 are arranged next to one another with a pair of pop-up panels 17, 19 located laterally next to the edge of the basepiece 15. Also shown in FIG. 1 are printed, longitudinally extending, parallel lines that divide each blank into four panels. Some or all of these lines could actually be formed as lines of weakness in the web, as for example, by pressing, scoring or slightly perforating; alternatively, they may be omitted and simply left to be formed as a result of the subsequent folding operations performed on the web. It is generally satisfactory to simply rely upon the natural resiliency of the paper web to effect appropriate bending of the pop-up elements as a result of the particular placement of an adjacent line of adhesive without actually providing a line of weakness; however, lines of weakness within the regions of the pop-up panels can be employed to create a neater appearance in the final product. As a part of the manufacturing operation, the same die-cutting, adhesive-applying and folding steps are effected with respect to each of these successive blanks of the continuous, sheet material web, which is preferably made of a suitable paper or paperboard material, glossy or matte finish as desired, but which might possibly be an appropriate plastic sheet material.

As a part of an adhesive application step, a glue pattern 21 of generally triangular form is applied so that it covers portions of both pop-up panels 17 and 19, which pattern is eventually used to join the pop-up panels to the interior surfaces of the basepieces 13, 15. If desired, such a glue pattern could instead be applied to the appropriate locations on the basepieces 13, 15. Although these are commonly referred to in the trade as glue patterns, any suitable adhesive, e.g., hot-melt or solvent-based, can be used in such a fabrication process. Such permanent-type adhesive is understood to be such as to have a bond strength that is generally higher than the tear strength of the fibers. Other such adhesive arrangements, such as detailed in the aforementioned patents, including heat, ultrasonic or RF-activated or micro-encapsulated adhesives, can alternatively be used. If desired, co-adhesive patterns of a material that will only adhere to itself can be applied to the appropriate locations of both surfaces, as is known in this art.

Following the application of the glue pattern 21, the web is folded upon itself along the longitudinal line between the panels 15 and 17, as depicted in FIG. 2, thereby joining together triangular portions of the panels 13 and 19 and of the panels 15 and 17, respectively, in the region of the glue pattern 21. Following the folding operation, the upper surface of the folded web constituting the basepiece panels 13 and 15 is substantially completely coated with pressure-sensitive adhesive 23. Next, a web 25 of liner material of appropriate width is brought into association with the upper surface of the folded web so as to completely cover the pressure-sensitive adhesive surface. The undersurface of the liner material web 25 depicted in FIG. 2 is appropriately precoated with a silicone or some other suitable release agent so as to allow it to be stripped cleanly from the basepieces exposing the pressure-sensitive adhesive, as is well known in the art. As an alternative to first creating the folded web of superimposed pairs of basepiece panels and pop-up panels and then applying pressure-sensitive adhesive and a liner sheet, it would be acceptable to purchase sheet material in roll form in the form of a ply of blank paper joined by pressure-sensitive adhesive to a release liner and thereafter print the interior surfaces of the basepiece panels 13 and 15 onto the blank paper ply. Thereafter, through the appropriate application of the glue patterns 21, this two-ply web could be associated with a continuous printed web of suitable width to constitute the pop-up panels 17, 19.

As a further alternative, if desired, instead of folding the web onto itself as illustrated in FIG. 2, the web could be longitudinally severed along the line between panels 15 and 17 and the left-hand portion of the web moved into superimposed position atop the right-hand portion. Similarly, two different webs, which could be of similar widths or slightly different widths, could be used to produce the basepiece panels and the pop-up panels, respectively, and such an arrangement would likely be employed should it be desired to form the basepiece panels, for example, of heavier stock material or of a material having different surface characteristics from that of the pop-up panels. In all of these embodiments, the basepieces 13, 15 are preferably fabricated from a single sheet so as to be integral with each other, being connected along a common foldline.

As a still further alternative, it would be possible to first coat one surface of the left-hand portion of the web 11 of FIG. 1 with pressure-sensitive adhesive and then apply the continuous web of liner material 25 in association therewith to cover the adhesive before the web is either folded onto itself or severed and laterally displaced so as to associate the other surface of the left-hand half of the web with the right-hand half which constitutes the pop-up panels.

As depicted in FIG. 3, the composite web consisting of the folded over web 11 and the liner material 25 is preferably rotated 180° to facilitate the application of adhesive patterns 31 to the regions of the pop-up panels 17, 19, which would then be located at the upper surface of the composite continuous web. Although such rotation is preferable, it is not necessary, and the glue patterns could be applied to the undersurface of the web without such 180° rotation. Next, as depicted in FIG. 3, both lateral edges of the composite web are trimmed by the use of suitable knife blades 33 or the like, and the trim material 35 is discarded. Alternatively, the trimming of the lateral edges could take place prior to the application of the glue patterns 31. Moreover, instead of applying glue patterns 31 to both of the pop-up panels 17, 19, a single glue pattern could be applied to just one of the panels.

Following the trimming operation, the web is again folded upon itself along the longitudinal line between the panels 17 and 19 to the orientation 37, depicted in FIG. 4, so that the glue patterns 31 interconnect the pop-up panels to each other and so that the interconnected pop-up panels are sandwiched between the basepieces 13, 15 which constitute a folder, the outer surface of which is covered by the pressure-sensitive adhesive 23 and the liner material 25. Thereafter, there are alternative ways of treating the finally-folded web 37 depending upon how it is intended that the pop-up pieces are to be stored and distributed. As well known in the art, it is often preferable to run the finally-folded web 37 through a set of compression rolls so as to assure a strong adhesive bond is created at the desired points. Likewise, a further trimming operation could be carried out along the right-hand edge of FIG. 4, if desired, and only such a trimming operation might be also used instead of trimming both edges, as depicted in FIG. 3.

If the pop-up pieces are to be delivered as single individual units, a transverse severing of the web is then effected using a suitable knife blade mechanism 39 or the like, which could be part of a rotating device, to create the individual, structurally identical units 41. Should it be desired to maintain the pop-ups in strip form, instead of using a knife 39 to completely sever adjacent units, an appropriate line of perforations could be imposed at this point; thereafter, the continuous web could be wound in roll form or could be fan-folded at each of the lines of perforation to create a strip of interconnected pop-up pieces.

A further alternative is shown in FIG. 6 wherein the finally-folded, continuous web 37 is associated with a web of carrier material 43, the upper surface of which is either precoated or coated at that time with a weak-bond, pressure-sensitive adhesive; the carrier web 43 may be slightly wider than the finally-folded composite web 37. Thereafter, as depicted in FIG. 7, a "kiss-cut" die-cutting operation is effected to cut through all of the thicknesses of the composite web 37 but not to cut into the continuous carrier web 43. The result of such die-cutting is to create a plurality of individual pop-up containing units 41' at uniformly spaced locations along the carrier web 43, and the die-cut scrap material formed as a part of the kiss-cut operation, as indicated by the reference numeral 45, is stripped from the web using state of the art techniques. Thereafter, as depicted in FIG. 7, the carrier web and its series of structurally identical pop-up carrying pieces 41' can be conveniently wound into a roll form for storage and/or shipping, either by rolling the web in the direction shown or in the opposite direction. When it is desired to distribute the items, because of the relatively weaker bond between the carrier 43 and the liner 25, the individual units 41' can be removed therefrom without detaching the liner material 25 from the basepieces.

By reference to FIG. 8, it can be seen that opening the folder, by pivoting the basepieces 13 and 15 along their straight foldline of interconnection, causes the pair of pop-up panels which constitute the central pop-up element to be stressed (as a result of their interconnections to the basepieces in the triangular regions provided by the glue pattern 21) and causes them to rise up out of the planes of the basepieces and assume a three-dimensional, attention-attracting configuration guided also by the interconnection at the glue pattern 31. By stripping all or a part of the liner material 25 from the exterior surfaces of the basepieces 13 and 15, the pressure-sensitive adhesive 23 becomes exposed and allows the open piece to be easily and quickly affixed to an appropriate supporting surface, such as the upper surface of a horizontal shelf 47 or the like. This attachment to the shelf surface resulting from the pressure-sensitive adhesive bond assures that the piece 41 remains affixed in the open position with the pop-up element prominently displayed in its three-dimensional configuration.

Figure 9:
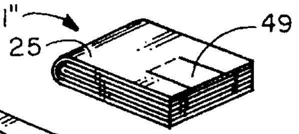
FIGS. 9 and 10 show alternative versions of the pop-up piece illustrated in FIG. 5.
Figure 10:
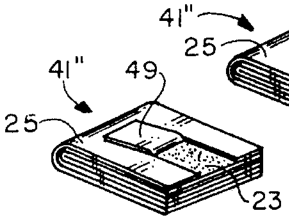

Should it be desirable to provide a piece that can be temporarily fixed in one location and then removed and later affixed in a different location, it might be preferable to die-cut the liner sheet 25 so as to facilitate only partially exposing the pressure-sensitive adhesive surface, as shown for example in FIGS. 9 and 10. Depicted is a modified piece 41" in which the liner material has been kiss-cut or otherwise suitably die-cut to leave short links that easily rupture so as to create a hinged panel 49 at an appropriate, e.g., a central, location in the liner sheet portion covering the exterior surface of each of the basepieces 13, 15. By stripping the hinged panel 49 from the adhesive surface and folding it rearward onto the remainder of the liner 25, as depicted in FIG. 10, less than 20% of the pressure-sensitive adhesive surface area is exposed. The central location arrangement assures that the pop-up can still be securely mounted; yet as a result, the piece might be removed from one surface and firmly re-affixed to a second suitable supporting surface after removing the entire liner sheet 25. Instead of hinging the panel 49 to the remainder of the liner panel 25, it can be left connected along a line of perforations or completely severed therefrom to facilitate its complete removal.

Figure 11:
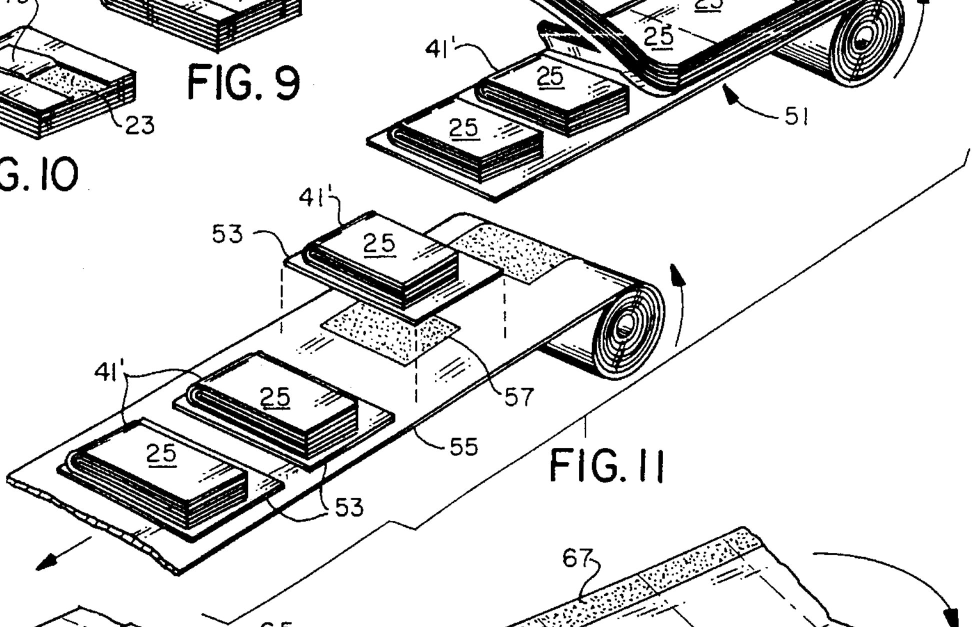
FIG. 11 illustrates an alternative method for making pop-up pieces attached in piggyback form to an intermediate substrate which is in turn cut into discrete units that are attached for handling and storage purposes to a continuous web.

Should it be desired to distribute the pop-up pieces in piggyback form in combination with an intermediate substrate, a process generally as depicted in FIG. 7 could be employed so as to create a series of structurally identical pop-up pieces 41' located in spaced arrangement along a continuous web 51, as depicted in FIG. 11, using a web 51 of a suitable material to serve as a piggyback substrate. Thereafter, the web 51 is transversely severed into a series of individual units each of which constitutes a pop-up piece 41' attached to an intermediate substrate 53 in piggyback fashion. These units are then applied to a carrier web 55 upon which has been applied a suitable, releasable, adhesive pattern 57, or the undersurface of the web 51 could have a suitable adhesive applied to it, preferably prior to its being severed. Alternatively, the folded web 37 as carried by the substrate web 43, as shown in FIG. 6, might also be affixed directly to an adhesive-bearing web 55 or to a plain web after having an adhesive pattern applied to the undersurface of the web 43; thereafter, kiss-cutting is performed to fashion the individual piggyback units. As another alternative, a composite web having a layer of adhesive sandwiched between two continuous webs could be used instead of the webs 51 and 55, and a first kiss-cutting step would be used to create the individual pieces 41 followed by a second kiss-cutting step to create the substrates 53. As a further alternative, the individual pieces 41 could be produced as depicted in FIG. 5 and then placed individually onto the web 51 in alignment with adhesive patterns applied thereto using commercially available state-of-the-art equipment. The characteristics of the various adhesives used can be such as taught in U.S. Pat. No. 4,479,838, the disclosure of which is incorporated herein by reference. More particularly, the adhesive pattern 57 should be the weakest so that when the piggyback unit is ready for removal from its "storage" location on the carrier web 55, it can be easily peeled from the carrier 55, using automated equipment if desired, and placed in its distribution location. For example, it may be desired to distribute the piggyback items on the exterior surface of a package, attached to a stand-alone promotional folder or by insertion into a magazine or a book.

In such an instance, it might be desirable to use a thin transparent material, e.g., thin thermoplastic material, for the web 51 from which the intermediate substrates 53 would be cut. In this manner, the transparent substrate 53 can be allowed to ultimately remain in place where it is located following removal of the pop-up piece 41' because it will not obscure any underlying printing. Furthermore, in order to facilitate its ultimately remaining in place, the adhesive which is used to attach the piece 41' to the web 51 should preferably be a "dry residue" adhesive that is also transparent, as is known in the art. This dry residue adhesive should have a greater adherence strength than the adhesive pattern 57, but it should have a lower adhesive strength than the pressure-sensitive adhesive with which the basepieces are bonded to the liner material 25 so that the piece 41' can be stripped from the intermediate substrate 53 by the ultimate recipient, leaving only the transparent substrate which would likely be bonded by a substantially permanent, transparent adhesive in the location on a package or folder or the like where distribution occurs. It is contemplated that the webs 55 of carrier material with the attached piggyback arrangements would then be rolled for storage and shipping purposes, as described hereinbefore.

Figure 12:
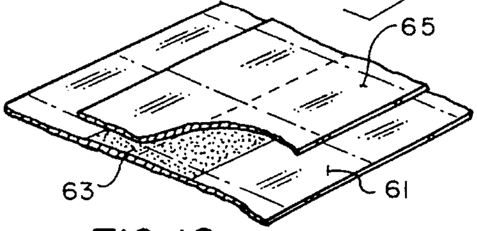
FIG. 12 is a schematic perspective view showing the initial steps of manufacture of a pop-up element of an alternative design.
Figure 13:
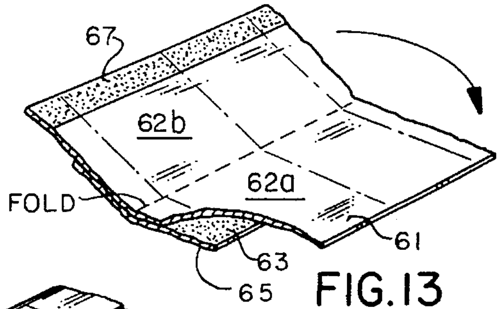
FIG. 13 shows the composite web of FIG. 12 rotated 180° with an adhesive pattern being applied.
Figure 14:
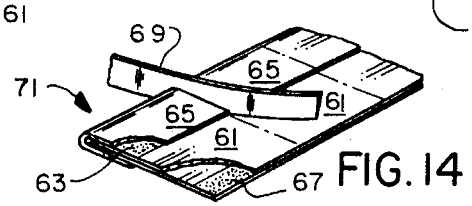
FIG. 14 shows the web of FIG. 13 after it has been folded onto itself and as the severing into individual units is being carried out.

Disclosed in FIGS. 12–14 is a method for making pop-up elements 71 without the attached basepieces in flat-folded condition, which pop-up elements can be distributed as novelty items or the like. More particularly, a continuous web 61, which is preferably printed or otherwise suitably designed to form a series of pop-up elements each including two pop-up panels **62*a* and 62*b*. To the web 61 there is applied a central strip 63 of pressure-sensitive adhesive, as by coating with adhesive from a suitable source, as shown in FIG. 12. Alternatively, the central strip of adhesive can be applied via the use of transfer tape which includes a strip of pressure-sensitive adhesive disposed upon a slightly wider strip of liner material. A continuous liner 65 is then brought into superimposed relationship atop the pressure-sensitive adhesive strip to completely cover it, and the composite strip is preferably rotated 180° in order to reach the orientation shown in FIG. 13 where the liner web 65 is lowermost. In some operations, it may be suitable to apply the strip of pressure-sensitive adhesive to the undersurface of the moving web and then to apply the liner material strip below it. A continuous pattern 67 of permanent adhesive is then applied generally along one edge (or both edges, if desired) of the web 61, and the composite web is then folded in half onto itself along its longitudinal centerline so that the adhesive pattern 67 permanently interconnects the two lateral edges of the original web 61 that will constitute the pop-up panels, as depicted in FIG. 14. Should it be desired to have one portion of the pop-up element, e.g. the panel 62*a* extend past the end of the other panel, e.g. 62*b*, then the line of adhesive is located spaced accordingly from the edge and the fold line is offset accordingly from the longitudinal centerline. The folded web is then severed by a knife blade 69 or the like to create a plurality of structurally identical pop-up elements 71**.

Figure 15:
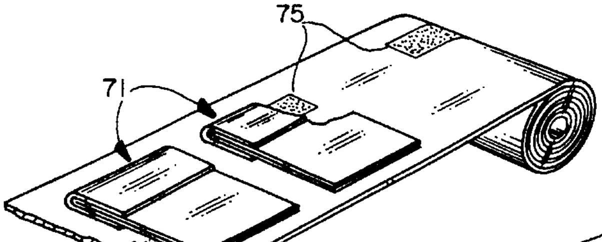
FIG. 15 illustrates how the individual units might be placed onto a carrier web for handling storage and/or distribution purposes.
Figure 16:
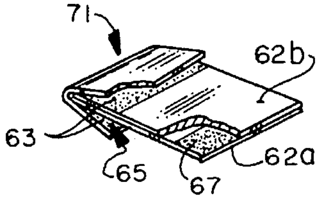
FIG. 16 is a schematic view showing the manipulation of the pop-up element produced in FIG. 15.
Figure 17:
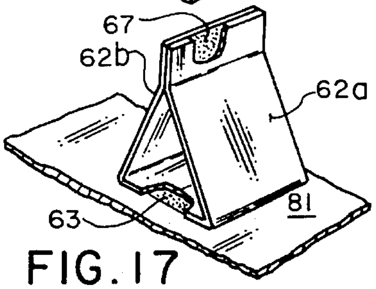
FIG. 17 is a perspective showing how the pop-up of FIG. 16 might be mounted directly upon a surface in three-dimensional form.

If desired for distribution, these units 71 can be mated to a continuous carrier web 73, as depicted in FIG. 15, to which a suitable adhesive pattern 75 is applied using an adhesive that will have a lower bond strength than the adhesive 63 so that the pop-up elements 71 can be readily removed from the web by the recipient when ready for use without peeling the liner 65 from the pop-up panels 62. Thereafter following removal, as shown in FIG. 16, the liner 65 is stripped from the outer surface of the pop-up panels **62*a* and 62*b*, exposing the pressure-sensitive adhesive pattern 63. By handling the pop-up element 71 near its upper edge where the pop-up panels 62*a* and 62*b* are permanently interconnected by the adhesive pattern 67, the recipient can mount the pop-up element directly onto a flat, supporting surface 81, as depicted in FIG. 17, by moving the element 71 perpendicular to the surface so that it opens after the foldline between the panels 62*a*, 62*b* engages the surface and lower portions of the panels carrying the pressure-sensitive adhesive 163 become affixed to the surface 81**.

Figure 18:
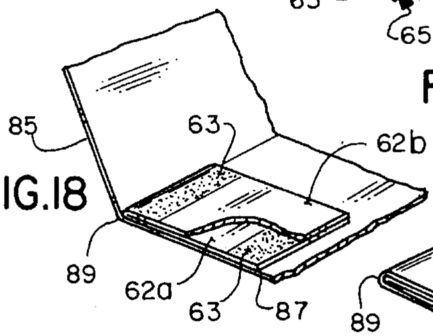
FIGS. 18 and 19 are schematic views showing an alternative way in which the pop-up elements of FIG. 16 can be attached to supporting surfaces.
Figure 19:
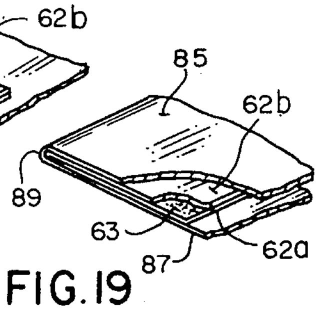

Alternatively, as depicted in FIGS. 18 and 19, following removal of the liner 65, the pop-up element 71 can be inserted between a pair of facing sheets or panels 85, 87 that are associated with each other in generally hinged relationship thereto along a straight hinge line 89. They may, for example, be sections of the same page of a letter folded along a crease line 89. They could also be facing pages of a larger paperboard folder or menu, or they could be adjacent pages of a magazine or book having a common backbone As illustrated in FIG. 18, the pop-up element 71 is located so that the panel 62*a* becomes attached to the surface of the panel 87, and when the panel 85 is folded into superimposed relationship along the hinge line 89, it becomes attached to the other pop-up panel 62*b* by the exposed pressure-sensitive adhesive which it carries. Thereafter, when the panels 85 and 87 are opened, pivoting along the hinge line 89, the pop-up 71 automatically opens and assumes a three-dimensional configuration similar to that depicted in FIG. 17.

Figures 20, 21, 22, 23, 24, 25, 26, 27, 28, 29, 30, 31, 32, 33, 34:
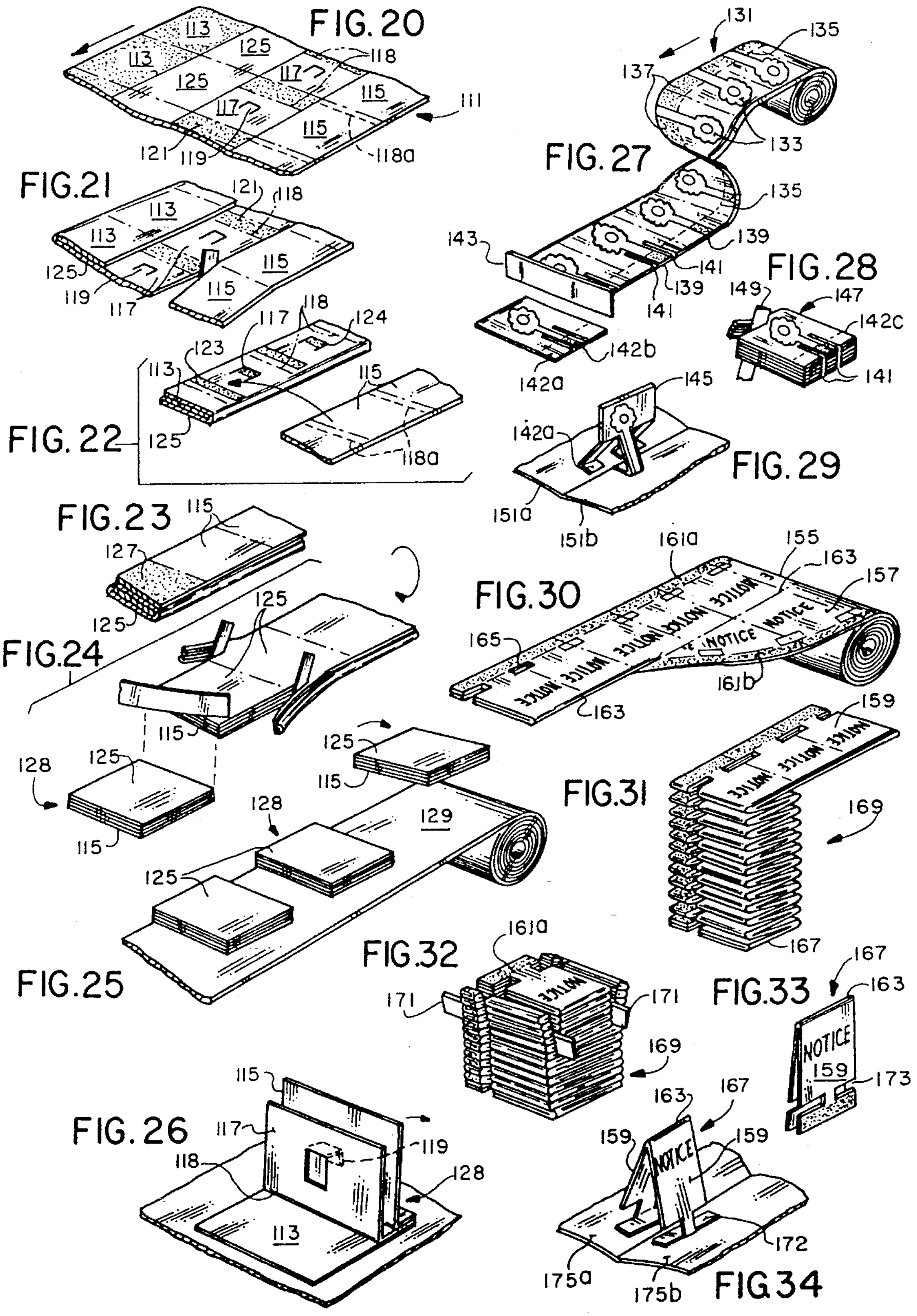
FIG. 20 is a perspective view of a continuous web which has been printed so as to define a series of blanks containing a pair of basepieces, a single pop-up panel and one liner panel illustrating the web following die-cutting and the application of adhesive, which web is useful in the creation of individual pop-up carrying pieces of a further alternative embodiment to those formed from the continuous web shown in FIG. 1.
FIG. 21 is a similar perspective view showing the web of FIG. 20 after it has been folded onto itself and illustrating the severing of a separate ribbon from the main body of the web.
FIG. 22 shows the main web of FIG. 21 after it has been folded a second time and following the application of an adhesive pattern to the upper surface of the twice-folded web.
FIG. 23 shows the superimposition of the severed ribbon onto the upper surface of the twice-folded web.
FIG. 24 is a perspective view showing the composite web as its lateral edges are being trimmed and as a pressure-sensitive adhesive pattern is being applied to the upper surface, followed by the severing of the web into a plurality of individual units.
FIG. 25 shows the rotation of the individual units 180° and their application to a roll of liner material.
FIG. 26 is a perspective view showing one of the pop-up pieces illustrated in FIG. 24 mounted on a horizontal surface in its open or display position.
FIG. 27 is a perspective view of a continuous web which has been printed so as to define a series of blanks each containing a single pop-up unit which web is shown as being manipulated and then severed to create such individual pop-up units.
FIG. 28 is a perspective view showing a stack of pop-up units of the type created in FIG. 27.
FIG. 29 is a perspective view showing one of the pop-up units fabricated in FIG. 27 mounted to a pair of hinged panels which are opened so the pop-up unit is in its display condition.
FIG. 30 is a perspective view of a continuous web which has been printed so as to define a series of blanks each containing a pair of panels which together form pop-up units of still another design.
FIG. 31 shows a segment of the web fabricated in FIG. 30 being fan-folded into a stack of pop-up units.
FIG. 32 shows the trimming of such a stack so as to create a plurality of individual units.
FIG. 33 is a perspective view of one such individual unit from the stack of FIG. 32.
FIG. 34 illustrates the pop-up unit of FIG. 33 attached to a pair of panels that are hinged together.

Disclosed in FIGS. 20–26 is an alternative method for making pop-up units wherein a single pop-up panel is employed and wherein one of the liner panels is fashioned from the continuous web of paper material by the application of appropriate release coating thereto. Shown in FIG. 20 is a continuous web 111, the direction of movement of which is shown by the associated arrow. The web is suitably printed to depict a series of structurally identical blanks, each of which contains four separate panels arranged side by side across the width of the web. A pair of basepiece panels 113 and 115 are located along the two lateral edges of the continuous web 111. A single pop-up panel 117 is arranged adjacent the basepiece panel 115, and a liner panel 125 is located between the basepiece panel 113 and the pop-up panel 117. The basepiece panel 113 is coated with an overall pattern of pressure-sensitive adhesive, as illustrated in FIG. 20, whereas a release coating (not shown) is preferably applied to the region of the web which constitutes the liner panels 125. The portion of the web which constitutes the pop-up panels 117 is preferably scored, perforated, or otherwise suitably treated so as to create a transverse line of weakness 118 and is also die-cut to create a tab 119. A second transverse line of weakness 118*a* is located in each of the basepieces 115. An adhesive pattern 121 is applied to the upper surface of the panels 117 in the region between the line of weakness 118 and the adjacent edge of the blank.

As illustrated in FIG. 21, the first folding step folds the lateral edge of the web 111, which constitutes the basepieces 113, onto the release-coated liner panels 125. As also illustrated, a ribbon is severed from the main portion of the web, which ribbon is that part of the web which constitutes the basepieces 115 lying along the other lateral edge thereof.

Following severing of the ribbon, the portion of the web constituting the pop-up panels 117 is folded onto the once-folded web so that the pop-up panels are superimposed atop the basepiece panels 113, with the adhesive pattern 121 creating a joinder between the respective panels along the trailing edges thereof. Following folding, adhesive patterns are applied to the upper surface of the twice-folded web in the form of a transverse strip of adhesive 123 and a generally rectangular spot 124 of adhesive which is positioned on the die-cut tab 119. The transverse strip 123 extends across the panel in a region which corresponds to the region between the trailing edge of the blank and the transverse line of weakness 118*a* and covers a surface area equal to about half of the area of the region between the trailing edge of the pop-up blank and the line of weakness 118.

Following the application of these adhesive patterns, the severed ribbon containing the basepiece panels 115 is superimposed upon the twice-folded ribbon, as shown in FIG. 23, and if desired, suitable compression can be applied to the composite ribbon to assure good adhesive bonds are created between the pop-up panels 117 and the flanking basepieces 113 and 115 through the adhesive patterns 121, 123 and 124. Then a pressure-sensitive adhesive pattern 127 is applied to the upper surface of the basepieces 115.

Following application of the overall pressure-sensitive adhesive pattern 127, the composite web is then inverted by rotation 180° so that the basepiece panel 115 constitutes the lower surface and the liner panel 125 constitutes the upper surface. As depicted in FIG. 24, the lateral edges of the composite ribbon are trimmed to eliminate the folded interconnections in the twice-folded web, and the composite web is suitably transversely severed into structurally identical individual units or pieces 128.

As depicted in FIG. 25, the units 128 are located in spaced-apart positions along a continuous strip 129 of release-coated paper or the like. Alternatively, the blanks can be appropriately sized, and the composite strip, following trimming, can be severed into individual units 128 by kiss-cutting, as shown in FIG. 11. The strip 129 can be unwound from a roll and can be re-rolled after application of the individual units 128. Alternatively, the strip 129 carrying the individual units 128 can be fan-folded if desired. It is contemplated that it may be desirable to market such pop-up pieces 128 in groups of 10 or 20 or the like, and fabrication in this fashion would facilitate distribution in this manner.

As best seen perhaps in FIG. 26, the adhesive patterns 121 and 123 create a false backbone region between the basepieces 113 and 115 and the pop-up panel 117 allowing the basepiece 115 to be pivoted relative to the basepiece 113, generally along the line of weakness 118*a*, after the completed unit has been removed from the continuous strip 129 and affixed to an appropriate supporting surface, such as upon the upper surface of a horizontal shelf or the like, where the pressure-sensitive adhesive pattern on a basepiece holds it firmly thereto. For example, after the liner panel 125 is stripped from the basepiece 113, the piece 128 can be opened to the position shown in FIG. 26 wherein the pop-up panel 117 is displayed in a three-dimensional configuration between the two basepieces, which results from its attachment via the wide, adhesive pattern 121 to the basepiece 113 and its attachment in the region of the die-cut tab 119 to the basepiece 115. The pressure-sensitive adhesive pattern on the basepiece 113 that was exposed by the stripping of the liner panel 125 and the pressure-sensitive adhesive pattern 127 allow the pop-up piece 128 to be mounted in a fully open three-dimensional configuration by completing the pivoting of the basepiece 115 as depicted by the arrow in FIG. 26. Alternatively, if the piece 128 was affixed to a wall or other vertical surface via the adhesive pattern on the basepiece 113, gravity could be relied upon to maintain it in the open position. Of course, it should be understood that the die-cut pop-up panel 117 could be die-cut to different configurations than that illustrated, which would likewise assume a three-dimensional configuration upon the pivoting of the basepieces.

Disclosed in FIGS. 27 through 29 is a method for making single sheet pop-up elements without attached basepieces which, as a result of their pressure-sensitive adhesive patterns, are adapted to be placed individually between the pages of a pamphlet or book or at the foldline between panels of a personal letter, as generally hereinbefore illustrated with respect to the item fabricated in FIGS. 12–15, as shown in FIGS. 18 and 19. Illustrated in FIG. 27 is a continuous web 131 which is preferably printed in the form of a series of structurally identical pop-up elements 133, each having a line of weakness 135 impressed along the left hand edge to provide attachment panels in that region. Pressure-sensitive adhesive patterns 137 are first applied to the upper surface of each of the individual blanks 133 in these regions along both the leading and trailing edges of each of the individual blanks 133, and, if desired a release coating can be applied in the region therebetween. Following application of the adhesive patterns 137, the continuous web 131 is rotated 180° to facilitate the application of adhesive patterns 139 to the opposite surface; again, if desired, release coatings could be applied in the regions between the adhesive patterns 139 along the edge of the web. However, depending upon the manufacturing equipment available, the adhesive patterns 139, which are shown as being subsequently applied to the opposite surface of each individual blank in a generally central region of the attachment panels, could instead be applied to the underside of the continuous web.

Following the application of the pressure-sensitive adhesive patterns 137, 139 to both surfaces, the web is die-cut to provide a pair of slits 141 extending inward from this lateral edge past the line of weakness 135 thereby providing, in each individual blank, three separate attachment subpanels 142*a, b & c* in the region laterally outward of the line of weakness 135. If desired, additional die-cutting could be carried out at the same time in the region of the printed pattern in the remainder of each of the blanks 133 in order to contour this edge (which becomes the upper edge of the pop-up) to render it more attractive. The continuous web 131 is then severed by a reciprocating or rotary knife blade 143 or the like, as are well known in this art, into a plurality of structurally identical individual pop-ups 145 which are collated into stacks of a desired number, as represented by the reference numeral 147 in FIG. 28. One or more of the edges of the stack 147 can then be trimmed, as by a knife 149 as depicted in FIG. 28, so as to present a stack with a neat edge appearance. Moreover, instead of die-cutting the continuous web, as depicted in FIG. 27, it is also possible to die-cut the completed stack 147 to produce the pair of parallel slits 141 in each individual pop-up element 145.

Adjacent pop-up elements 145 in the stack are held in face-to-face contact with one another by the adhesive patterns 137 and 139 on the opposite surfaces of each individual element. However, if desired, the stack 147 can be made into a more formal pad by the application of padding adhesive along one end surface of the stack, for example either along the upper edge in FIG. 28 where the trimming is shown or along any one of the other edges. The formation of such pads is well known in this art, and if desired, a base sheet could be applied to the undersurface of the stack 147 prior to the application of the padding adhesive.

The individual pop-up elements 145 can then be peeled one by one from the stack 147 and can be used in substantially the same way as the pop-up elements 71, depicted in FIGS. 16–19. If, for example, the pop-up element 145 is inserted between panels or sections of the same page of a letter, generally along a crease line between panels 151*a* and 151*b*, when the letter is opened by the recipient, the pop-up element 145 will assume the three-dimensional configuration shown in FIG. 29, as a result of the joinder of the attachment subpanels 142 of the pop-up to opposite panels 151. More specifically, the central attachment subpanel 142*b* is attached to one panel 151*a* of the letter by the adhesive pattern 139, and the two flanking attachment subpanels 142*a* and 142*c* are attached by the adhesive patterns 137 to the adjacent panel 151*b* of the letter.

Depicted in FIGS. 30–34 is still another method for making pop-up elements that can be distributed as novelty items without attached basepieces. Shown is a continuous web 155 which is preferably printed in the form of a series of rectangular blanks 157 that will create structurally identical pop-up elements, each in the form of two hinged-together pop-up panels 159. A continuous adhesive pattern is applied along both lateral edges of the continuous web 155, with the pattern along the left hand edge carrying the reference numeral 161*a* and the pattern along the right hand edge carrying the reference numeral 161*b*. The adhesive is pressure-sensitive adhesive that will adhere strongly to the paperboard or other sheet material which constitutes the web 155 and that will only lightly adhere to itself. Such adhesives are readily available from adhesive formulators throughout the U.S. Following the application of the two pressure-sensitive patterns, the web 155 is folded in half along a centerline depicted, for reference purposes, by the dot-dash line 163 in FIG. 30. This line thereafter constitutes the foldline 163 between the separate panels 159.

The folded web is then die-cut to remove generally rectangular sections which are given the reference numeral 165 in FIG. 30 and which are located just laterally inward from the adhesive patterns 161 that were applied along the two edges of the continuous web. Each of the die-cut regions extends forward and rearward into adjacent blanks 157.

As depicted in FIG. 31, following the die-cutting operations, the once-folded web is then fan-folded so as to create stacks of individual pop-up elements 167, each having the appropriate number of individual units that it is desired to market as a composite stack or pad. For example, one way of accomplishing this end is to sever the continuous web transversely in sections of 25 units each, and fan-fold these 25-unit strips as shown in FIG. 31 to create a vertical stack 169. As depicted in FIG. 32, the completed stack 169 is then trimmed along both side edges by a suitable trimming knife means 171 to eliminate the interconnections along the trailing and leading edges of the adjacent blanks 159 and to thereby create a stack of 25 individual pop-up elements 167. Each of the elements remains detachably joined to the adjacent element through the face-to-face contact of the adhesive patterns 161*a* and 161*b*. If desired, a padding adhesive can be applied, preferably along the edge surface of the stack 169 where the adhesive patterns 161 are located, as explained hereinbefore with respect to the stack 147, depicted in FIG. 28.

When an individual pop-up element 167 is peeled from the stack 169, it constitutes a pair of hinged-together panels 159, each of which has a depending subpanel 172 carrying the pressure-sensitive adhesive pattern 161, which subpanel is connected thereto by a narrow neck 173 formed by the die-cutting operation that removed the rectangular sections 165. The pop-up element 167 is ready for insertion between the facing surfaces of two hinged-together pages 175*a* and 175*b* of a pamphlet or the like or between adjacent panels of a folded personal or business letter; attachment is made upon contact with the depending attachment panels via the pressure-sensitive adhesive patterns 161 which retain sufficient tack to strongly adhere to the usual paper materials. As depicted in FIG. 34, when the hinged-together panels 175*a* and 175*b* are spread apart, the pop-up element 167 assumes three-dimensional configuration with the panels 159 pivoting relative to each other along the hinge line 163.

Figure 35:
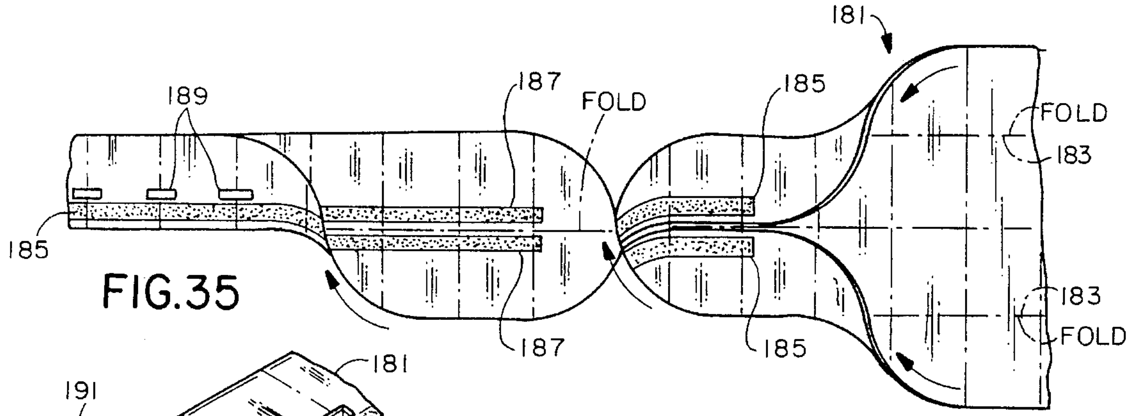
FIG. 35 is a plan view of a continuous web, shown somewhat schematically, which web has been printed so as to define a series of double blanks, each blank being designed to form a pop-up unit including a pair of panels similar to those units depicted in FIG. 33.

Shown in FIG. 35 is a continuous web 181 which is preferably printed in the form of a series of rectangular blanks that will each create two structurally identical pop-up elements each in the form of hinged-together pop-up panels. The web is folded along a pair of foldlines 183 so that each of the edge portions is folded over into superimposed relationship with the underlying adjacent central portion of the web. Upon completion of this first folding step, a pair of parallel lines 185 of pressure-sensitive adhesive are applied to the upper surface of the folded portions in flanking relationship to the centerline of the web.

Figure 36:
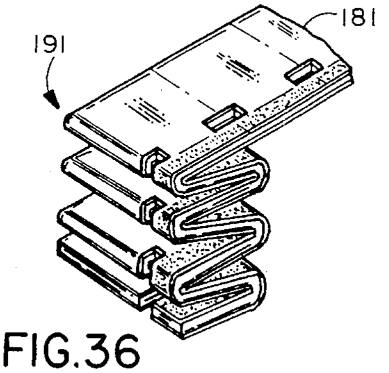
FIG. 36 is a perspective view, similar to FIG. 31, showing the continuous web of FIG. 35 being fan-folded.

Following the application of these two adhesive strips 185, the web is rotated 180°, and an additional two parallel strips 187 of pressure-sensitive adhesive are applied to what was the original undersurface of the web, again flanking the centerline. A second folding operation is then effected so as to further fold web 181 along its centerline to create an assemblage that is four layers thick. The pressure-sensitive adhesive that is used is similar to that used in the method described with respect to FIGS. 30–34 which adheres strongly to the sheet material but only lightly to itself. The web is then die-cut to remove generally rectangular sections given the reference numeral 189 in FIG. 35. Thereafter, the web is then fan-folded as depicted in FIG. 36 to create a stack 191 of these individual pop-up elements 192, with each blank of the original continuous web providing two such elements.

Figure 37:
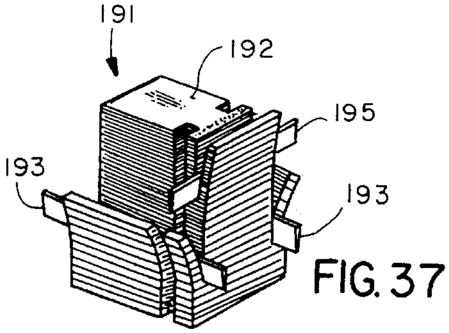
FIG. 37 is a perspective view, similar to FIG. 32, showing a stack (formed from a predetermined length of the web of FIG. 36) being severed to create a stack of individual pop-up units.

Once a stack 191 of the desired number of elements have been formed, the final cutting operation is effected, as depicted in FIG. 37, using suitable knives 193 and 195. Cutting along both side edges of the stack 191 by the knives 193 eliminates the interconnection of adjacent pop-up elements 192 along the foldlines that were created by the fan-folding operation, and the trimming along the bottom edge by the knife 195 eliminates the original foldline along the centerline of the web along which one panel of each of the two elements from each blank were originally joined. Once the trimming operation depicted in FIG. 37 is completed, the stack of pop-up elements is substantially indistinguishable from that produced in FIG. 32.

Figure 38:
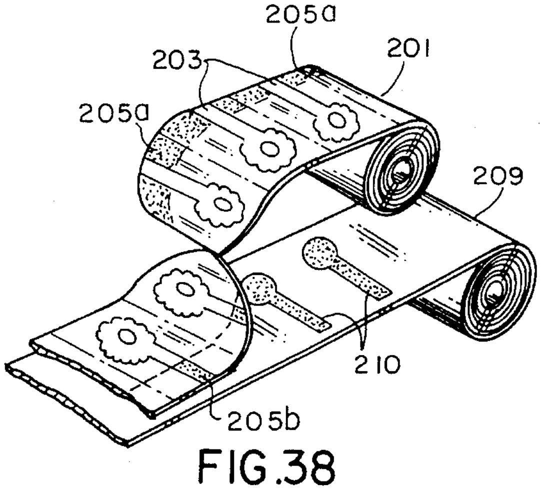
FIG. 38 is a perspective view of a continuous web which has been printed to define a series of blanks each containing a single pop-up unit generally similar to that shown in FIG. 27 being superimposed upon another continuous web.
Figure 39:
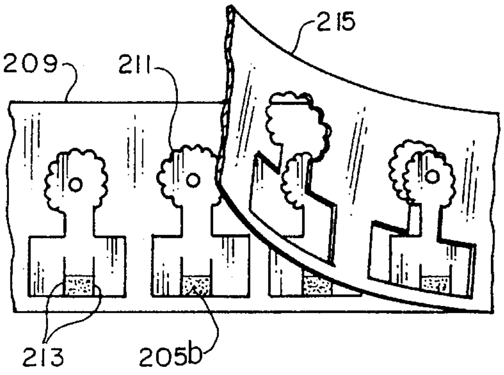
FIG. 39 is a view enlarged in size of a portion of the composite web produced by the method illustrated in FIG. 38 with the scrap portion being stripped therefrom.

Shown in FIG. 38 is an alternative method of making the pop-up elements of single sheet thickness of the type generally depicted in FIGS. 27–29. A generally similar continuous web 201 of sheet material, printed on both sides, is provided which is printed to constitute a series of individual blanks 203 that will form structurally identical pop-up elements. Pressure-sensitive adhesive patterns **205*a* are first applied on one surface of the web to the regions of the web which will constitute a pair of attachment subpanels. The web is then rotated 180°, and adhesive patterns 205*b* are applied to the opposite surface in the region of the single attachment subpanel. Instead of then die-cutting the web 201 as was done in the method depicted in FIG. 27, the web 201 is laid atop a continuous web 209 of carrier material to which patterns of pressure-sensitive adhesive 210 are strategically applied to coincide with the center of each blank. In some instances, depending upon the size of the pop-up element 211, the additional adhesive pattern 210 may be unnecessary, for it may be possible to rely upon the patterns 205*a* to secure the elements in place on the carrier web 209**.

A kiss-cutting operation is then carried out similar to that depicted in FIG. 7. As a result of this kiss-cutting operation, the entire outline of the desired pop-up element 211 is effected by cutting through the single thickness of the printed web material 201 but not cutting into the liner material web 209. At the same time, parallel die-cuts 213 which extend upward from the base of the pop-up element 211 are simultaneously created. Thereafter, the scrap portion 215 of the continuous printed web is stripped therefrom, leaving a plurality of spaced-apart individual pop-up elements 211 attached by the pressure-sensitive adhesive patterns 210 and **205*a* to the underlying continuous web of liner material 209. The liner material 209 might then be severed to create strips of predetermined length each containing the desired number of pop-up elements 221 which are to be marketed as a unit; such strips can then be rolled so that the pressure-sensitive adhesive patterns 205*b* on the upper surface of the pop-up elements 211** are protected by the adjacent undersurface of the liner material strip. Thus, such rolled strips carrying the desired number of pop-up elements can be packaged and marketed in this fashion.

Figure 40:
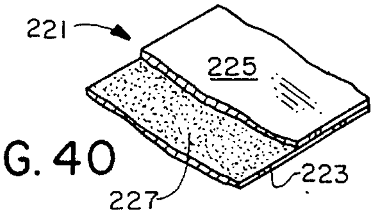
FIG. 40 is a fragmentary perspective view through a web of material that comprises a pair of separate sheets interconnected by a layer of pressure-sensitive adhesive material.

FIG. 40 illustrates composite web material 221 which is commercially available and which consists of two individual sheets 223, 225 with a relatively thick layer 227 of pressure-sensitive adhesive sandwiched therebetween. If desired, such composite 3-layer web material could be formed as a part of an overall operation. The adhesive 227 preferably adheres equally to both of the facing surfaces, and in such an instance, when a portion of either sheet is removed, a partial layer of pressure-sensitive adhesive will adhere to the surface of the removed portion as well as to the now-exposed surface of the underlying sheet. Alternatively, for the construction of certain pop-up elements, it may be desirable that one of the sheets, e.g. the sheet 225 be treated with a release coating so the adhesive will preferentially adhere to the other sheet, e.g. sheet 223. If such a composite is not readily available, it can be fabricated as mentioned above. Moreover, it is feasible that a single web of suitable width could be split in half, with one-half being coated with a release material and dried before mating with the other one-half to which the pressure-sensitive adhesive is applied.

Figure 41:
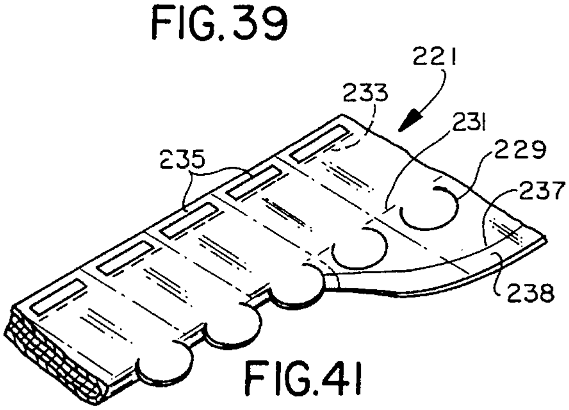
FIG. 41 is a perspective view, enlarged in size, of a continuous web of the material illustrated in FIG. 40 which has been printed so as to define a series of blanks each containing a pair of pop-up elements, which web is being kiss-cut, die-cut and manipulated so as to fabricate individual pop-up elements therefrom.

As depicted in FIG. 41, a continuous web of such material 221 is printed so as to provide a series of rectangular blanks, each of which constitutes a pop-up element in the form of a pair of panels which will ultimately remain hinged together along a line of weakness down the longitudinal centerline of the web. A die-cutting operation is effected so as to die-cut the image of a circular head 229 completely through the entire composite web. At the same time, a line of weakness 231 is created in the region of the blank along the centerline of the web, which is interrupted by the neck of each die-cut head. Optionally, one or two parallel lines of weakness 233 can be created in the web near the lateral edges thereof to create distinct subpanels if desired. In addition, a kiss-cutting operation is carried out on the web so as to create a removable rectangular panel 235 in the upper sheet 225 in the region of one of the subpanels and to create a straight-line cut 237 through the upper sheet to define a second removable rectangular cover panel 238 adjacent the opposite edge of the moving web, which can be in addition to or in lieu of creating a line of weakness at the same location. If the sheet material from which the sheet 225 is formed is relatively thick, it may be desirable to kiss-cut a pair of straight-line cuts 237 rather than one and a rectangular panel. Thereafter, the web is folded along the centerline so that the pop-up element panels are superimposed upon each other, and the folded web is then severed transversely to create individual pop-up units 239 (see FIG. 42).

Figure 42:
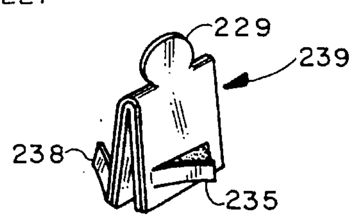
FIG. 42 is a perspective view of one such pop-up element as various subpanels are being peeled therefrom to expose the underlying pressure-sensitive adhesive which will then allow the pop-up element to be secured in place between a pair of hinged panels.

As depicted in FIG. 42, manual removal of the cover panel 235 created by the kiss-cutting exposes the pressure-sensitive adhesive region on the underlying surface of the interior sheet 223, and removal of the cover panel 238 likewise exposes the adhesive-covered subpanel of the sheet 223. These exposed adhesive regions allow the pop-up unit 239 to be readily secured between the surfaces of a pair of facing panels of a letter or the pages of a book, as explained hereinbefore with respect to the pop-up unit 167 illustrated in FIG. 33.

Figure 43:
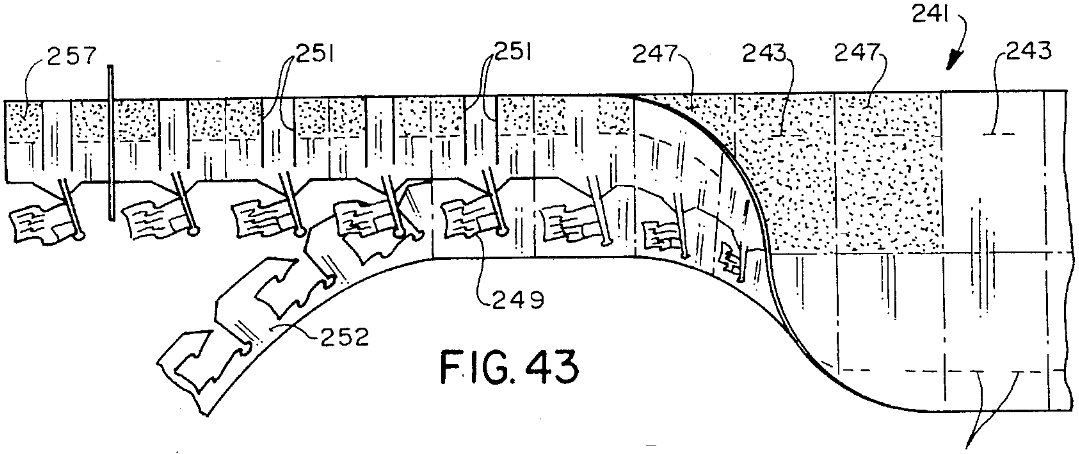
FIG. 43 is a schematic view of still another continuous web which has been printed to define a series of blanks each containing a pair of pop-up elements which is being subjected to several die-cutting operations and an adhesive application step as a part of its fabrication into pop-up elements.

Disclosed in FIG. 43 is a continuous web 241 of sheet material that has been printed so as to constitute a series of blanks each in the form of a pair of pop-up panels located on opposite sides of the centerline of the web. A die-cutting operation is first performed so as to create perforations 243, 245 in regions to eventually define subpanels, which perforations extend along lines parallel to the direction of travel of the web. The upper surface of each pop-up element panel along the upper half of the web (FIG. 43) is then coated overall with a layer of pressure-sensitive adhesive 247; alternatively a smaller pattern of adhesive could be applied to cover key regions. The web is then folded to superimpose the panels upon each other and sandwich the layer of pressure-sensitive adhesive between the folded web. The pressure-sensitive adhesive is such that some of the adhesive will adhere to both facing surfaces of the folded web so that, as in the material depicted in FIG. 40, when a portion of one sheet is removed, there will be pressure-sensitive adhesive remaining, now exposed, on the surface of the underlying portion of the pop-up element.

Figure 44:
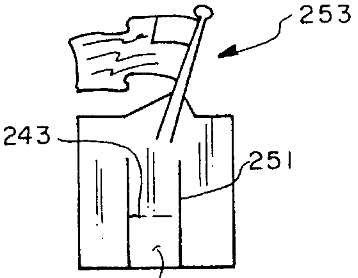
FIG. 44 is a rear view of one of the pop-up elements fabricated by severing from the web illustrated in FIG. 43.
Figure 45:
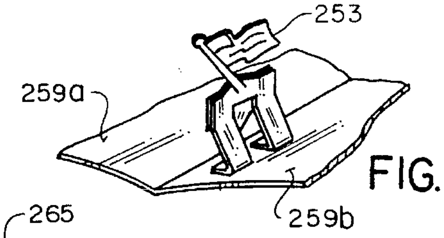
FIG. 45 is a perspective view showing the pop-up element of FIG. 44 in display position between a pair of hinged panels.

Following the folding operation, a die-cutting operation is carried out so as to die-cut the figure 249 of a flag and flagpole along one edge of the folded web creating a strip of waste 252 and to die-cut a pair of parallel lines 251 transverse to the direction of travel of the web extending inward from the opposite edge of the web 241. Waste 252 from the die-cutting of the flag figures is stripped away using any suitable state-of-the-art method of waste removal, and the web is then severed to create individual pop-up elements 253, as depicted in FIG. 44. If it should be desired to balance waste removal for manufacturing efficiency, a waste strip could also be used along the opposite lateral edge of the folded web. The pair of die-cut lines 251 and the perforations 243 create a single removable panel 255 on the rear surface of the unit, and the die-cut lines and the perforations 245 create two removable panels 257 on the front surface of each element, as seen in FIG. 43. Removal of these three panels exposes the pressure-sensitive adhesive and readies the pop-up element 253 for insertion between facing surfaces of a pair of hinged panels, for example, the folded portions **259*a,b* of a business letter or the like. When the letter is opened, as depicted in FIG. 45, the pop-up element 253** automatically assumes its three-dimensional display orientation.

Figure 46:
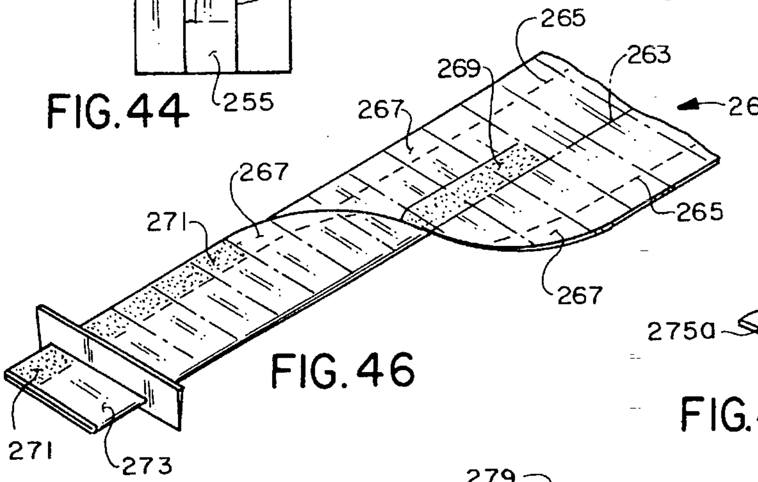
FIG. 46 is a perspective view of yet another continuous web which has been printed to define a series of blanks each containing a pair of panels which are subjected to a series of steps to apply adhesive and create lines of weakness before being severed into individual pop-up elements.

Illustrated in FIG. 46 is a continuous web 261 of sheet material that has been printed or otherwise suitably designed so as to constitute a series of rectangular blanks, each in the form of a pair of pop-up panels located on opposite sides of the centerline 263 of the web, which blanks are preferably designed to form single pop-up elements of generally structurally identical construction, which could however be printed with different designs or die-cut in slightly different fashion, if desired. Preferably, a pair of lines of weakness 265 are impressed in the continuous web, spaced inward from its lateral edges, to create subpanels 267. At about the same time, a strip of permanent adhesive 269 is preferably laid down adjacent the centerline, which adhesive is designed to cause permanent adherence between the facing portions of the two hinged panels. The web is then folded along the centerline 263 to bring the pop-up panels into superimposed position, creating this permanent adhesive bond.

Following the folding step, strips of pressure-sensitive adhesive 271 are applied to the outer surfaces of both subpanels 267. The application can be made simultaneously upon the upper and lower surfaces of the continuously moving web. Alternatively, the adhesive strip 271 can be applied to the upper surface of the web, and the web then rotated 180° before a similar adhesive strip is applied to the upper surface of the other subpanels 267. As a further alternative, a pressure-sensitive adhesive strip could be applied initially along both edges of the continuous web 261, and the web could then be rotated 180° prior to the application of the permanent adhesive strip 269.

Following the application of the pressure-sensitive adhesive strips 271, the web can be severed into individual units 273 which are then applied to a carrier web as generally illustrated in FIG. 15, or accumulated in a stack as described hereinbefore with respect to the embodiments shown in FIGS. 27 and 28, or handled in any other way as described hereinbefore; alternatively, the web can be cut into multiple unit lengths that are fan-folded, as previously described in detail with respect to FIG. 31, and then severed into individual units by trimming. The pressure-sensitive adhesive should be such that it will adhere strongly to the web material but will only adhere lightly to itself when it is intended that the pop-up elements 273 are to be distributed in a stack. When one of the pop-up elements is removed from such a stack and placed between facing panels **275*a*, 275*b* of a business letter or the like, the pressure-sensitive adhesive 271 attaches the pop-up element subpanels 267, respectively, to one of the facing panels of the letter, and when the letter is opened, as shown in FIG. 47, the pop-up element 273** automatically assumes its three-dimensional display orientation.

Figure 47:
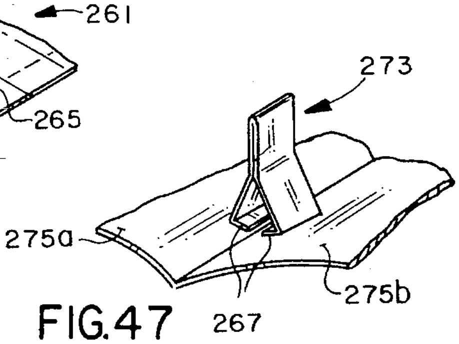
FIG. 47 is a perspective view showing the pop-up element of FIG. 46 in display position between a pair of hinged panels.
Figure 48:
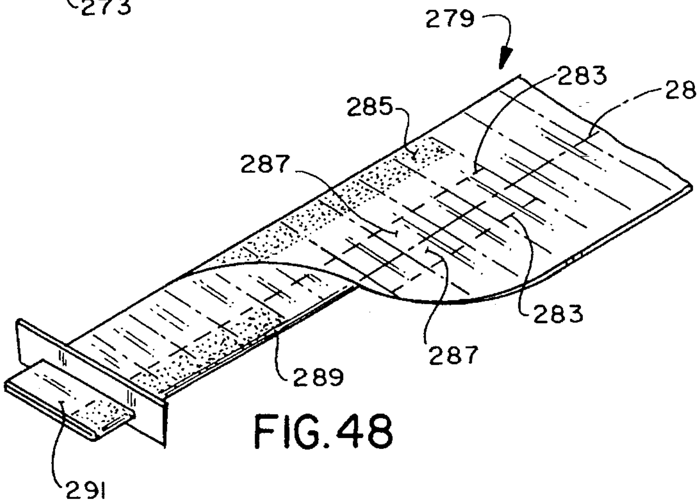
FIGS. 48 and 49 are similar to FIGS. 46 and 47, respectively, showing the fabrication of an alternative embodiment of the pop-up element to that illustrated in FIG. 47.

Illustrated in FIG. 48 is a continuous web 279 of sheet material that has been printed or otherwise designed to constitute a series of rectangular blanks, each in the form of a pair of pop-up panels located on opposite sides of the centerline 281, which panels are designed to form pop-up elements generally similar to that depicted in FIG. 47 but of a slightly different construction. They could also be die-cut in slightly different configurations if desired. A pair of lines of weakness 283 are preferably impressed in the web 279 in flanking relationship to the centerline 281, and a strip of permanent adhesive 285 is preferably applied along one edge of the web. The lines of weakness create subpanels 287 lying on opposite sides of the centerline 281. The web is then folded in half along the centerline 281 so as to superimpose one panel of each blank atop the other, using a "banana finger" as known in this art to achieve folding precisely along the longitudinal centerline. As a result of the folding, the lateral edges of the web become adhered to each other via the permanent adhesive strip 285. Thereafter, strips of pressure-sensitive adhesive 289 are applied to the upper and lower surfaces of the web in the regions of the subpanels 287. As explained with respect to FIG. 46, the strips 287 can be applied simultaneously to the upper and lower surfaces of the moving web, or one can be applied first before the other, with a 180° rotation of the web taking place in between. They might possibly be applied to the undersurface of the web prior to the folding operation. The folded and glued web can then be cut into individual units 291 or can be cut into multiple units, as explained hereinbefore, which units may be distributed as a stack or in some other suitable arrangement.

Figure 49:
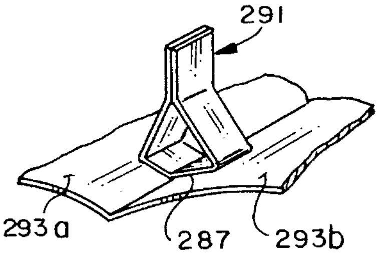

When one of the pop-up elements 291 is peeled from such a stack and placed between the panels **293*a*, 293*b* of a letter, or between the pages of a pamphlet, a book or the like, the subpanels 287, which remain hinged together along a fold-line that was originally the centerline 281 of the web, become adhered to the facing panels 293*a*, 293*b* via the pressure-sensitive adhesive patterns 289. When the letter is opened, as depicted in FIG. 49, the pop-up element 291** automatically assumes its three-dimensional display orientation.

Figure 50:
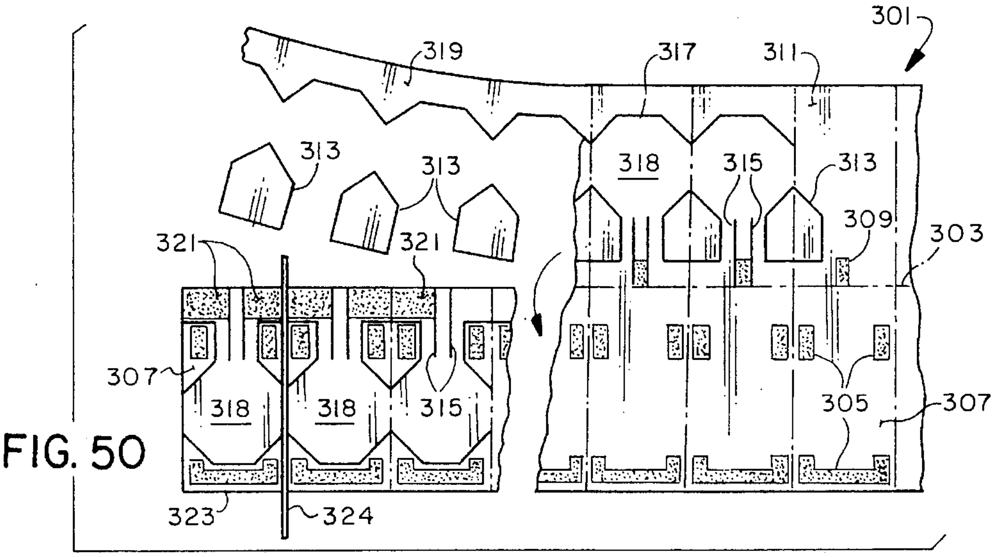
FIG. 50 is a plan view of a continuous web which has been printed to define a series of structurally identical blanks each containing one basepiece and one pop-up element which is shown being subjected to a series of steps of die-cutting, adhesive application, scrap removal, folding and severing as a part of its fabrication into pop-up units.

Illustrated in FIG. 50 is a continuous web 301 of sheet material that has been printed so as to constitute a series of rectangular blanks, each of which blanks includes one pop-up element and one basepiece, on opposite sides of the centerline 303 of the web. A peripheral pressure-sensitive adhesive pattern 305 is applied in the form of three separate spaced locations located generally along the periphery of the basepiece panel 307 of each blank. A single adhesive pattern 309 is applied to the pop-up element panel 311 of the web at a location generally adjacent the centerline 303 which is preferably of permanent adhesive but could be of pressure sensitive adhesive that would create a strong bond. Die-cutting is carried out so as to die-cut a series of spaced pentagons 313 along the centerline of the web, to create a pair of parallel lines 315 between these pentagons, and to create a contoured edge 317 inward of the upper edge of the web, as depicted in FIG. 50, defining a series of pop-up elements 318 therein. Following the die-cutting operation, the die-cut pentagons 313 and the upper edge portion 319 of the web may be removed as scrap before the die-cut upper half of the web is folded along the centerline 303 so as to lie upon the lower half of web which carries the peripheral pressure-sensitive adhesive pattern 305. Alternatively, the folding step may be carried out before the removal of the die-cut pentagons to facilitate folding; however, so long as the pentagon die-cuts are spaced about an inch or more from the centerline 303, it should be possible to fold without difficulty using state-of-the-art methods. Once the folding operation is completed, the permanent adhesive pattern 309 aids in retaining the folded web in this condition.

Following folding, pressure-sensitive adhesive patterns 321 are applied to what is now the upper surface of the folded pop-up element 318 in the regions just flanking the die-cut lines 315 and generally adjacent the centerline 303. The adhesive 321 preferably is such as to create a stronger bond than the peripheral adhesive pattern of the pressure-sensitive adhesive 305 which lies outward of the boundary of the die-cut pop-up element 318. The folded web can be then severed by a knife blade 324 into individual units 323 each including one basepiece 307 and a superimposed pop-up element 318. The units 323 can be distributed attached to a carrier web similar to the arrangement shown in FIG. 15, or a web of release-coated material could be superimposed onto the individual units as they are severed using the pressure-sensitive adhesive patterns to effect joinder. They may also be distributed arranged in a stack or in any other suitable manner as hereinbefore described. Alternatively, it might be most efficient to apply the folded web to a carrier web and then carry out the severing into individual units by kiss-cutting as shown in FIG. 7.

Figure 51:
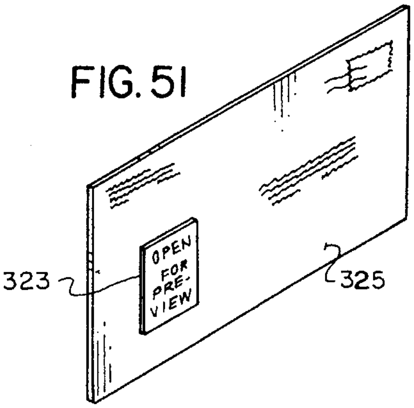
FIG. 51 is a perspective view, reduced in size, showing one of the pop-up units from FIG. 50 having been applied to the front face of a mailing envelope.
Figure 52:
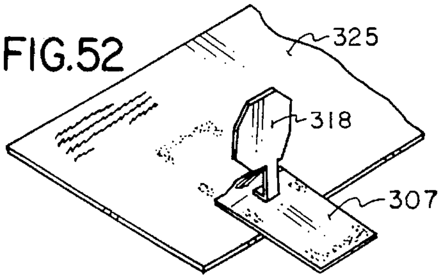
FIG. 52 is a fragmentary perspective view of the envelope depicted in FIG. 51 with the pop-up unit fully opened in its display position.

The pop-up unit 323 can be applied to any suitable supporting surface, for example to the front panel of an envelope 325, as depicted in FIG. 51. When the recipient opens the unit by grasping the upper edge and pulling it downward, the weaker pressure-sensitive adhesive pattern 305 is broken, allowing the basepiece 307 to be folded downward, pivoting along the hinge line that was originally the centerline 303 of the web. The pressure-sensitive adhesive patterns 321, which most preferably have a semi-permanent bond which is stronger than the adhesive 305, remain attached to the front surface of the envelope 325, as depicted in FIG. 52. Thus, the patterns 321 and the permanent adhesive bond 309 between the central portion of the pop-up element and the basepiece 307 causes the pop-up element 318 to assume an upstanding three-dimensional configuration.

Figure 53:
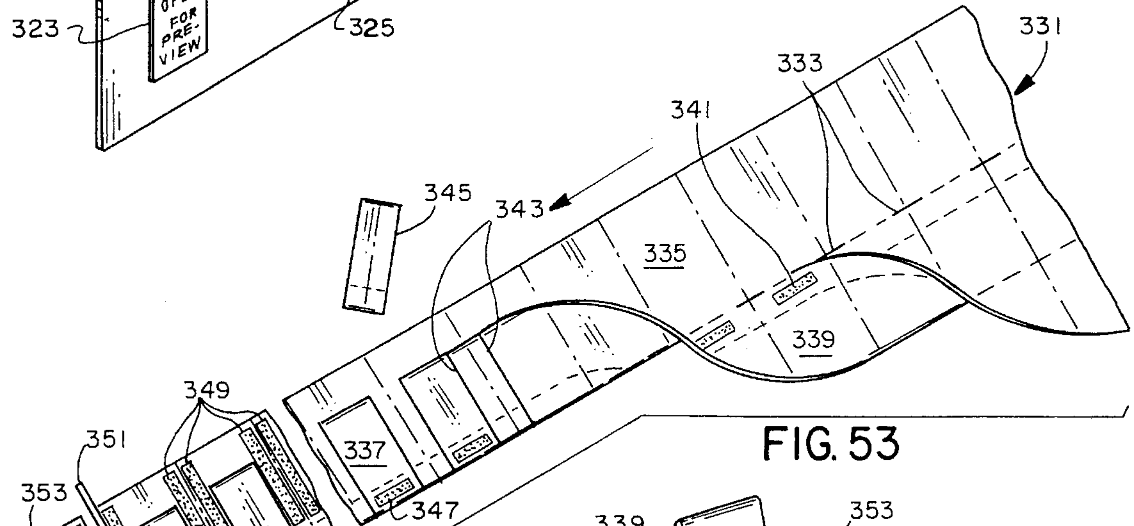
FIG. 53 is a view similar to FIG. 50 of a continuous web which has been printed to define a series of structurally identical blanks for forming an alternative embodiment of units of the type shown in FIG. 52.
Figure 54:
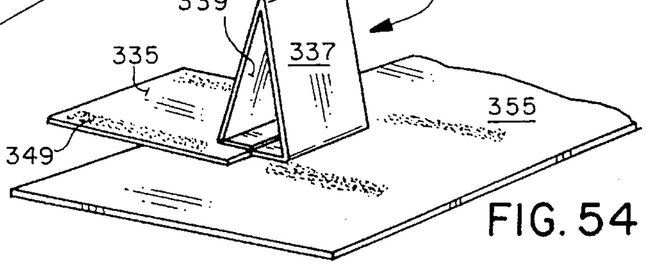
FIG. 54 is a view similar to FIG. 52 of a pop-up unit made from the web shown in FIG. 53.

Illustrated in FIG. 53 is a continuous web 331 of sheet material that has been printed so as to constitute a series of side-by-side rectangular blanks, each of which includes a single basepiece and a pair of panels that will constitute a pop-up element. The continuous web, which is moving in the direction of the arrow, is first die-cut to produce a series of spaced-apart die-cuts 333 which are located in the blank at the junction between the basepiece panel 335 and the remainder of the blank which constitutes the pop-up element. The lower or left hand portion of the web, as viewed in FIG. 53, is then folded along the centerline of the pop-up element portion of the blank to create pop-up panels 337 and 339 of substantially equal dimension which are superimposed one atop the other. An adhesive pattern 341 of permanent-type adhesive is then applied to the pop-up panel 339 generally along its free edge.

The web 331 is then folded again along a longitudinal line defined by the series of die-cuts 333 to superimpose the pop-up element portion atop the basepiece portion of the web. The twice-folded web is then kiss-cut so as to cut through only the two thicknesses of the pop-up element portion thereof along parallel lines 343 that are spaced apart a distance equal to the length of the die-cuts 333 and aligned therewith. The generally rectangular, folded, scrap portions 345 created by the kiss-cutting are suitably removed using state of the art methods. A pressure-sensitive adhesive pattern 347 of relatively strong bond strength is then applied to the upper surface of the pop-up portion of the web, and an adhesive pattern 349 of pressure-sensitive adhesive having a weaker bond strength is applied to the portions of the basepiece which become exposed by the removal of the rectangular kiss-cut sections. Finally, the web is cut along parallel lines between the individual blanks using a suitable knife blade 351 or its equivalent to create individual pop-up units 353. Alternatively, these individual pop-up units 353 which are created from the continuous web 331 can be severed from one another, handled and distributed in any of the ways described above with respect to the pop-up units illustrated in FIGS. 50–52.

The individual pop-up units 353 may be designed to be applied to the front of an envelope 355 or the like with the hinge line at the top and with the free edge of the basepiece 335 at the bottom. When the free edge of the basepiece is lifted, the weaker bonds of the pressure-sensitive adhesive patterns 349 part, releasing the basepiece 335 from direct contact with the outer surface of the envelope 355. The bond strength of the stronger pressure-sensitive adhesive pattern 347 secures the pop-up panel 337 to the face of the envelope along its upper edge, causing the basepiece 335 to pivot along the fold line created between the spaced-apart die-cuts 333. The permanent adhesive bond created by the adhesive pattern 341 between the facing surface of the basepiece and the pop-up panel 339 pulls one-half of the folded pop-up element toward it, causing the pop-up element to assume a three-dimensional configuration. If desired, lines of weakness can be impressed or otherwise added to the continuous web at an appropriate time, for example at about the time of the die-cutting step, in locations adjacent the edges of the adhesive patterns 341 and 347 so as to create more distinct subpanels and provide a sharper, overall appearance.

Illustrated in FIGS. 55–57 is an alternative mass production method for making pop-up elements 401 having some similarity to those made by the method of FIG. 48. Shown is a continuous web of sheet material 403 that has been printed on one side or otherwise suitably designed to constitute a series of rectangular blanks, each of which is designed to form a structurally identical pop-up element 401 generally similar to that shown in FIG. 49. FIG. 56 shows the normal orientation in which the method might likely be run, and FIG. 55 is a view of the same method as seen from below which better illustrates certain features. As best seen in FIG. 57, the mass production method is designed to produce a pop-up element 401 having an upper flag section 405, which is the attention-getting portion of the pop-up element and which is of only a single thickness for most of its area. The flag section is supported by a base section 407 in the form of a plurality of subpanels 409*a* and *b* and 411*a* and *b*, the lowermost two of which carry pressure-sensitive adhesive so as to adhere to a supporting surface. As indicated previously, the supporting surface can be adjacent panels 413*a* and 413*b* of a folded letter, the pages of a book, or any relatively flat surface from which it might be desired to have the pop-up element 401 extend upwardly in attention-attracting fashion.

A plurality of lines of weakness are preferably impressed in the continuous web 403 as it travels through the press. These lines of weakness include a center line 415, which will become the folded bottom edge of the series of pop-up elements, and two pairs of spaced-apart lines which flank the center line of weakness and define what will become the individual hinged-together subpanels 409, 411 of the supporting base. More specifically, lines 417*a* and *b* are spaced closest to and equally apart from the center line 415 and define the pair of lowermost or bottom subpanels 411 which will, in the completed environment, carry the pressure-sensitive adhesive. The two lines 417*a* and 419*a* and the two lines 417*b* and 419*b* respectively define the intermediate or oblique subpanels 409*a* and b which interconnect the bottom panels 411 and the flag section 405 of the pop-up element 401. In addition, there is defined, between the line 419*a* and the edge of the web, a flange or joinder panel 421 that will become affixed to the rear surface of the flag section 405 of the pop-up element and thus create a lower, double thickness section in the flag panel.

Pressure-sensitive adhesive is efficiently applied to the appropriate surfaces of the pair of adjacent bottom subpanels 411 by means of laminating a thin continuous strip of transfer tape 423 to the undersurface of the continuous web 403 (FIG. 55 showing this step in inverted orientation). The transfer tape 423, carrying a desired adhesive pattern 425 on one surface, is aligned so that its centerline is precisely positioned so as to be in alignment with the center line of weakness 415, and it is of such a width that its total width is equal to the width of the pair of subpanels 411 which constitute the bottom two subpanels of the supporting base 407. The transfer tape 423 is made of sheet material that is coated with a release coating so that the pressure-sensitive adhesive which it-carries will preferentially adhere to the surface of the continuous web 403; accordingly, when the transfer tape 423 is removed from contact with the web (in the eventual pop-up element 401), the pressure-sensitive adhesive remains, precisely positioned as desired to support the pop-up element 401 in its intended attention-attracting orientation. Alternatively, if desired, the lines of weakness are not impressed in the continuous printed web 403 until the lamination with the transfer tape 423 has been effected; in such instance, when the lines of weakness are impressed in the web 403, the central line 415 is simultaneously impressed in the transfer tape 423. Moreover, the width of the transfer tape 423 can, if desired, be just slightly greater than the pressure-sensitive adhesive pattern which, as indicated above, preferably matches the width of the pair of subpanels 411 to which it is intended to transfer; however, a slightly narrower transfer tape is preferably employed which carries a pressure-sensitive adhesive pattern 425 completely across its width, thus eliminating any uncoated short edge regions.

Following the impression of the lines of weakness, a strip of bonding adhesive 427 is applied (see FIG. 56) to the upper surface of the web 403 in the region between the line 419*a* and the edge of the continuous web, i.e., onto the region of the web which constitutes the flange panel 421 that becomes bonded to the flag section 405 of the pop-up element. Following application of the bonding adhesive 427, the continuous web 403 and the laminated strip 423 carrying the pressure-sensitive adhesive 425 is folded along the line 415 so as to superimpose one-half of the base section 407 upon the other and to superimpose the flange panel 421 on the rear surface of the flag section 405 of the pop-up. The folding of the continuous web assembly can be done using a plow-banana finger combination or the like as known in the art to achieve precise folding along the desired line.

The continuous web is then die-cut along a contour line 429 to create the individual pop-up elements 401 each including an upper flag section 405 and a lower base section 407. In the illustrated embodiment, the die-cutting is such as to constitute a perforation cut which leaves the pop-up element 401 still connected to the remainder of the web by a plurality of short easily broken bridges of fibrous material.

The folded and die-cut web can then be handled in any of the manners hereinbefore illustrated. For example, it could be fan-folded as illustrated in FIG. 36 and then optionally trimmed to create a stack of individual units; it could be rolled into a coil of a predetermined number of pop-up elements; or it might be cut into strips of a plurality of units, for example 5 each, which are distributed in that form. Individual pop-up elements 401 could also be removed totally from the remainder of the web and applied to a carrier web as illustrated with respect to FIG. 25.

A pop-up element 401 is removed from the web by breaking the short bridges remaining in the lines of perforation to prepare it for use. The remaining portion of the folded transfer tape 423 is peeled from the pressure-sensitive adhesive bearing subpanels 411, thus exposing the adhesive which remains adhered to the continuous web, having transferred thereto. With the pressure-sensitive adhesive 425 on the subpanels 411 now exposed, the pop-up element 401 is placed in the crease between the folded panels 413 of a letter, and the letter is closed so that the opposite-facing subpanels 411 adhere to the hinged panels of the letter. When the letter is opened, as depicted in FIG. 57, the pop-up element 401 automatically assumes a 3-dimensional display orientation with the flag section 405 supported in attention-getting orientation. Alternatively, once the release liner 423 has been removed, the pop-up element 401 can be applied to any essentially flat surface or the like by pressing it transversely against the surface at the foldline 415; such action will cause the bottom subpanels 411 to adhere to the surface and support the pop-up element in its intended 3-dimensional orientation.

Figures 58, 59:
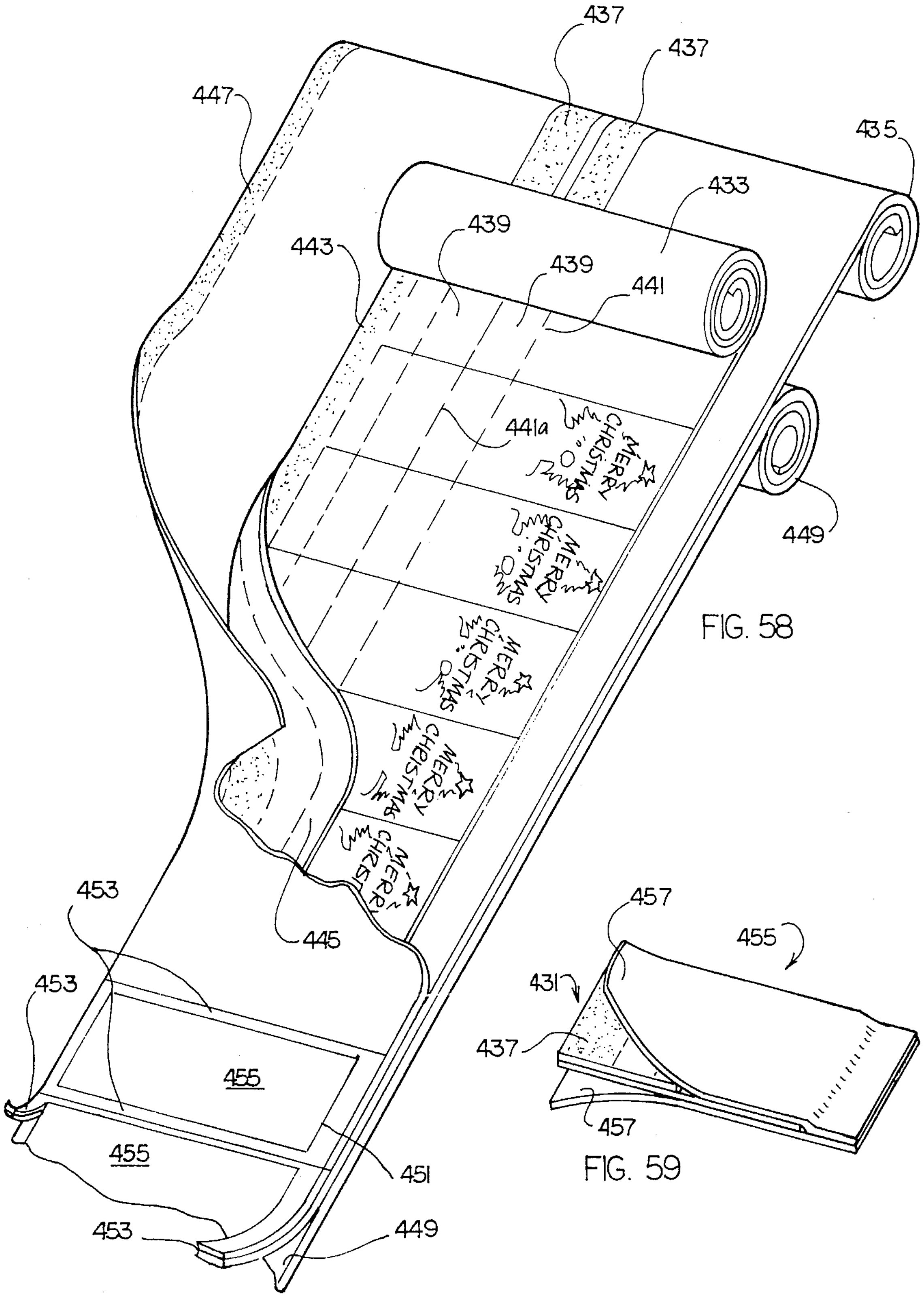
FIG. 58 is a perspective view of a further embodiment of a mass production method for making pop-up units, which units each include a pop-up element of the general nature of those shown in FIGS. 55–57, which method uses a single printed web and an underlying carrier web.
FIG. 59 is a perspective view, slightly enlarged in scale, showing one of the pop-up units made by the mass production method of FIG. 58 after it has been removed from the carrier web and as it is being readied for use by exposing the pressure-sensitive adhesive regions.

Depicted in FIG. 58 is an alternative method of mass production for making individual pop-up units 431 generally resembling those shown in FIG. 57. A continuous printed web 433, substantially the same as the web 403, is employed which is printed on both surfaces and is designed to produce a series of structurally identical pop-up elements 431 from the individual blanks provided in the continuous web. Instead of using a relatively narrow strip of transfer tape, in this embodiment, a continuous web 435 of release-coated transparent material having a width substantially greater than the width of the printed web 433 is employed. This transparent continuous web contains a pair of elongated adhesive patterns 437 of pressure-sensitive adhesive which align with the portions on the continuous web which will constitute a pair of bottom subpanels 439. Following lamination of the two webs, a plurality of lines of weakness 441 are impressed upon the laminated material generally as described hereinbefore, or alternatively, the lines of weakness can be impressed upon the continuous printed web 433 prior to the lamination. Thereafter, a strip of bonding adhesive 443 is applied along one edge of the continuous printed web 433 which constitutes a flange panel 445, and a separate line of bonding adhesive 447 is applied along one edge of the transparent web material.

The two laminated webs are then folded along the longitudinal centerline **441*a* so as to superimpose the portion of the continuous printed web containing two subpanels of the base and the flange panel 445 upon the corresponding subpanel portion of the web on the other side of the fold line and to also fold the release-coated web essentially in half, with the line of adhesive 447 bonding one edge of the transparent material web 435** to the facing surface of the other lateral edge.

Prior to folding the printed web 433 and the transparent web 435, the flag portion is die-cut to create a distinctive shape if it is desired for the flat portion to have a contour. In such an instance, if desired, the remainder of the web along the right-hand edge as shown in FIG. 58 can be stripped therefrom; however, the remaining matrix can also be simply left in place so as to resemble the uncut version that is shown.

At some time during the manufacturing process, either before or after, but preferably after the folding, the folded assembly is laminated to an underlying continuous carrier web 449. The carrier web 449 is provided with a suitable adhesive pattern (not shown) so as to secure it to the undersurface of the transparent web for a purpose to be explained hereinafter.

Following the folding of the two webs, the folded web assembly is die-cut using a kiss-cutting arrangement that will cut through the upper transparent film layer, both layers of the printed web, and the lower transparent film layer, but stopping short of the carrier web 449. The kiss-cutting operation is such as to cut rectangular panel outlines 451, each of which constitutes a single pop-up element unit. The remaining matrix 453, having a generally ladder-like form, which is created following this kiss-cutting operation, is then stripped from the top of the carrier web to leave a series of spaced-apart pop-up element units 455 in place on the carrier web 449.

As best seen in FIG. 59, each of the resultant units 455 includes the pop-up element 431 sandwiched between a pair of transparent rectangular panels 457. The pop-up adhesive patterns 437 secure the transparent panels to the pop-up element along the left-hand edge, and the strip of bonding adhesive 447, which preferably extends downward to just contact the right-hand edge portion of the printed web 433, secures this sandwich or envelope along its right-hand edge. The carrier web arrangement can be rolled, as described with regard to the FIG. 7 arrangement, or, if desired, folded in a zigzag fashion. The individual pop-up units 455 will often be manually removed from the carrier web 449; however, this arrangement also lends itself to feeding the units for placing of the individual units by some suitable automatic apparatus. In this respect, the carrier web 449 can have a release coating on its upper surface, and the adhesive pattern which is applied can be of a light-strength pressure-sensitive adhesive that will transfer to the undersurface of the transparent layer 435. Then, when such automatic equipment grasps the individual pop-up unit 455 and removes it from the carrier web, it will be removed cleanly from the carrier web 449 along with the pressure-sensitive adhesive, which will be in place and ready to adhere the pop-up unit 455 to an appropriate item for distribution.

When it is ready to employ the pop-up unit 455, the user simply peels the two rectangular transparent panels 457 apart beginning at the left-hand edge as depicted in FIG. 59 to expose the pop-up element 431. If the flag section is die-cut and particularly if the bonding adhesive pattern 447 extends down slightly over the right-hand edge of the printed web 433, the waste from the die-cut will remain with the two transparent panels when the pop-up element 431 is removed. In any event, the pressure-sensitive adhesive 437 will be exposed on the two bottom base subpanels 439; although as a result of the die-cutting, these two subpanels 439 will not be interconnected to each other by a hinge line, as was the case for the pop-unit element 401 manufactured by the process shown in FIG. 55, it will function equally as well when inserted between a pair of facing pages or panels of a folded letter, essentially as shown in FIG. 47 with respect to the pop-up element 273.

Figure 60:
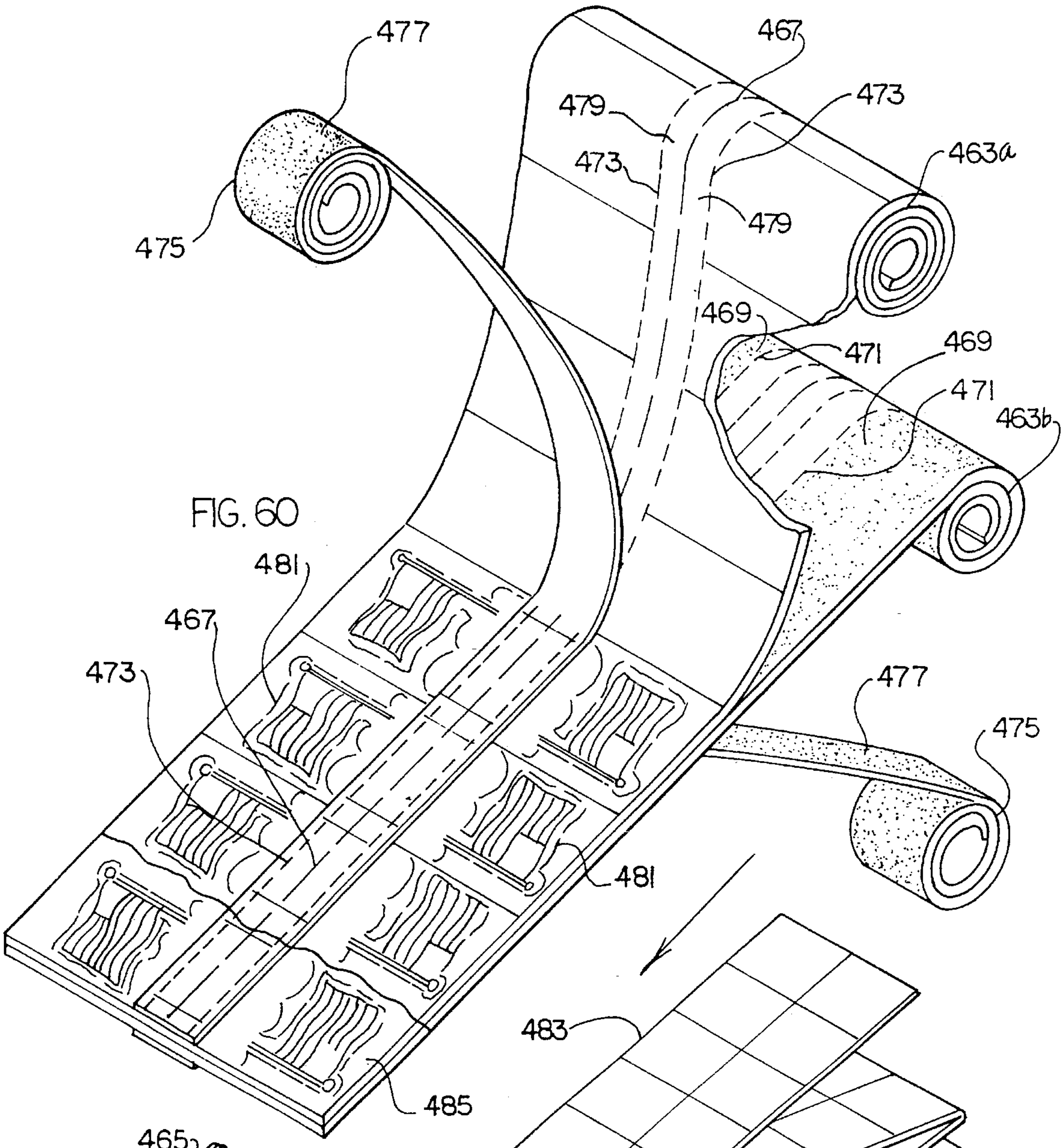
FIG. 60 is a perspective and schematic view of still another mass production method for making pop-up elements, utilizing a pair of continuous webs each printed on one surface.

Shown in FIG. 60 is still another method for mass production of pop-up elements 461 wherein a pair of printed webs 463 are laminated to each other so that the flag section 465 of the pop-up element 461 contains printed indicia on both surfaces. Each printed web 463 is designed so that each blank will form two pop-up elements 461, located base-to-base along a centerline 467 which is preferably perforated. More specifically, the mass production process employs an upper printed continuous web **463*a* and a lower printed continuous web 463*b* with one of the webs, preferably the lower web having a bonding adhesive pattern 469 located along both of its upper surface edges in the regions which will constitute the flag sections 465 of the pop-up. A pair of lines of weakness 471 are preferably provided in the lower printed web 463*b* and are located so as to define the hinge line between each flag section 465 and the uppermost base subpanel 472. Such lines 471 are preferably impressed in the lowermost web because comparable lines are omitted from the uppermost web so that the flag section 465 will not stand straight up but will be preferentially tilted slightly rearward for a particular effect. Although additional lines of weakness 473 could also be impressed in the lowermost printed web before lamination, this is optional. These lines 473 are preferably simultaneously impressed in both webs after lamination of the two webs, and either before or after a pair of continuous strips 475 of transfer tape bearing pressure-sensitive adhesive 477 are applied respectively to the undersurface and the top surface of the two-web lamination. Alternatively, a strip of transfer tape 475 could be applied to each of the printed webs before lamination to each other, if desired. The transfer tape 475 provides pressure-sensitive adhesive 477 in the region of the bottom or lowermost subpanels 479 of the support section for each pop-up element, and the adhesive pattern preferably stops just short of each edge of the transfer tape, i.e. so that the edge of the adhesive pattern essentially extends only to the two parallel lines of weakness that are impressed in the pair of laminated webs, which define the lowermost base subpanels 479**.

Figure 61:
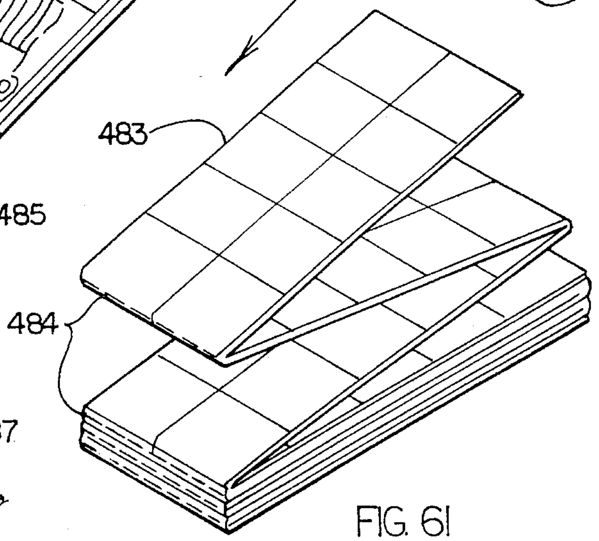
FIG. 61 is a schematic perspective view showing how groups of the pop-up elements made by the mass production method of FIG. 60 might be handled for distribution.

Following application of the two strips of transfer tape 475, the entire laminated assembly is die-cut to provide outlines 481 of a pair of base-to-base pop-up elements 461 in each blank and to also provide a longitudinal line of perforations at the centerline 467 along which each pop-up element is separable from its mate in the series of blanks. The resultant die-cut assembly can be rolled as described before, but it is preferably fan-folded in the form of sheets 483 containing groups of, for example, five blanks each, as shown in FIG. 61. To facilitate such fan-folding, a transverse line of perforations 484 is preferably cut in the web perpendicular to the central line of perforations 467 so as to mark off groups 483 of five blanks each.

Figure 62:
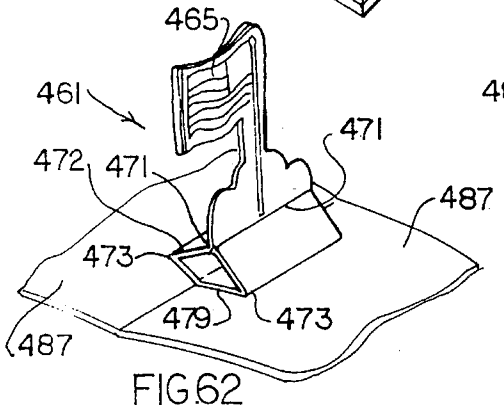
FIG. 62 is fragmentary perspective view showing one of the pop-up elements made by the mass production method of FIG. 60 in display position between a pair of hinged panels.

When such an arrangement is employed, these pop-up elements 461 can be distributed in small sheets 483 of ten pop-up elements each. The die-cutting that is used to create the individual pop-up elements 461, which in the illustrated arrangement are in the form of an unfurled flag flying from a supporting flag pole, utilizes a nick die which leaves a plurality of short bridges of fibrous material interconnecting each pop-up element 461 with the surrounding matrix material 485. The user simply breaks these easily severable bridges to remove the pop-up element which is then ready to use upon exposing the pressure-sensitive adhesive 477 by the subsequent removal of the liner subpanels which were die-cut from the upper and lower strips 475 of transfer tape. As before, the pressure-sensitive adhesive 477 from the transfer tape 475 remains on the printed web material 463, and thus the pop-up element is ready for insertion between the pages of a pamphlet or between the folded panels 487 of a letter. The lowermost pressure-sensitive adhesive-carrying subpanels 479 of the base support are not joined to each other along a hinge line, but again the pop-up element 461 functions as generally shown in FIG. 47 when located, for example, near the fold line between the facing panels 487 of a letter or other paperboard circular, as shown in FIG. 62.

Illustrated in FIG. 63 is yet another mass production process for making pop-up elements 501 generally similar to that shown in FIG. 60. In this arrangement, a lowermost carrier web 503 is employed having an overall coating of clear, transparent, pressure-sensitive adhesive 505 disposed atop its upper surface, which surface is coated with a silicone-release coating or the like so that the adhesive 505 will transfer from this carrier or liner onto the undersurface of a web 507 of clear transparent film which is then laminated thereatop. Next, a dry residue adhesive formula 515 is applied across the entire upper surface of the transparent film web 507; a dry residue adhesive such as that disclosed in U.S. Pat. No. 4,479,838 (the disclosure of which is incorporated herein by reference) may be employed. A first printed web 517, printed side down, is then laminated atop the dry residue adhesive layer 515. This continuous web 517 is printed to have a series of blanks designed to produce structurally identical pop-up elements 501 each having an upstanding flag section 519 and a lower supporting base portion 521. Thereafter, a bonding adhesive pattern 523 is applied to the flag portion region of the upper surface of continuous web 517, and then a second printed continuous web 525 preferably of co-equal width, is laminated atop the first continuous web, printed side up. Once these laminations are completed, the laminated web is kiss-cut from the bottom to create a rectangular die-cut 511 in the region of the lower subpanel of the base section that extends upward through the carrier web 503 and the transparent film web 507. This rectangular die-cut creates a release liner panel from the carrier layer which protects the pressure-sensitive adhesive on this subpanel.

If desired, three parallel lines of weakness 527 can be impressed in the pair of laminated printed webs to define the subpanels which will constitute the supporting base 521 of each pop-up element 501. These lines of weakness can be impressed either before or after a strip of transfer tape 529 carrying pressure-sensitive adhesive 531 is applied atop the upper printed surface of the printed web in the region of the lowermost subpanels, so as to provide the pressure-sensitive adhesive carried by this strip which transfers to the upper surface of these bottom subpanels 533.

Following the application of the transfer tape 529, a final die-cutting operation is carried out to produce a contour outline 533 in each flag section, which is a kiss-cutting operation from the top which extends through the transfer tape 529, the two laminated printed webs 517, 525 and through the clear transparent film web 507, but stops short of the lowermost carrier web 503. If desired, thereafter the matrix material 537 can be stripped from around the individual pop-up elements, which matrix will consist of the ladder-like portion remaining from the three thicknesses of printed web and transparent film plus the transfer tape, leaving a series of pop-up elements 501 adhering via pressure-sensitive adhesive 505 to the underlying carrier web 503. The pop-up elements 501 can be distributed in any form using any of the rolling, fan-folding or other procedures as hereinbefore described.

They can be removed from the carrier web 503 via automatic equipment if desired. When each pop-up element 501 is removed from the web, a parting occurs at the light-strength pressure-sensitive adhesive layer 505, which adhesive has transferred to the undersurface of the transparent film 507 because the carrier web 503 is coated with a release-coating material; however, the die-cut liner panel covering one base subpanel 533 is removed from the web with the element (see FIGS. 64 and 65). Thereafter, the pressure-sensitive adhesive 505 which has transferred onto the undersurface of the lowermost transparent layer across the entire region of the flat section allows the composite pop-up element to be affixed to a suitable surface for distribution, for example, the exterior of a box or a cover or interior surface of a pamphlet, letter or the like, because this pressure-sensitive adhesive will bond strongly to a fibrous or paperboard surface or the like that does not carry a silicone release coating.

Upon receipt of the distributed item, the recipient can remove it from this surface, which can be a printed surface, and parting will occur at the dry adhesive bond between the transparent film 507 and the printed web 517 because the strength of the dry residue adhesive is less than that of the pressure-sensitive adhesive 505. As a result, the transparent film 507 remains in place on the distribution surface, but because of its transparency and that of the adhesive 505, does not obscure any writing or graphics that might be beneath. Likewise, because of the nature of the dry residue adhesive, there is no residue that is left that would be unsightly or troublesome. The pop-up element 501 is then ready for use in the manner of the pop-up element 461 described hereinbefore.

To affix the pop-up element in display orientation, the remainder of the transfer tape 529 which covers the lowermost subpanel 533 on the front surface is removed to expose the pressure-sensitive adhesive 531 which has transferred thereto. Likewise, the die-cut rectangular portion of the release-coated carrier web 503 is peeled therefrom, and this exposes the pressure-sensitive adhesive 505 on the undersurface of the panel of transparent film 507 that remains attached thereto. With these two liner panels removed, the pop-up element 501 is ready for placement between the pages of a pamphlet, at the fold line of the panels 541 of a letter or the like, as illustrated in FIG. 66, where it is shown in its 3-dimensional display orientation.

Depicted in FIG. 67 is a perspective of a pop-up element 551 generally similar to those which have been hereinbefore described; however, it is constructed to include a line of perforations 553 at the junction between the lower boundary of the flag section 555 and the oblique subpanels 557 of the supporting base. This arrangement allows the pop-up element 551 to be used as a distribution system for a sticker or the like that is formed as the flag section 555. This pop-up element is made using a pair of webs which are laminated to each other, and the mass production method shown in FIG. 60 can be used for this purpose. However, instead of utilizing a permanent adhesive as the bonding adhesive between the halves of the flag sections 555 of the pop-up 551, a pressure-sensitive adhesive 559 is used, and one of the facing surfaces of the webs, preferably the upper surface of the lower web as shown in FIG. 60, is provided with a silicone-release coating or the like. As a result, the pressure-sensitive adhesive 559 will adhere strongly to the undersurface of the flag section of the upper web (**555*a* in FIGS. 68 and 69) and will release from the lower web (555*b*). Accordingly, the pop-up element 551 is distributed between the panels of a folded letter or the like, and pops up in attention-attracting orientation upon the opening of the letter. Thereafter, the recipient of the letter can detach the flag portion 555 along the line of perforations 553. As shown in FIG. 69, the recipient then simply peels the rear liner layer 555*b* from the detached flag portion, leaving the graphic flag portion sticker 555*a* with its pressure-sensitive adhesive pattern 559** ready to be affixed to a telephone, the exterior of a refrigerator, or in some other desired location.

Illustrated in FIG. 70 is still another alternative embodiment of a mass production method for making individual pop-up elements of a type resembling those depicted in FIGS. 27–29, which method results in the production of a stack of such individual pop-up elements. More specifically, a single continuous web 601 is employed which may be printed on both sides, printed on one side, or unprinted, as desired. However, to ease description, the web is shown as being printed on both sides with the lines along which die-cutting and the impression of the lines of weakness will eventually take place, as well as lines demarcating the series of individual blanks which are designed to create structurally identical pop-up elements. Sometime during the mass production method, a line of weakness 605 is preferably impressed parallel to and spaced inward from the left-hand edge of the web as illustrated in FIG. 70. Each blank 603 is intended to be eventually cut with a pair of die-cut lines along the lines 607 which are transverse to the line of weakness 605 and divide the base portion of each pop-up element into three panels which may be of essentially equal dimension. Alternatively, if desired, a single die-cut line 607 could be used that would divide the support section of the blank into two base panels of preferably equal dimensions. The line of weakness 605 then forms three lower subpanels **609*a*, 609*b* and 609*c* within these three base panels. The surfaces of two of the subpanels, the panels 609*a* and 609*c*, on one surface of the web are coated with a release coating pattern 611 so that pressure-sensitive adhesive coming in contact with this coated surface will release therefrom. A similar release coating pattern 613 is applied to the opposite surface of centrally located subpanel 609*b*. Thereafter, a pattern of pressure-sensitive adhesive 615 (in actuality a continuous strip) is laid down to cover the entire region between the left-hand edge of the continuous web 601 and the line of weakness 605. Following application of the pressure-sensitive adhesive pattern 615, two transverse slits are cut along the lines 607. Thereafter, the continuous web 601 is severed by a reciprocating or rotary knife blade, as explained hereinbefore, to create a plurality of structurally identical individual pop-up elements 621 which are collated into a stack 617 with one element being stacked atop another. The stack 617** can be continuously compressed, or periodically substacks of a desired length can be removed and compressed. Following compression, individual pads each including a desired number of individual pop-up elements are split therefrom, for example, from the lower end of a continuously growing stack. These pads can then be trimmed, if desired, on one or more of the edges for neatness and then individually wrapped for distribution.

Shown in FIG. 71 is a pop-up element 621 which has been peeled or removed from such a pad of pop-up elements. The upper surfaces of the subpanels **609*a* and 609*c* carry pressure-sensitive adhesive 615 whereas the undersurface of the central subpanel 609*b* carries the pressure-sensitive adhesive 615. What has occurred is that, in the compressed stack of pop-up elements, because of the release coating pattern 613 that was applied to the upper surface of the central subpanel 609*b*, the pressure-sensitive adhesive 615 that was originally laid down upon that panel transfers to the undersurface of the central subpanel 609*b* of the next adjacent pop-up element 621 in the stack. If only two panels are employed, then one of the two subpanels 609 would carry the release coating beneath the pressure-sensitive adhesive. Because of the release coating patterns 611 that were applied to the undersurfaces of the subpanels 609*a* and 609*c*, the pressure-sensitive adhesive pattern 615** that was applied to those subpanels remains in place thereupon and does not transfer in the stack.

After one individual pop-up element 621 has been peeled from the stack, as illustrated in FIG. 71, it is used in substantially the same way as described and illustrated previously; for example, the pop-up element 621 is inserted between the panels 623 of the same page of a letter, generally along a crease line, so that, when the letter is opened by the recipient, the pop-up element 621 assumes the 3-dimensional attention-attracting configuration shown in FIG. 72.

Illustrated in FIG. 73 is yet another alternative embodiment of a mass production method for making individual pop-up elements which have a folded form generally resembling the pop-up elements comprised by the hinged panels 17, 19 of FIG. 8. The illustrated method results in the production of a stack of such individual pop-up elements in fan-folded configuration. More specifically, a single continuous web 631 is employed which may be printed on both sides, printed on one side, or unprinted, as desired. As in the previously described embodiment, the web 631 is designed to produce structurally identical pop-up elements from the series of adjacent blanks which are located next to one another along the longitudinal length of the web; however, each of the pop-up elements is formed with a pair of flag panels 635, 637 that are hinged together to provide a folded configuration which spreads apart in the display orientation.

The continuous web 631 has a longitudinal centerline 633 which separates right-hand flag panels 635 from left-hand flag panels 637 as shown in FIG. 73. A pressure-sensitive adhesive pattern 639 of generally triangular shape is applied near the leading edge of each blank of the web on each side of the longitudinal centerline 633. The adhesive patterns 639 are located in the regions which become base-subpanels and which support the pop-up element in its display orientation. Oblique lines of weakness 641 are preferably impressed in each of the blanks, located along the trailing edges of the adhesive patterns 639 to provide a clean fold at this point in the ultimate construction. If desired, the lines of weakness 641 can be impressed in the web prior to the application of the adhesive, or the lines of weakness can be omitted if desired.

A release coating pattern 643 is applied to the trailing region of each of the blanks, which may be a standard silicone base coating material that prevents pressure-sensitive adhesive from strongly adhering thereto. Following the application of the release coating patterns 643, the web 631 is folded along the longitudinal centerline 633, and the folded web is then perforated at the junctions between adjacent blanks so that each is separated from the next blank by a line of perforations 645. Thereafter, the folded perforated web is manipulated to form a stack 647 by fan-folding each of the pop-up units 649 in the opposite direction. The pressure-sensitive adhesive patterns 641 adhere only lightly to the release-coated flag portions 635, 637 of the adjacent pop-up elements 649 in the stack, but thereby serve to maintain the integrity of the folded stack 647. At the same time, the pressure-sensitive adhesive 639 is protected by the facing release-coated region and thus preserves its tack for ultimate use.

The pop-up elements 649 are generally distributed in groups of a desired number in this fan-folded stack form, and these groups may be conveniently overwrapped with a suitable wrapping material which also would adhere only lightly to the pressure-sensitive adhesive and thus also serves a protective function. When a pop-up element is desired to be employed, the pop-up element 649 at the end of the stack is detached along the line of perforations 645, and it is inserted generally along the fold line of a pair of hinged-together panels or sheets 651, for example, the facing pages of a menu or business advertisement. When the sheets 651 are opened, the pop-up element 649 assumes a 3-dimensional orientation with the flag panels 637 and 635 prominently displayed in attention-attracting fashion. If desired, the side edges of the stacks could be trimmed, generally as illustrated in FIG. 32, and the perforations 645 could be replaced by lines of weakness to facilitate folding.

Figure 75:
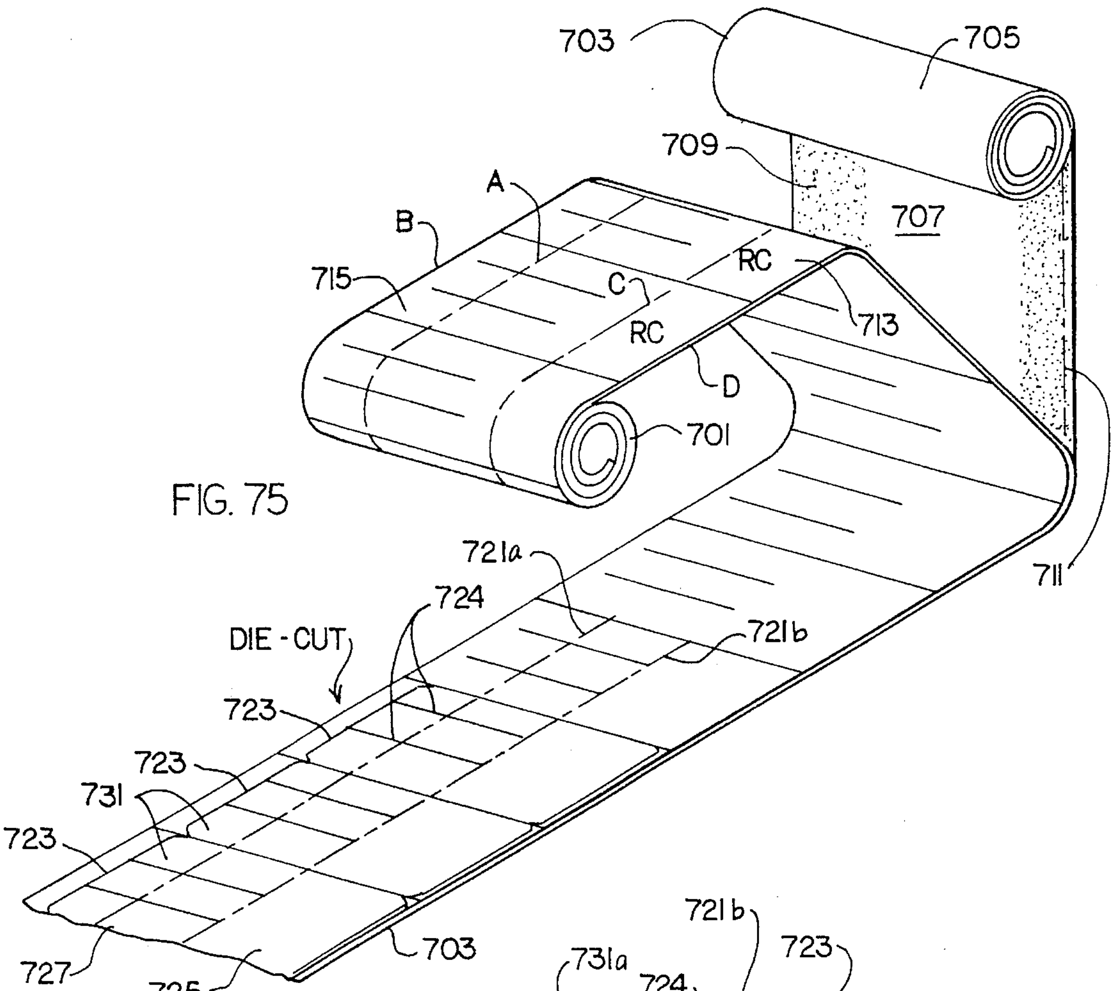
FIG. 75 is a perspective and schematic view of one more embodiment of a mass production method for making pop-up elements from a single sheet of web material which utilizes a carrier web.
Figure 77:
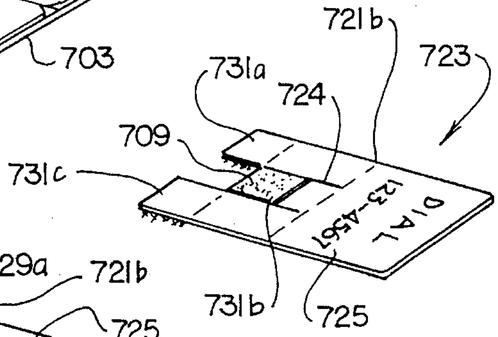
FIG. 77 is a perspective view similar to FIG. 76 showing the pop-up element after it has been folded to ready it for application to an article with which it will be distributed to a recipient.

Illustrated in FIG. 75 is one more alternative embodiment of a mass production method for making a plurality of individual pop-up elements of a type resembling those shown in FIGS. 70–72. The method produces these pop-up elements in the form of a continuous strip which could, if desired, be fed through a laser printer or the like so as to imprint a personalized message onto the flag portion of each individual pop-up element. Such a strip could be provided with flanking rows of pin-holes to facilitate feeding to a printer and could be distributed in roll form, if desired, as is known in this art. The continuous web may be preprinted with the reference indicia shown in FIG. 75. If desired, a background could be printed as a part of each flag section, or such background printing could be omitted, in which case plain white pop-up elements would be produced upon which the entire message would then be imprinted through a computer-operated laser printer or the like.

More specifically, a single continuous web 701 is employed for the pop-up elements, and a carrier web 703 of the same or a slightly wider width is employed. The web 701 is designed to provide a series of blanks each of which will be die-cut to form a structurally identical pop-up element. Shown on the web 701 is a reference line A which is spaced from the left-hand edge B of the web a distance such that it indicates the dividing line in the base section of each pop-up element that defines the lowermost subpanels that will become adhered to the supporting surface. The carrier web 703 has an undersurface 705 that is preferably coated with a release coating of a suitable silicone-based compound and an upper surface 707, the left-hand edge region of which is also preferably coated with a release coating in the region where a pressure-sensitive adhesive pattern 709 is provided. The width of the pressure-sensitive adhesive pattern 709 is such that it extends about to the reference line A when the lamination of the two webs is effected, and thus the pattern 709 generally occupies the region between the reference lines A and B. A strip of pressure-sensitive adhesive 711 is also provided along the right-hand edge region of the upper surface 707 of the carrier web 703. A release coating 713 is applied to the surface 715 of the web 701 in the region generally between a reference line C and the right-hand edge D of the web, which region is generally aligned with and has about the same width as the pressure-sensitive adhesive pattern 711.

Following lamination of the two webs, a pair of lines of weakness 721*a* and 721*b* are preferably impressed in the web, and then a die-cutting operation is effected to create the individual pop-up elements 723. The line 721*b* might optionally be omitted. A kiss-cutting technique is employed which cuts through just the upper web 701 and does not cut through the carrier web 703 to produce the series of generally rectangular pop-up elements 723 which remain in place on the carrier web, being held thereto by the pressure-sensitive adhesive patterns 709 and 711. The illustrated die-cutting produces a generally rectangular perimeter or profile for the element 723 with two transverse lines 724; i.e. transverse and preferably perpendicular to the line of weakness 721*a*. If desired, the lines of weakness 721*a* and 721*b* could be impressed at the same time as the kiss-cutting operation is effected.

Figure 76:
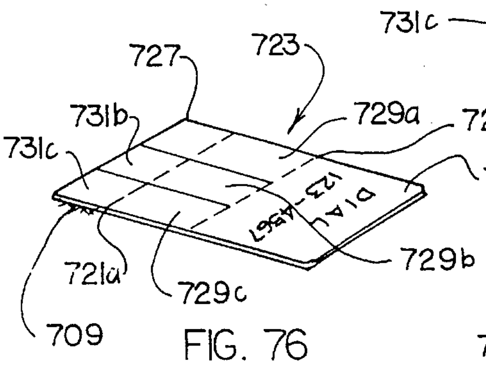
FIG. 76 is a perspective view of one pop-up element as produced by the method illustrated in FIG. 75, which has been removed from the carrier web.

As best seen in FIG. 76, each of the individual pop-up elements 723 has a flag section 725 and a supporting base section 727 in the form of three panels 729*a*, 729*b* and 729*c* of approximately equal dimensions (although unequal dimensions might be employed if desired), which panels are hinged to the flag section along the line of weakness 721*b*. The line of weakness 721*a* creates subpanels 731 which form the lowermost portions of each of these 3 panels. Alternatively, two rather than three panels 729 could be used.

After the individual pop-up elements 723 have been appropriately imprinted with a desired message while they are a part of the strip, an individual pop-up element 723 is removed from the carrier web layer as shown in FIG. 76. Because of the release coating 713 that was applied in the region of the undersurface 715 of the web 701 that becomes the flag section, the adhesive remains with the carrier web in this region; thus, the flag section 725 has no adhesive on its surface. Because the carrier web 703 carried a release coating on its upper surface 707 beneath the pressure-sensitive adhesive pattern 709, this pressure-sensitive adhesive transfers to the undersurface of each of the pop-up elements 723 in the region of all 3 subpanels 731. As a result, the undersurfaces of the 3 subpanels 731*a*, 731*b* and 731*c* in FIG. 76 carry pressure-sensitive adhesive 709.

Figure 78:
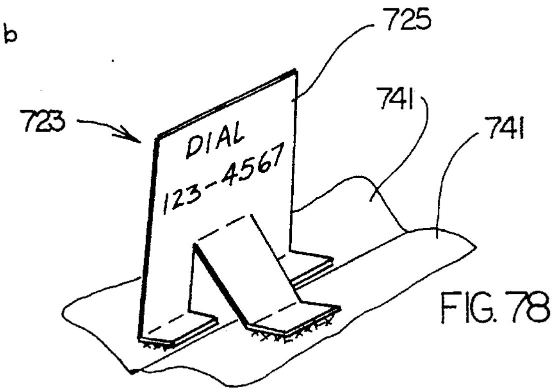
FIG. 78 is a fragmentary perspective view showing the pop-up element of FIG. 77 mounted in display position between a pair of hinged-together panels of sheet material.

To ready the pop-up element 723 for ultimate application, the central subpanel 731*b* is bent upward 180° so that it lies against the remainder of the panel 729*b* with its adhesive pattern 709 facing upward; alternatively the two flanking subpanels 731*a* and 731*c* could be folded upward. With the subpanel 731*b* in this position, the pop-up element 723 is inserted between a pair of panels 741 of the same page of a letter or like, so that the lowermost edges of the subpanels 731*a* and 731*c* are aligned adjacent a crease line between panels; then the panels 741 are folded about the pop-up element so that the respective pressure-sensitive adhesive patterns 709 adhere to the facing surfaces of the letter panels 741. When the letter is opened by the recipient, the pop-up element 723 assumes the 3-dimensional, attention-attracting configuration shown in FIG. 78.

If desired, the entire surface 707 of the carrier web 703 could be coated with pressure-sensitive adhesive instead of only using the limited pattern 711 illustrated in FIG. 75, in which case, the entire region of the surface 715 of web 701 from reference line A through edge D would be coated with a release coating. Also, instead of using a pressure-sensitive adhesive pattern 711 on the upper surface 707 of the carrier web 703, a dry-residue adhesive, as described hereinbefore, could alternatively be employed in the region other than that covered by the pressure-sensitive adhesive pattern 709. With such a dry-residue adhesive, the use of the release coating pattern 713 could be omitted if desired from the web 701. As a still further alternative, instead of placing the pressure-sensitive adhesive pattern 709 on the surface 707 and having it transfer to the surface 715 of the web 701, the pressure-sensitive adhesive pattern 709 might be applied directly to the surface 715 in the region of the subpanels 731, in which case a release coating would still be applied onto the corresponding region on the surface 707 of the carrier web as described. Instead of producing a single strip of such printable pop-up elements, a wider web could be used to produce columns of pop-up elements three-abreast which could be appropriately cut into 8½×11 inch sheets or the like for printing, if desired.

Figure 79A:
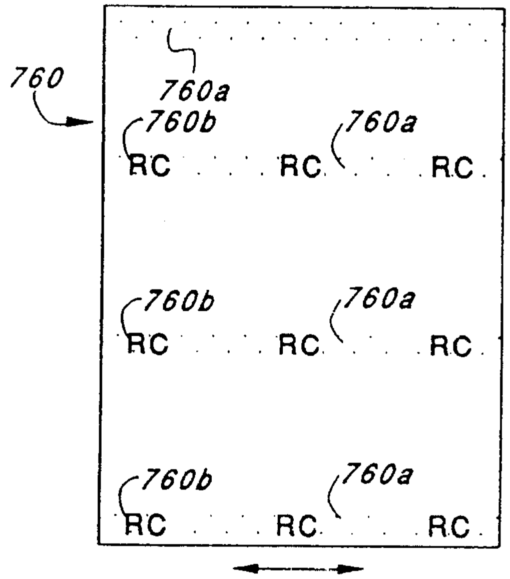
FIGS. 79A and 79B show the fabrication of sheets of multiple pop-up elements, having various features of the invention, which sheets are suitable for preparing customized pop-ups via EI (electronic imaging).
Figure 79B:
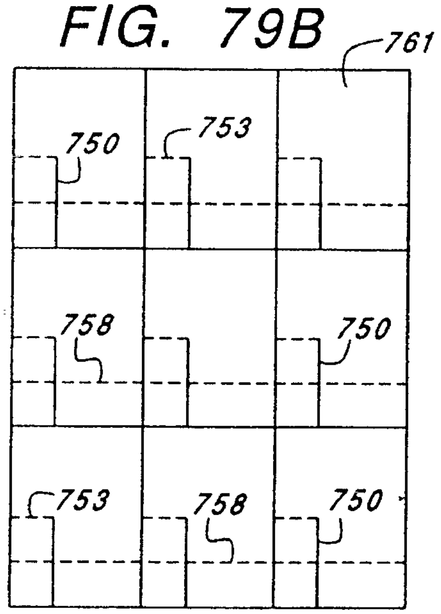
Figure 80A:
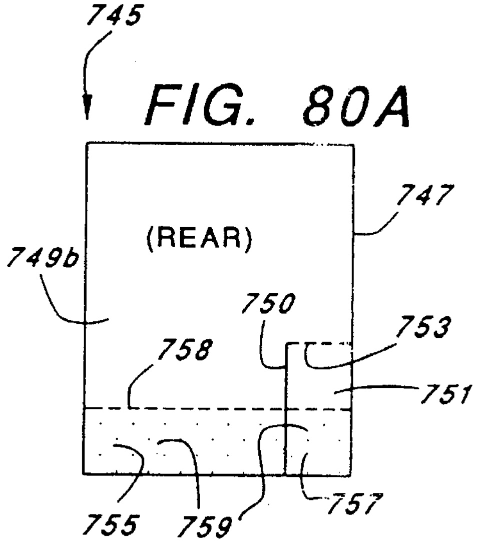
FIG. 80A is a rear view of a pop-up element taken from the sheet shown in FIG. 79B.
Figure 80B:
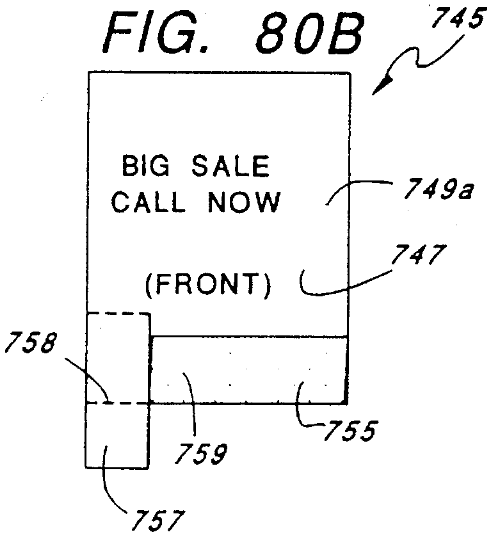
FIG. 80B is a front view of the pop-up element of FIG. 80A.
Figure 81:
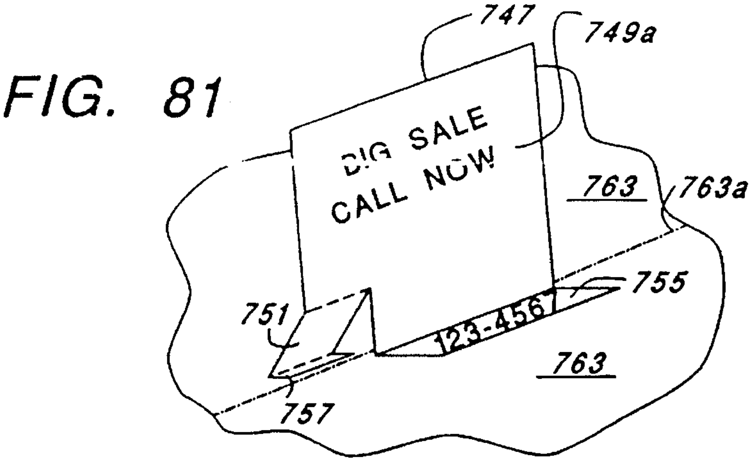
FIG. 81 is a perspective view of the pop-up element of FIGS. 80A and 80B showing it mounted in display position between a pair of hinged-together panels of sheet material.

Shown in FIGS. 79–81 is an alternative version of a pop-up element 745 which could be made using the mass production method previously described with respect to FIG. 75, but which is preferably made in multiples covering 8½×11 sheets or the like. The illustrated pop-up element 745 has a major portion which constitutes a flag section 747 having a front surface *749a* and a rear surface *749b*. Formed in one of the lower corner regions of the pop-up element by a slit 750 is a leg or link section 751 which is hinged at its upper end, preferably along a line of weakness 753, to the remainder of the flag section. A pair of subpanels 755, 757 are provided at the very bottom, which are hinged along a single line of weakness 758, respectively, to the flag section 747 and to the leg 751. The rear surfaces of both of these subpanels are covered with pressure-sensitive adhesive 759.

As illustrated in FIG. 79A and FIG. 79B, the pop-up elements 745 are preferably fabricated in multiple arrangement on sheets of paper 8½×11 inches in dimension designed for EI, e.g. they can be printed in a customized manner through a standard computer-driven laser printer. In the illustrated embodiment., an array of 9 pop-up elements 745 is created, i.e. 3 rows of 3 each, although any other desired arrangement can be used that preferably substantially fills a rectangular sheet of paper 761. If desired, a border can be provided at the outer edge as known in this art. A base or liner sheet 760 is used to which pressure-sensitive adhesive 759 has been preferably applied in the form of a pattern of 4 transversely extending parallel strips of pressure-sensitive adhesive *760a*. These strips can be continuous or can be interrupted at locations where the slits 750 are positioned in the final product. The lowermost 3 of the 4 strips are coated over regions of release coating 760b so that the pressure-sensitive adhesive 759 will transfer from the sheet 760 to the undersurface of a sheet 761 that is laminated thereover. If desired, the undersurface of the sheet 761 can be coated with a strip of release coating in the region where the upper edge pressure-sensitive adhesive strip will be located. Alternatively, the pressure-sensitive adhesive pattern can be applied to what will be the rear surface of sheet 761.

Although two such cut sheets can be laminated, it may be preferable to laminate two continuous webs, then form the array of pop-up elements in the laminated web structure, and then subsequently create individual sheets of 8½×11 inches or the like. For example, the laminated web may be cut directly into individual sheets, or it may be perforated transversely and fan-folded, or it may be supplied in roll form to a point of customized printing by EI and cut into sheets after printing. To provide such rectangular sheets that are unprinted and therefore ready for customized printing via EI, a first continuous web of suitable sheet material is used that has a width sufficient to accommodate 1, 2 or more rectangular sheets abreast. A second continuous web of liner material of essentially the same width is employed. Although the second web can have an overall release coating on its surface that will be brought into juxtaposition with the first web, preferably longitudinally extending regions of the web are coated with release coating *760b* that can be efficiently and economically applied to a fast-moving web, which regions will be aligned with the locations of the subpanels 755,757 in the finished product. After suitably drying the release coating, a pressure-sensitive adhesive pattern *760a* is applied to the upper surface of the second web, atop the strips of release coating and additionally in the region that will constitute the upper edge of each sheet so that there will be releasable adherence of the two webs in these four regions. Preferably the rear surface of the first web is coated with a release coating in the upper edge region so that pressure-sensitive adhesive will not transfer to the undersurface of the pop-up elements 745 in what would be the upper edge region of the flag section 747. Another method of manufacture of an equivalent product utilizes a second web that is coated substantially entirely with a release coating and then overcoated with a substantially overall pattern of pressure-sensitive adhesive, in combination with a first web having a rear surface coated in essentially all regions except those of the subpanels 755,757 with a different release coating which has even less attraction for adhesive so that transfer of pressure-sensitive adhesive occurs only in the uncoated subpanel regions.

Following application of the pressure-sensitive adhesive pattern *760a*, the two webs are mated by bringing one web into juxtaposed position atop the other so that the pressure-sensitive adhesive is sandwiched between the two juxtaposed web surfaces, forming a composite laminated web structure. The superimposed webs are then fed through a kiss-cutting station wherein the desired lines of weakness 753,758 and slits 750 depicted in FIG. 79B are created in the first sheet material web without also severing the liner sheet material web 760. This kiss-cutting step die-cuts the individual pop-up elements and also compresses the two laminated webs to each other assuring that transfer of pressure-sensitive adhesive 759 occurs in the regions of the undersurfaces of the subpanels. Preferably, the kiss-cutting die is nicked at the corners where 4 pop-up elements 745 come together so that there is weak joinder at an upper corner of a pop-up element to the pop-up element next thereabove in this integral sheet arrangement, until such time as the pop-up elements are removed one-by-one, preferably starting at the bottom edge. If desired, additional nicks can be provided in the kiss-cutting die to assure the integrity of the kiss-cut sheet 761 without significantly detracting from the ability of a user to remove the pop-up elements, one at a time, for individual use.

Once the kiss-cutting is completed, the composite laminated web structure can be severed into a plurality of individual rectangular sheets as by splitting the web into a desired number of 11-inch wide ribbons, for example, and then transversely cutting each ribbon to the desired rectangular size of the sheets. Alternatively, as described above, these ribbons could be perforated and fan-folded or could be simply rolled in this form for eventual cutting into individual sheets after EI treatment. The laminated web could also be sheeted to form individual rectangular sheets prior to kiss-cutting, in which case the individual rectangular sheets would then be kiss-cut to provide the pattern shown in FIG. 79B. However, kiss-cutting the web prior to severing may be preferable in many instances, particularly when it is desired to mass produce a large number of rectangular sheets of the same pop-up element pattern. In any event, kiss-cutting of the laminated sheet material 760 and 761, either while still in web form or in cut sheet form, provides the pattern shown in FIG. 79B. In this arrangement, 9 separate pop-up elements 745 cover the surface of the sheet and can be removed individually from the sheet and employed as desired. An individual die-cut sheet 761 can be easily printed on its blank upper surface by simply feeding it through the usual computer-driven laser printer wherein the simultaneous customized printing of 9 identical pop-up elements can be simply accomplished in a straightforward manner. EI can also be used to print such sheets in fan-folded or roll form.

Once printed, the user removes one pop-up element 745 at a time from the sheet, preferably beginning at the bottom, and its removal from the sheet exposes the pressure-sensitive adhesive 759 on the rear surfaces of the subpanels 755 and 757. To ready the pop-up element 745 for application, the larger subpanel 755 is bent forward and upward 180° so that it lies against the front surface of 749*a* of the flag section, with the adhesive 759 which it carries facing forward, as depicted in FIG. 80B. With the pop-up element 745 in this orientation, it is inserted between a pair of panels or basepieces 763, which can be panels of the same page of a letter or advertisement or the like as shown in FIG. 81. The bottom edge of the subpanel 757 will be located adjacent a crease or fold line 763*a* between the two panels so that the adhesive 759 affixes the smaller subpanel 757 in this location. When the panels 763 are folded about the line 763*a* and brought into superimposition, the adhesive 759 causes the larger subpanel 755 to become affixed to the facing hinged panel 763.

When the letter is opened by the recipient, the pop-up element 745 assumes the 3-dimensional, attention-attracting configuration shown in FIG. 81. In this orientation, the front surface 749*a* is displayed prominently because the flag section 747 leans rearward, and the front surface of the larger subpanel 755, which can itself carry a printed message, e.g. a telephone number, is also displayed as shown in FIG. 81. This advantageously oriented structure is obtained by constructing the flag section 747 so that it is free of any lines of weakness and thereby constitutes a relatively large, perfectly flat panel and by locating the line of weakness 753 at the upper end of the leg 751, which provides a sharp hinge line that preserves the flatness in this region. Thus, in this configuration, the total surface area of the flag section 747 and the larger subpanel 755 is available for printing to carry a desired message for promotional purposes.

Disclosed schematically in FIGS. 82 and 83 is a method for fabricating a composite web for making pop-up elements which are particularly designed for use in displaying a separate item, such as a business card, a photo, a coupon or the like. Four separate webs 765, 766, 767 and 768 are shown as being employed. Although these webs are shown as separate entities, it should be understood that they could all be split from a single web, or they could be formed from two webs which are each folded in half and then the folded edge suitably removed. Other combinations of folding and splitting could alternatively be employed. The four webs are used to produce a series of structurally identical pop-up elements 769 of the type shown in FIGS. 84–86.

Two patterns 771*a* and 771*b* of release coating (indicted by initials RC) are applied to the lowermost web 768 on its upper surface, and the uppermost web 765 carries two similar patterns of release coating 771*c* and 771*d* on what is now its undersurface in the orientation depicted. The release coatings 771*a* and 771*c* and are located in regions that will constitute part of the flag section of the ultimate pop-up element 769, and the release coating regions 771*b* and 771*d* are located in what will constitute the supporting subpanel regions. The undersurface of the web 767, which is the lower of the two middle webs, is completely coated with pressure-sensitive adhesive 773*a* (indicated by initials PSA), and the upper surface of the other middle web 766 is similarly completely coated with pressure-sensitive adhesive 773*b*. In addition, the web 767 is formed with a longitudinally extending line of weakness 775*a*, which is located at what will be the lower edge of a rear flag section 777*a*. A second parallel line of weakness 775*b* in the web 767 constitutes a hinge line between a rear leg panel 777*b* and a supporting subpanel 777*c*. A single line of weakness 775*c* is formed in the web 766, it constitutes a hinge line that defines the lower edge of the front flag section 779*a* and the upper edge of the subpanel. The upper surface of the web 767, in the region of the rear flag section, is coated with a pattern 780 of bonding adhesive (indicated by the initials BA).

The four webs are superimposed one atop another to provide the composite arrangement schematically depicted in FIG. 83, wherein areas of adhesive alone are depicted by x's and wherein regions where one surface is coated with release coating and the other surface is coated with pressure-sensitive adhesive are depicted by alternating "RC" and "x". This four-layer composite web is then longitudinally slit so as to provide four slits 781*a, b, c* and *d* in the uppermost web 765 which completely sever the web 765 but do not extend into the adjacent web 766. These four slits create four liner panels which form a part of the front surface of the ultimate pop-up element 769. The lowermost web 788 (which will constitute the rear surface of the pop-up element) is also slit, preferably at the same time, to provide two slits 785*a* and 785*b* which are located, respectively, in or at the lower edge of the flag section and at the upper edge of the supporting subpanel 777*c*, in alignment with the slit 781*d*. They create in the web 768 a removable liner panel 787*a* in the region of the flag section and a liner panel 787*b* in the region of the supporting subpanel. The composite four-layer web is then slit or perforated transversely so as to create individual or groups of identical pop-up elements 769, one of which is depicted in FIG. 84.

When the pop-up element 769 is to be used, the liner panel 783*d* is removed from the front supporting subpanel 779*b*, exposing the pressure-sensitive adhesive 773*b* as depicted in FIG. 84. One or more of the front liner panels, 783*a* and 783*b* for example, are then removed from the flag section, as depicted in FIG. 85, to expose the pressure-sensitive adhesive 773*b* in this region, which will allow an item such as a business card 789 to be securely attached by completely covering the exposed adhesive in this region. If desired, all 3 liner panels, including panel 783*c*, are removed to more securely attach the item 789. The lowermost rear liner panel 787*b* is also removed from the other supporting subpanel 777*c* to expose the pressure-sensitive adhesive 773*a* in this region. This readies the pop-up element 769 for insertion between a pair of panels or basepieces 791 near a fold-line 791*a* along which such pair of panels 791 are hinged together. When the panels 791 are folded about the pop-up element, the respective pressure-sensitive adhesive patterns 773_a_ and 773_b_ in the regions of the supporting subpanels adhere to the facing surfaces of the juxtaposed panels 791 so that, when the letter or other folded article is opened by recipient, the pop-up element 769 assumes the 3-dimensional configuration shown in FIGS. 85 and 86 with the business card 789 being prominently displayed. If desired, the upper rear liner panel 787_a_ could also be removed and a second item affixed thereto that would extend beyond the business card 789.

Depicted in FIG. 87 is a continuous web 795 of sheet material which has been printed so as to constitute a series of blanks each having a pair of pop-up panels located on opposite sides of the centerline of the web, which together form a pop-up element 797; in this respect, the web 795 is generally similar to web 279 depicted in FIG. 48. However, the web 795 is treated so as to fabricate a series of structurally identical pop-up elements 797 by a single application of pressure-sensitive adhesive, preferably at a single station under which the upper surface of the web travels.

The web can be supplied directly from a web press, or it can be preprinted and then rerolled before being fabricated into the pop-up elements. At some time, either before or after printing or just prior to the steps depicted in FIG. 87, the web 795 is impressed with four longitudinally-extending lines of weakness 799_a, b, c_ and _d_. The line of weakness 799_c_ is located at the centerline of the web, and the flanking lines of weakness 799_b_ and 799_d_ define a pair of supporting subpanels 801_a_ and 801_b_ which are hinged to each other along the centerline 799_c_. The front subpanel 801_b_ is hinged along the line 799_d_ to a flag panel 801_c_ which constitutes the front flag section of the pop-up element 797. The line of weakness 799_a_ defines a small rear flag panel 801d and a link or leg panel 801_e_. One surface of the web 795 in the regions thereof which form the supporting subpanels 801_a_ and b is coated with a pattern 803 of release coating; this surface becomes the undersurface when the web is manipulated prior to adhesive application.

The web 795 is then caused to turn 180° so that what was previously the undersurface becomes the upper surface, and a pattern 805 of a release coating is applied in the region of the rear flag panels 801_d_. Alternatively, the release coating can be applied to the upper and lower surfaces of the web at about the same time. Following application of the release coating 805, patterns 807_a_ and _b_ of pressure-sensitive adhesive are then applied to what is then the upper surface of the web. The pattern 807_a_ is applied over the dried, release coating 805, and the pattern 807_b_ is simultaneously applied in the central region constituting the supporting subpanels 801_a_ and _b_. The web is then severed by a suitable reciprocating blade 809 or the like to create individual pop-up elements 797 which are accumulated in a stack of, for example, 11 elements with a cover sheet having a central band of release coating being inserted atop each group of 11; such a stack is depicted in FIG. 88. If desired, such a stack can be subjected to compression and then marketed as a group of 10 pop-up elements.

In the stack in the region of the rear flag panels 801_d_, because the pressure-sensitive adhesive 807_a_ was placed atop the dried release coating 805, it transfers to the surface of the pop-up element 797 next thereabove, and the adhesive in this region on the uppermost pop-up element 797 transfers to the underside of the inserted cover sheet. The pressure-sensitive adhesive 807_b_ applied to the central region of the web stays in place because the underside of the central region of the web was coated with the release coating pattern 803.

To use the pop-up element 797, the uppermost one is removed from the stack and turned over so the central pressure-sensitive adhesive pattern 807_b_ is facing downward, and so that the transferred pressure-sensitive adhesive 807_a_ appears on the upper surface of the panel 801_d_ as shown in FIG. 89. In this orientation, the pop-up element 797 is pressed downward on a sheet having a pair of panels 811 interconnected along a fold or hinge line 811_a_, as shown in FIG. 90, with the line of weakness 799_c_ at the centerline being aligned with the fold-line 811_a_. Thereafter, upon folding of the sheet so that the panels 811 are superimposed one atop the other, the exposed pressure-sensitive adhesive pattern 807_a_ on the flag section rear panel 801_d_ attaches to the rear surface of the front flag section panel 801_c_, and the two support subpanels 801_a_ and 801_b_ become firmly affixed to the facing hinged panels 811. When the panels 811 are opened, the pop-up element assumes a prominent 3-dimensional configuration, as illustrated in FIG. 91, with the subpanels 801_a_ and 801_b_ firmly adhering to the hinged basepieces 811 and the flag section 801_c_ displayed prominently as a flat surface inclined at an angle from the recipient to allow easy reading of the message imprinted thereupon.

Figures 92, 93, 94, 95:
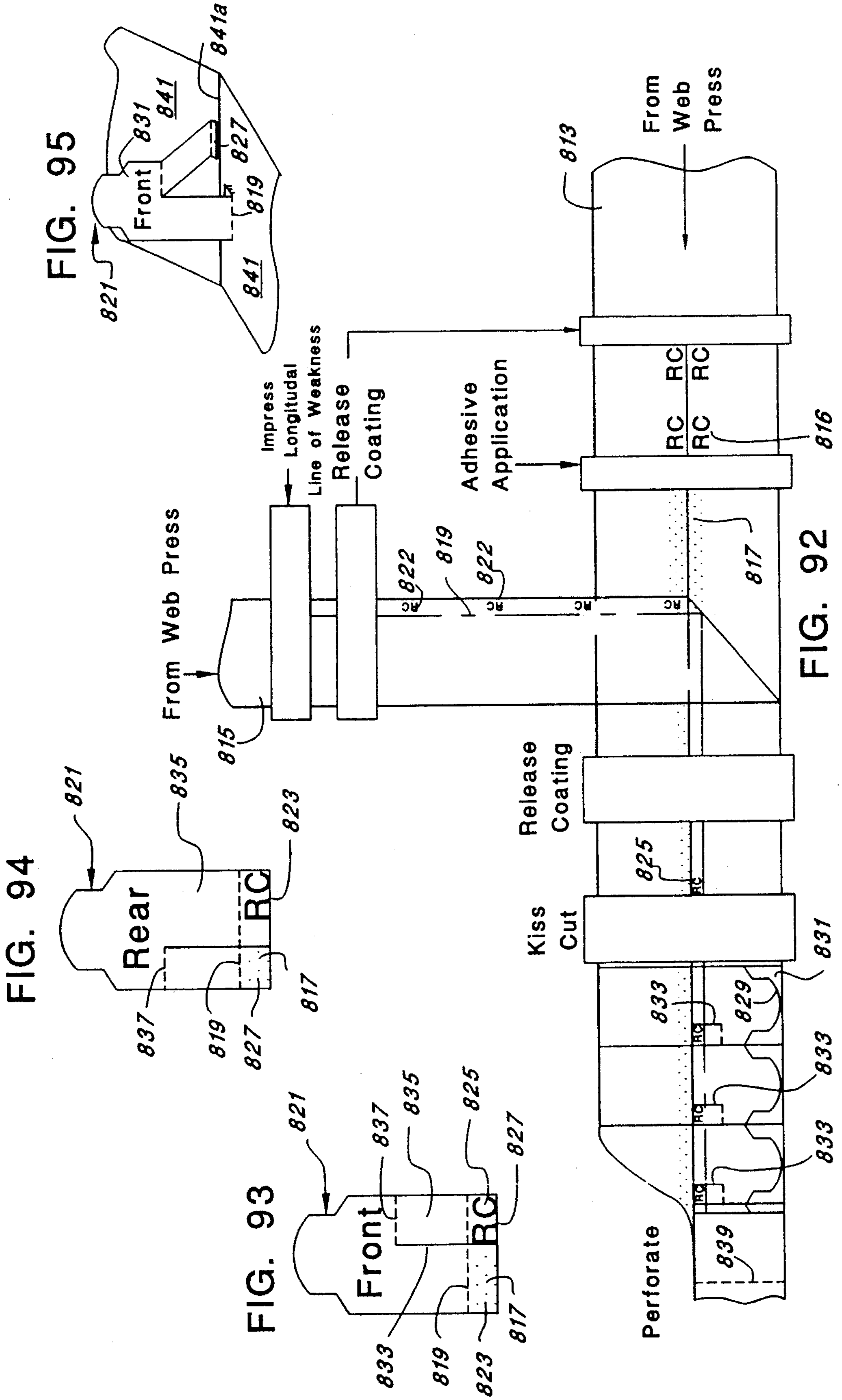
FIG. 92 is a plan view showing a web of transparent sheet material, along a center longitudinal region of which pressure-sensitive adhesive is applied, which transparent web is being mated with a web of sheet material one-half its width which has been printed to define a series of blanks designed for the creation of a plurality of structurally identical pop-up elements, and which printed web is die-cut prior to the remaining half of the transparent web being folded thereover to sandwich the web of pop-up elements therebetween.
FIG. 93 is a front view of a pop-up element cut from the web of FIG. 92 following removal of the transparent overcoating.
FIG. 94 is a rear view of a pop-up element of FIG. 93.
FIG. 95 is a perspective view showing the pop-up element in FIGS. 93 and 94 in display position between a pair of panels or basepieces connected by a fold-line.

Illustrated in FIG. 92 is another method of mass production of individual, single thickness, pop-up elements generally similar to that shown in FIG. 58. A continuous web 813 of transparent material is mated with a continuous web 815 having a width essentially one-half its width. Alternatively, an opaque or printed web 813 could be used if desired for a particular purpose. The web 815 is printed on the front, or on the front and rear surfaces if desired, to produce a series of structurally identical pop-up elements 821 from the individual blanks which are aligned along the length of the web 815. The transparent web 813 can be release-coated on its entire upper surface, or a polypropylene film having inherent releasing characteristics may be used. In the illustrated method, a release coating 816 is preferably applied at a suitable station along a central region prior to the subsequent application of a pressure-sensitive adhesive pattern 817 in the same location. In the illustrated embodiment, the adhesive pattern 817 straddles the centerline of the transparent web 813 extending equidistantly to both sides thereof. Alternatively, an adhesive pattern could be applied along both edges of the web 813, in which case, the printed web 815 is then aligned so that the release-coated subpanel region lies along one adhesive-coated edge of the wider web.

The printed web 815 is formed with a longitudinally extending line of weakness 819 which ultimately defines a pair of hinged subpanels for eventual support of the pop-up element 821. Before the two webs are mated, a pattern 822 of release coating is applied to the rear surface of the web 815 in the region of the pop-up element 821 which will constitute the rear surface of larger subpanel 823. A release coating pattern 825 can also be applied at this time to the opposite (front) surface of the web 815, or such can be deferred until after the two webs have been mated. It may be preferable to apply both release coatings at the same time. In any event, a shorter release coating pattern 825 is applied so as to cover the front surface of the smaller subpanel 827, as best seen in FIG. 93.

The printed web 815 is die-cut, preferably by kiss-cutting, to provide a line of contour 829 in the flag section panel 831 and to create a slit 833 that defines a leg 835 and severs the larger and smaller subpanels 823, 827 from each other; preferably a line of weakness 837 is also created in the form of a hinge line at the top of the leg 835. The die-cutting can be performed before the printed web is mated with the transparent web 813; however, the contour line 829, the slit 833 and the line of weakness 837 are preferably created by kiss-cutting after the two webs have been mated. Following the die-cutting, the scrap portion can be stripped from the remainder of the web 815 (as illustrated for example in FIG. 50), or it can be simply left in place for the recipient to remove when the pop-up element 821 is used. If it is desired to leave it in place, a further option is the application of a thin line of adhesive along the lower edge of the transparent web 813 that would interconnect the rear surface of the scrap section to the transparent material so it will remain therewith when the transparent material is removed from the pop-up element 821.

The mating of the two webs aligns the printed web 815 with the lower half of the transparent web 813, as viewed in FIG. 92, with the subpanel region being in contact with the pressure-sensitive adhesive pattern 817, and then kiss-cutting is performed if such is to be employed. Thereafter, the upper one-half of the transparent web 813 is folded atop the printed web 815, as shown in FIG. 92, causing one-half of the pressure-sensitive adhesive pattern 817 to be superimposed atop the region of the front surface of the subpanels 823 and 827. The folded composite web can be fed through a compression section (not shown) if desired. Compression of the composite web is preferably carried out in combination with the creation of a transverse line 839 of perforations completely across the web, which is located at the line of demarkation between each successive blank, resulting in the creation of a strip of individually detachable pop-up elements 821, each fully protected within a transparent envelope. Thereafter, the perforated web may be severed at, for example, each 10 pop-up elements so that strips of 10 pop-up elements 821 are provided, or the perforated composite web may be rolled into a coil and distributed in such form. Alternatively it can be fan-folded or handled in any other way as described hereinbefore.

In the composite web arrangement, a portion of the pressure-sensitive adhesive pattern 817 applied to the transparent web 813 transfers to the front surface of the larger subpanel 823 and to the rear surface of the smaller subpanel 827 where no release coating was applied. Alternatively, instead of applying the pressure-sensitive adhesive pattern to the web 813, the two stations used to apply the release coating to the web 815 could be used to apply pressure-sensitive adhesive to the appropriate subpanel regions. When the user then wishes to affix one of the pop-up elements 821, it is simply torn from the strip along the line of perforations 839. The transparent envelope is then stripped from the front of the pop-up element 821 to expose the pressure-sensitive adhesive on the larger subpanel 823 as depicted in FIG. 93, and the remainder of the folded transparent web is thereafter stripped from the rear surface, perhaps carrying with it the attached scrap section, to also expose the pressure-sensitive adhesive 817 on the rear surface of the smaller subpanel 827, as depicted in FIG. 94.

The pop-up element 821 is then inserted between panels 841 of the same page of a letter, or between any two panels that are interconnected along a hinge line 841*a* or the like, so that the bottom edge of each subpanel is adjacent the crease or hinge line 841*a*. When the panels 841 are then superimposed upon each other, sandwiching the single thickness, pop-up element 821 therebetween, the subpanels 823, 827 become affixed to the facing panels 841. When the letter is then opened by the recipient, the pop-up element 821 assumes the 3-dimensional attention-attracting configuration shown in FIG. 95 where the front surface of the flag section 831 is prominently displayed in an orientation where the message carried thereupon will be readily available to the recipient. Thus, this fabrication method allows the particularly efficient production of single thickness, sheet material pop-ups where the entire adhesive pattern is applied at a single location along the web 813 to a single flat surface; however, the resultant final product has exposed pressure-sensitive adhesive on oppositely facing subpanels and, when removed from the protective envelope, can be conveniently and easily affixed between a pair of hinged-together panels.

Figures 96, 97, 98, 99, 100, 101:
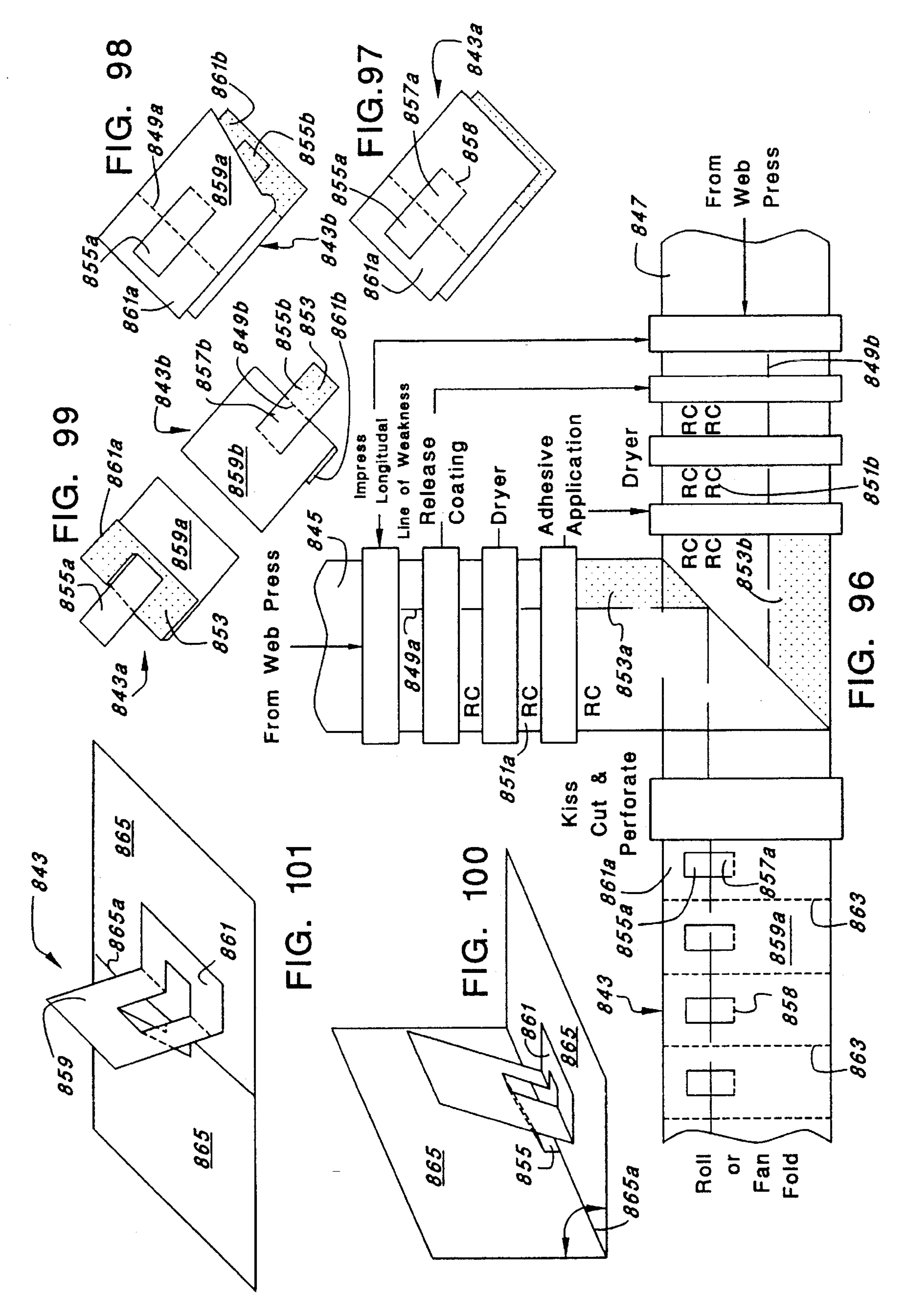
FIG. 96 is a schematic plan view showing a pair of webs of sheet material which are each printed so as to define a series of blanks for creating a plurality of structurally identical pop-up elements.
FIG. 97 is a perspective view, in slightly exploded form, showing a pair of back-to-back pop-up elements produced from the web of FIG. 96.
FIG. 98 is a view similar to FIG. 97 showing the upper pop-up element being peeled from the lower pop-up element.
FIG. 99 is a perspective view of the pair of pop-up elements of FIG. 98 following separation and preliminary folding of one subpanel of each to ready each pop-up element for attachment to a pair of panels or basepieces.
FIG. 100 is a perspective view showing one such pop-up element attached to a pair of hinged basepieces that are opened to an angle of about 90° to each other.
FIG. 101 is a perspective view of the arrangement shown in FIG. 100 after the basepieces have been opened to about 180°.

Illustrated in FIG. 96 is a mass production method for efficiently providing pairs of pop-up elements 843 arranged back-to-back, using a pair of continuous webs 845, 847 that can be supplied directly from a web press or that are supplied from preprinted rolls of sheet material. If desired, webs 845, 847 can be supplied from the same web press and then split. They can both be similarly printed so the flag section panels carry the same message, or each web can carry its own message, or, if desired, the blanks along each web can carry a variety of different messages. The webs themselves are simply designed to provide a series of structurally identical pop-up elements once the fabrication process is completed. As an alternative, they might be left blank for the purchaser to print with a personalized message using state-of-the-art computer-driven laser printers.

A longitudinal line of weakness 849*a* is first impressed along web 845 at a location that will define hinged subpanels in the ultimate pop-up element, and a similar line of weakness 849*b* is impressed along the web 847 in a similar location. Next, a release coating is applied to each of the webs in the region that will generally constitute the rear surface of the flag section. The release coating 851*a* applied to the web 845 along a region that is slightly wider than the width of the supporting subpanels of the web 847, and the width of the release coating 851*b* applied to the web 847 is similarly slightly wider than the width of the subpanels on the web 845. Depending upon the release coating applied, it may be preferable to subject the coated webs to hot-air drying or the like. Thereafter, a pressure-sensitive adhesive pattern 853*a* is applied to the web 845 in what will constitute the region of the subpanels, i.e. between the line of weakness 849*a* and the near edge of the web. A pressure-sensitive adhesive pattern 853*b* is similarly applied to the upper surface of the continuous web 847 in the region between the line of weakness 849*b* and the near edge of the web.

The two webs are then laminated together, and the pressure-sensitive adhesive patterns 853*a* and 853*b* assure that alignment of the two webs is perfectly maintained. The laminated composite web is then kiss-cut from both surfaces to create a central subpanel 855 and a hinged leg 857 in each of the webs, and the entire composite web is transversely perforated to define detachable pairs of back-to-back pop-up elements 843 in series alignment along the web. More specifically, a central subpanel 855*a* and a hinged leg 857*a* are cut in the upper web 845 together with a line of weakness 858 so that the hinged leg 857*a* remains attached along the line of weakness 858 to the main flag section 859*a* of the pop-up element. The original longitudinal line of weakness 849*a* provides a hinge line between the subpanel 855 and the hinged leg 857. The remainder of the pressure-sensitive adhesive coated portion of the web 845 constitutes a U-shaped subpanel 861*a* having a pair of arms that remain hinged to the flag section 859*a* along the original line of weakness 849*a* which are interconnected by a crossbar portion located along the lower edge of the pop-up element.

A similar, but oppositely oriented, central subpanel and its hinged leg are kiss-cut in the lower web 847, as can be seen from FIGS. 98 and 99. More specifically, the central subpanel 855*b* is connected along the original line of weakness 849*b* to the hinged leg 857*b*, with the remainder of the subpanel portion constituting a U-shaped subpanel 861*b*. The composite, perforated web can be handled in any suitable manner, such as by severing it in groups of 5 or 10 pop-up elements 843, fan-folding, or rolling into a coil or the like.

To use the pop-up elements 843, a unit consisting of a pair of them, as depicted in FIG. 97, is detached along the line of perforations 863. The release coating allows the flag section of one pop-up element, for example the flag section 859*a* in FIG. 98, to be peeled from the region of the underlying pop-up element 843*b* that contains the pressure-sensitive adhesive, and vice-versa, thus providing a pair of pop-up elements 843*a* and *b* with no waste to be discarded. The U-shaped subpanels 861*a* and 861*b* are then bent about the original longitudinal lines of weakness 849*a* and 849*b* so as to lie in juxtaposition with the front surface of the flag panels 859*a* and 859*b*, readying the pop-up elements for insertion between a pair of hinged-together panels or base-pieces 865. One of the pop-up elements 843 depicted in FIG. 99 is then placed on one of two such hinged-together panels 865 with the lower edge of the central subpanel 855 generally adjacent the hinge line 865*a*; as a result, the pressure-sensitive adhesive secures the central subpanel 855 (and thus the rest of the pop-up element 843) in the desired location. Superimposition of the two panels 865 by folding about the line 865*a* results in the attachment of the U-shaped subpanel 861 to the facing panel 865. When the panels 865 are opened, as shown in FIGS. 100 and 101, the pop-up element 843 assumes an attractive attention-getting orientation with the flag section 859 prominently exposed. As shown in FIG. 101, the flag section 859 is tilted slightly rearward in the full open position, in which position, not only is a message carried by the front surface of the flag section prominently displayed, but the front surface of the U-shaped subpanel is also aptly positioned to display a portion of the overall message.

Although the invention has been described with regard to certain preferred embodiments, it should be understood that various changes and modifications as would be obvious to one having the ordinary skill in this art may be made without departing from the scope of the invention which is set forth in the claims appended hereto. For example, the pop-up elements can be made in various forms from a single sheet that is die-cut to form a plurality of subpanels, and instead of the pop-up elements 145 or 621 being formed with three base panels, only two base panels may be used, one having adhesive on one surface and the other having adhesive on the opposite surface. In addition, a single sheet can be folded upon itself to create an interconnected subpanel along the base of a pop-up element which carries adhesive on the exterior surface while a die-cut subpanel portion of the pop-up element carries adhesive on the opposite surface. Instead of folding the web 155 along the centerline 163 as depicted in FIG. 30, a line of weakness could be impressed at this location, and the pop-up element 167 could be distributed flat, relying on the pressure-sensitive adhesive patterns 161 to interconnect adjacent units in the stack.

Although fabrication from a continuous roll is often preferred, cut sheets containing multiple pop-up elements have advantages in some cases. Instead of die-cutting one blank at a time, two or more blanks might be die-cut as a group, which would allow for the creation of pop-up elements of different shapes within the same cut sheet; in such a case, the pop-up elements which result might have a different appearance but would be structurally identical in that the fold lines would be in precisely the same locations. Instead of applying a single liner web 65 in FIG. 12, a pair of webs might be applied parallel to each other. Moreover, if desired for a particular web-handling operation, an illustrated folding step may be replaced by severing and manipulating one of the severed portions of the web to superimpose it upon the other. Instead of employing pressure sensitive adhesive patterns to attach the pop-up elements to a carrier web or the like, one might protect the adhesive pattern by covering it with a release liner and then use separate pressure sensitive adhesive patterns, that leave no residue upon detachment, to position the pop-up elements for distribution. Adhesive patterns may also be applied to the corresponding surface portion Of the web from that illustrated when surface-to-surface contact will subsequently be achieved. Furthermore, the adhesive patterns can be applied in any suitable manner; for example, instead of applying liquid adhesive in FIGS. 27 or 30, strips of double-faced adhesive material, similar to carpet-laying tape, might be used.

Although the term "pop-up" element is used throughout to refer to the illustrated sheet material structures, it is intended to broadly encompass any flat sheet material structures that are easily displayable in three-dimensional form as a result of pressure-sensitive adhesive carried thereupon.

Particular features of the invention are emphasized in the claims that follow.

What is claimed is:

1. A sheet material pop-up element comprising a single integral piece of sheet material having a front surface, a rear surface, an upper edge and a lower edge, said piece including a flag section that is located in an upper region of said single piece and extends to the upper edge of said piece, said piece also including a base section which is connected to and supports said flag section, and said base section including at least two side-by-side legs and at least two subpanels which are formed by cut means extending toward said lower edge of said piece from said flag section, said subpanels being hinged along their upper edges to said legs, pressure-sensitive adhesive on each of said subpanels, being located on one of said front and rear surfaces of said piece with respect to each said subpanel, and separate sheet material having releasing characteristics covering said pressure-sensitive adhesive, whereby said pop-up element, upon separation from said separate sheet material having said releasing characteristics, is capable of being readily inserted between and thereby becoming attached to a pair of hinged panels, at a location generally adjacent to a hinge line along which said hinged panels are interconnected in hinged relationship one to the other so that, upon the opening of said pair of hinged panels, said pop-up element assumes a three-dimensional orientation and maintains such a three-dimensional orientation upon opening of said pair of hinged panels to full open position where said subpanels are essentially coplanar.

2. A pop-up element according to claim 1 wherein each said subpanel is hinged to one of said legs along a line of weakness generally perpendicular to said cut means, and wherein said pressure-sensitive adhesive on said subpanels is located on the rear surfaces of each of said subpanels so that, prior to insertion between a pair of hinged panels, one of said subpanels is folded 180° about said line of weakness so as to lie in juxtaposition with said leg to which it is hinged.

3. A pop-up element according to claim 2 wherein each said leg has a vertical length longer than the vertical length of said subpanel hinged thereto along said line of weakness.

4. A pop-up element according to claim 2 wherein said separate sheet material comprises liner means which covers substantially the entire rear surface of said single integral piece, said liner means having releasing characteristics in the region juxtaposed with said subpanels and having additional pressure-sensitive adhesive along an upper edge portion thereof and wherein said rear surface of said integral piece of sheet material has a release coating along the upper edge region thereof so that said additional pressure-sensitive adhesive adheres preferentially to said liner means.

5. A composite sheet assemblage comprising first and second juxtaposed substantially rectangular sheets of sheet material, said first sheet containing a die-cut array in the form of a plurality of pop-up elements according to claim 2 wherein said pop-up elements are positioned in a plurality of horizontal rows and vertical columns, and said second sheet constitutes said separate sheet material and has dimensions so as to at least cover substantially the entire region of said plurality of pop-up elements in said first sheet, said rectangular sheets being joined together by said pressure-sensitive adhesive that is located on said rear surfaces of said subpanels and by additional pressure-sensitive adhesive located between said second sheet and an upper edge region of said first sheet with the rear surfaces of said pop-up elements in said horizontal row along the upper edge of said first sheet being formed with a release surface area which interfaces with said additional pressure-sensitive adhesive.

6. A composite sheet assemblage according to claim 5 that is designed for sheet-fed printing, wherein said first and second rectangular sheets have dimensions substantially the same as each other, said first sheet constituting a die-cut array of a plurality of said integral pieces which are positioned side-by-side in said plurality of horizontal rows and vertical columns, and wherein there is a pattern including a plurality of horizontal strips of pressure-sensitive adhesive extending horizontally across said sheets in the region therebetween which strips are located in alignment with said subpanels in each of said rows and constitute said pressure-sensitive adhesive and said additional pressure-sensitive adhesive.

7. A pop-up element according to claim 1 wherein said pressure-sensitive adhesive is located on said front surface of one of said at least two subpanels and on said rear surface of the other of said at least two subpanels.

8. A pop-up element according to claim 7 wherein each subpanel has a release surface area on the opposite surface from that surface on which said pressure-sensitive adhesive is located, wherein separate sheet material is wrapped around said lower edge of said single integral piece of sheet material so as to cover said subpanels on both the front and rear surfaces thereof, wherein said separate sheet material has a pattern of releasing characteristics in regions where it interfaces with said subpanels, and wherein a continuous strip of pressure-sensitive adhesive is disposed in the region of said subpanels juxtaposed between the front and rear surfaces thereof and said separate sheet material, whereby said pressure-sensitive adhesive adheres preferentially to the desired surface of each said subpanel which does not have said release surface area.

9. A pop-up element according to claim 2 wherein there are at least 3 of said legs and 3 of said subpanels, including a central subpanel and 2 flanking subpanels, which flanking subpanels include interconnecting bar means located along said lower edge of said integral sheet.

10. A pop-up element according to claim 9 wherein a release surface area is present on the rear surface of said integral sheet material piece in an upper region of said flag section generally adjacent the upper edge of said piece and wherein said separate sheet material which covers said pressure-sensitive adhesive on said subpanels is in the form of a second single integral piece of sheet material, identical to said integral sheet material piece, which is oriented with its upper and lower edges aligned, respectively, with said lower and upper edges of said single integral sheet material piece, so as to be in opposite vertical orientation thereto.

11. A stack of pop-up elements interconnected to one another and arranged in a vertical alignment, said stack comprising a plurality of single sheet pop-up elements according to claim 1 arranged with a front surface of each said integral piece in juxtaposition with the rear surface of the next adjacent integral piece in said stack, wherein each said subpanel has a release surface area on one of said front and rear surfaces thereof with the opposite surface thereof being devoid of any releasing characteristics, said stack being arranged so that the subpanels of each said integral piece of sheet material having said release surface areas are in juxtaposition with one of said subpanels of said subpanels of said next adjacent pop-up element in said stack on which said pressure-sensitive adhesive is located.

12. A stack of pop-up elements according to claim 11 wherein each said pop-up element has at least 3 said legs and 3 said subpanels, including a central subpanel and 2 flanking subpanels and wherein the rear surfaces of both flanking subpanels have said release surface area.

13. A stack of sheet material pop-up elements comprising a plurality of integral single sheet material pop-ups interconnected to one another and arranged in a vertical alignment, each said integral single sheet having 3 generally centrally located parallel lines of weakness which define a central fold-line and a pair of flanking subpanels and also having a pair of front and rear flag panels hinged to said subpanels along the outermost 2 lines of weakness of said 3 parallel lines of weakness, which flag panels have free edge regions spaced from said hinge lines of weakness, said single sheets being arranged in alignment in said stack with the undersurface of each of a plurality of said sheets being in juxtaposition with the upper surface of the next adjacent sheet in said stack and with said central fold-lines being in vertical alignment, the upper surface of each said sheet in the region of said flanking subpanels having a release surface area, and said free edge region of the undersurface of said rear flag panel of each said sheet also having a release surface area, two separate patterns of pressure-sensitive adhesive being located between each of said single sheets in said stack, a first said pattern being located on the undersurface of said pair of flanking subpanels and a second said pattern being located on the upper surface of said rear flag panel at said free edge region thereof, so that, following removal of one said single sheet from said stack and disposition on a basepiece with said central fold-line aligned with a fold-line of said basepiece, folding of the basepiece and said pop-up element sheet along said aligned fold-lines attaches said front and rear flag panels to each other via said second pattern of pressure-sensitive adhesive so that, upon opening of said folded basepiece, the pop-up element assumes a three-dimensional orientation.

14. A stack of pop-up elements according to claim 13 wherein said outermost lines of weakness are spaced equal distances from said central fold-line and wherein said rear flag panel is formed with a fourth line of weakness that is parallel to said 3 lines of weakness and defines an attachment subpanel at said free edge region, said release surface area and said second pressure-sensitive adhesive pattern being located on opposite surfaces of said attachment subpanel.

15. A stack of pop-up elements according to claim 14 wherein each said single sheet is rectangular and wherein said free edges of said front and rear flag panels are parallel to said 3 parallel lines of weakness.

16. An elongated web of sheet material which is folded upon itself along a longitudinal centerline and which is fan-folded about a plurality of transverse lines perpendicular to said longitudinal centerline to create a stack of pop-up elements, each of which pop-up elements comprises a pair of interconnected flag panels which are hinged along said longitudinal centerline and which have a pair of generally triangular subpanels, with a vertex of each said triangular subpanel are being located adjacent a common point on said longitudinal centerline, said front surfaces of said flag panels having a release surface area so that, in said fan-folded stack, each said triangular pressure-sensitive adhesive-carrying subpanel is in contact with a release surface area of a flag panel of the next adjacent pop-up element, whereby, upon removal of one folded pop-up element from said stack and insertion between a pair of hinged-together base panels, each said triangular pressure-sensitive-carrying subpanel adheres to an opposite one of said base panels and upon opening of said hinged panels, said pop-up element assumes a three-dimensional orientation.

17. A stack of pop-up elements according to claim 16 wherein said subpanels are defined by oblique lines of weakness.

18. A stack of pop-up elements according to claim 17 wherein each of said pop-up elements is rectangular in shape and is bisected by said longitudinal centerline of said web.

19. A stack of pop-up elements according to claim 18 wherein each of said oblique lines of weakness begins from a common point along said centerline and extends to a generally midway point along one of two opposite edges of said rectangular pop-up element.

20. A stack of pop-up elements according to claim 19 wherein said adjacent pop-up elements in said longitudinal web are separated from one another by lines of perforations which run transversely across said web and which constitute said lines about which fan-folding occurs.

* * * * *